United States Patent
Holme et al.

(10) Patent No.: US 11,557,756 B2
(45) Date of Patent: Jan. 17, 2023

(54) HYBRID ELECTRODES WITH BOTH INTERCALATION AND CONVERSION MATERIALS

(71) Applicant: QuantumScape Battery, Inc., San Jose, CA (US)

(72) Inventors: Tim Holme, San Jose, CA (US); Weston Arthur Hermann, San Jose, CA (US)

(73) Assignee: QUANTUMSCAPE BATTERY, INC., San Jose, CA (US)

( * ) Notice: Subject to any disclaimer, the term of this patent is extended or adjusted under 35 U.S.C. 154(b) by 86 days.

(21) Appl. No.: 16/672,375

(22) Filed: Nov. 1, 2019

(65) Prior Publication Data
US 2020/0144611 A1    May 7, 2020

Related U.S. Application Data

(62) Division of application No. 14/631,715, filed on Feb. 25, 2015, now abandoned.
(Continued)

(51) Int. Cl.
*H01M 4/36* (2006.01)
*H01M 4/505* (2010.01)
(Continued)

(52) U.S. Cl.
CPC .............. *H01M 4/366* (2013.01); *B60L 50/64* (2019.02); *B60L 58/12* (2019.02); *H01M 4/13* (2013.01); *H01M 4/131* (2013.01); *H01M 4/136* (2013.01); *H01M 4/364* (2013.01); *H01M 4/485* (2013.01); *H01M 4/505* (2013.01); *H01M 4/525* (2013.01); *H01M 4/582* (2013.01); *H01M 10/052* (2013.01); *H01M 10/0525* (2013.01); *H01M 10/0562* (2013.01); *B60L 2240/545* (2013.01);
(Continued)

(58) Field of Classification Search
CPC ........ H01M 4/36; H01M 4/364; H01M 4/388; H01M 4/366; H01M 4/485; H01M 4/58; H01M 10/052; H01M 10/0525
See application file for complete search history.

(56) References Cited

U.S. PATENT DOCUMENTS

| | | |
|---|---|---|
| 2,722,490 A | 11/1955 | Haynes et al. |
| 2,722,559 A | 11/1955 | Farlow et al. |

(Continued)

FOREIGN PATENT DOCUMENTS

| | | |
|---|---|---|
| CN | 1547277 A | 11/2004 |
| CN | 101443932 | 5/2009 |

(Continued)

OTHER PUBLICATIONS

U.S. Appl. No. 90/012,243, filed Jul. 19, 2013, Thackeray et al.
(Continued)

*Primary Examiner* — Jeremiah R Smith
(74) *Attorney, Agent, or Firm* — Squire Patton Boggs (US) LLP

(57) ABSTRACT

The disclosure set forth herein is directed to battery devices and methods therefor. More specifically, embodiments of the instant disclosure provide a battery electrode that comprises both intercalation chemistry material and conversion chemistry material, which can be used in automotive applications. There are other embodiments as well.

18 Claims, 45 Drawing Sheets

Related U.S. Application Data

(60) Provisional application No. 62/027,908, filed on Jul. 23, 2014, provisional application No. 61/944,502, filed on Feb. 25, 2014.

(51) Int. Cl.

| | | |
|---|---|---|
| *H01M 4/136* | (2010.01) | |
| *H01M 10/0562* | (2010.01) | |
| *H01M 4/13* | (2010.01) | |
| *H01M 10/052* | (2010.01) | |
| *H01M 4/525* | (2010.01) | |
| *H01M 4/485* | (2010.01) | |
| *H01M 4/58* | (2010.01) | |
| *H01M 4/131* | (2010.01) | |
| *B60L 50/64* | (2019.01) | |
| *B60L 58/12* | (2019.01) | |
| *H01M 10/0525* | (2010.01) | |
| H01M 10/42 | (2006.01) | |
| H01M 10/44 | (2006.01) | |
| H01M 4/38 | (2006.01) | |

(52) U.S. Cl.
CPC ... *B60L 2240/547* (2013.01); *B60L 2240/549* (2013.01); *H01M 4/388* (2013.01); *H01M 4/58* (2013.01); *H01M 4/5825* (2013.01); *H01M 10/44* (2013.01); *H01M 2010/4271* (2013.01); *H01M 2220/20* (2013.01); *H01M 2300/0068* (2013.01); *Y02E 60/10* (2013.01); *Y02T 10/70* (2013.01)

(56) References Cited

U.S. PATENT DOCUMENTS

| | | |
|---|---|---|
| 3,764,380 A | 10/1973 | Grossman |
| 3,918,988 A | 11/1975 | Abens |
| 3,972,729 A | 8/1976 | Mosetti et al. |
| 4,007,122 A | 2/1977 | Owens et al. |
| 4,127,708 A | 11/1978 | Liang et al. |
| 4,312,718 A | 1/1982 | Watanabe et al. |
| 4,367,267 A | 1/1983 | Di |
| 4,463,212 A | 7/1984 | Imai |
| 4,476,204 A | 10/1984 | Auborn |
| 4,492,721 A | 1/1985 | Joosten et al. |
| 4,544,615 A | 10/1985 | Shishikura et al. |
| 4,560,633 A | 12/1985 | Kobayashi et al. |
| 4,589,197 A | 5/1986 | North |
| 4,840,859 A | 6/1989 | Williams et al. |
| 4,845,015 A | 7/1989 | Kurematsu et al. |
| 5,069,764 A | 12/1991 | Watanabe et al. |
| 5,296,318 A | 3/1994 | Gozdz et al. |
| 5,360,686 A | 11/1994 | Peled et al. |
| 5,522,955 A | 6/1996 | Brodd |
| 5,670,277 A | 9/1997 | Barker et al. |
| 5,738,957 A | 4/1998 | Amine et al. |
| 5,744,258 A | 4/1998 | Bai et al. |
| 5,788,738 A | 4/1998 | Pizada et al. |
| 5,759,720 A | 6/1998 | Amatucci |
| 5,783,332 A | 7/1998 | Amine et al. |
| 5,792,574 A | 8/1998 | Mitate et al. |
| 5,824,434 A | 10/1998 | Kawakami et al. |
| 5,945,163 A | 8/1999 | Powel et al. |
| 5,965,293 A | 10/1999 | Idota et al. |
| 6,037,095 A | 3/2000 | Miyasaka |
| 6,037,241 A | 3/2000 | Powell et al. |
| 6,087,042 A | 7/2000 | Sugiyama et al. |
| 6,168,884 B1 | 1/2001 | Neudecker et al. |
| 6,204,219 B1 | 3/2001 | Brezny et al. |
| 6,333,128 B1 | 12/2001 | Sunagawa et al. |
| 6,379,841 B1 | 4/2002 | Potanin et al. |
| 6,413,673 B1 | 7/2002 | Kasai et al. |
| 6,420,069 B2 | 7/2002 | Amine et al. |
| 6,423,131 B1 | 7/2002 | Seeger et al. |
| 6,432,581 B1 | 8/2002 | Amatucci et al. |
| 6,495,481 B1 | 12/2002 | Margaryan |
| 6,517,974 B1 | 2/2003 | Kobayashi et al. |
| 6,551,747 B1 * | 4/2003 | Gan ............... H01M 4/06 429/245 |
| 6,635,114 B2 | 10/2003 | Zhao et al. |
| 6,645,452 B1 | 11/2003 | Barker et al. |
| 6,677,082 B2 | 1/2004 | Thackeray et al. |
| 6,680,143 B2 | 1/2004 | Thackeray et al. |
| 6,680,145 B2 | 1/2004 | Obrovac et al. |
| 6,686,090 B2 | 2/2004 | Inagaki et al. |
| 6,689,192 B1 | 2/2004 | Phillips et al. |
| 6,719,848 B2 | 4/2004 | Faykosh et al. |
| 6,753,112 B2 | 6/2004 | Ooya et al. |
| 6,756,155 B1 | 6/2004 | Kweon et al. |
| 6,835,499 B2 | 12/2004 | Philips |
| 6,890,686 B1 | 5/2005 | Barker |
| 6,964,828 B2 | 11/2005 | Lu et al. |
| 6,974,486 B1 | 12/2005 | Kweon et al. |
| 6,982,132 B1 | 1/2006 | Goldner et al. |
| 7,078,128 B2 | 7/2006 | Lu et al. |
| 7,135,252 B2 | 11/2006 | Thackeray et al. |
| 7,169,471 B1 | 1/2007 | Dreher et al. |
| 7,205,073 B2 | 4/2007 | Kim et al. |
| 7,314,684 B2 | 1/2008 | Kang et al. |
| 7,371,338 B2 | 5/2008 | Amatucci |
| 7,468,223 B2 | 12/2008 | Thackeray et al. |
| 7,517,613 B2 | 4/2009 | Yuasa et al. |
| 7,625,671 B2 | 12/2009 | Amatucci |
| 7,709,149 B2 | 5/2010 | Paulsen et al. |
| 7,780,787 B2 | 8/2010 | Nolan |
| 7,793,611 B2 | 9/2010 | Oladeji |
| 7,910,166 B2 | 3/2011 | Powell et al. |
| 7,927,659 B2 | 4/2011 | Powell et al. |
| 7,931,937 B2 | 4/2011 | Powell et al. |
| 7,947,392 B2 | 5/2011 | Amatucci |
| 7,968,145 B2 | 6/2011 | Powell et al. |
| 7,968,235 B2 | 6/2011 | Amine et al. |
| 8,039,149 B2 | 10/2011 | Amatucci et al. |
| 8,225,744 B2 | 7/2012 | Oladeji |
| 8,241,791 B2 | 8/2012 | Lu et al. |
| 8,268,198 B2 | 9/2012 | Shin et al. |
| 8,277,683 B2 | 10/2012 | Deng et al. |
| 8,388,754 B2 | 3/2013 | Powell et al. |
| 8,389,160 B2 | 3/2013 | Venkatachalam et al. |
| 8,449,950 B2 | 5/2013 | Shang et al. |
| 8,465,556 B2 | 6/2013 | Oladeji |
| 8,465,602 B2 | 6/2013 | Shmyreva et al. |
| 8,492,030 B2 | 7/2013 | Park et al. |
| 8,518,604 B2 | 8/2013 | Amatucci et al. |
| 8,591,774 B2 | 11/2013 | Koenig et al. |
| 8,623,549 B2 | 1/2014 | Pereira et al. |
| 8,685,565 B2 | 4/2014 | Lu et al. |
| 8,808,405 B2 | 8/2014 | Oladeji |
| 8,865,348 B2 | 10/2014 | Sun et al. |
| 8,951,668 B2 | 2/2015 | Pereira et al. |
| 9,017,777 B2 | 4/2015 | Oladeji |
| 9,048,497 B2 | 6/2015 | Amatucci et al. |
| 9,065,137 B2 | 6/2015 | Amatucci et al. |
| 9,070,945 B2 | 6/2015 | Amatucci et al. |
| 9,203,082 B2 | 12/2015 | Pereira et al. |
| 9,246,158 B2 | 1/2016 | Holme et al. |
| 9,339,784 B2 | 5/2016 | Ju et al. |
| 9,446,966 B2 | 9/2016 | Shan |
| 9,466,830 B1 | 10/2016 | Shan et al. |
| 9,543,564 B2 | 1/2017 | Fasching et al. |
| 9,640,793 B2 | 5/2017 | Holme et al. |
| 9,692,039 B2 | 6/2017 | Holme et al. |
| 9,786,905 B2 | 10/2017 | Holme et al. |
| 9,859,560 B2 | 1/2018 | Holme et al. |
| 10,158,115 B2 | 12/2018 | Stimson et al. |
| 10,199,649 B2 | 2/2019 | Beck et al. |
| 10,326,135 B2 | 6/2019 | Fasching et al. |
| 10,511,012 B2 | 12/2019 | Fasching et al. |
| 2001/0046629 A1 | 11/2001 | Inagaki et al. |
| 2002/0086208 A1 | 7/2002 | Hayashi et al. |
| 2002/0098411 A1 | 7/2002 | Gan et al. |
| 2002/0136954 A1 | 9/2002 | Thackeray et al. |
| 2002/0168573 A1 | 11/2002 | Baker et al. |

(56) References Cited

U.S. PATENT DOCUMENTS

| | | |
|---|---|---|
| 2003/0013019 A1 | 1/2003 | Barker et al. |
| 2003/0148188 A1 | 8/2003 | Umemoto |
| 2003/0170550 A1 | 9/2003 | Ugawa et al. |
| 2004/0062994 A1 | 4/2004 | Amatucci et al. |
| 2004/0121235 A1 | 6/2004 | Amatucci |
| 2004/0126300 A1 | 7/2004 | Barker et al. |
| 2004/0126659 A1 | 7/2004 | Graetz et al. |
| 2004/0185346 A1 | 9/2004 | Takeuchi |
| 2004/0191633 A1 | 9/2004 | Johnson et al. |
| 2005/0003270 A1 | 1/2005 | Phillips |
| 2005/0136328 A1 | 6/2005 | Eylem et al. |
| 2005/0164084 A1 | 7/2005 | Adamson et al. |
| 2006/0014078 A1 | 1/2006 | Swoyer et al. |
| 2006/0019163 A1 | 1/2006 | Amatucci et al. |
| 2006/0035147 A1 | 2/2006 | Lam et al. |
| 2006/0036474 A9 | 2/2006 | Brugger et al. |
| 2006/0099495 A1 | 5/2006 | Suzuki et al. |
| 2006/0199886 A1 | 9/2006 | Ryang |
| 2007/0007109 A1 | 1/2007 | Powell et al. |
| 2007/0009800 A1 | 1/2007 | Barker et al. |
| 2007/0042264 A1 | 2/2007 | Desilvestro et al. |
| 2007/0072034 A1 | 3/2007 | Barker et al. |
| 2007/0134427 A1 | 6/2007 | Kalynushkin et al. |
| 2007/0188979 A1 | 8/2007 | Takeda et al. |
| 2007/0190414 A1 | 8/2007 | Amatucci et al. |
| 2007/0221635 A1 | 9/2007 | Boulos et al. |
| 2007/0237894 A1 | 10/2007 | Powell |
| 2007/0243466 A1 | 10/2007 | Amatucci et al. |
| 2008/0003496 A1 | 1/2008 | Neudecker et al. |
| 2008/0034579 A1 | 2/2008 | Potanin |
| 2008/0044571 A1 | 2/2008 | Maltby |
| 2008/0081259 A1 | 4/2008 | Freitag et al. |
| 2008/0102373 A1 | 5/2008 | Potanin |
| 2008/0153002 A1 | 6/2008 | Nazar et al. |
| 2008/0199772 A1 | 8/2008 | Amatucci et al. |
| 2008/0238294 A1 | 10/2008 | Xu et al. |
| 2008/0283048 A1 | 11/2008 | Petersen |
| 2008/0299703 A1 | 12/2008 | Oladeji |
| 2008/0314482 A1 | 12/2008 | Suzuki et al. |
| 2009/0004560 A1 | 1/2009 | Amatucci et al. |
| 2009/0029237 A1 | 1/2009 | Yazami |
| 2009/0087362 A1 | 4/2009 | Sun et al. |
| 2009/0220838 A9 | 9/2009 | Baker et al. |
| 2009/0246940 A1 | 10/2009 | Powell |
| 2010/0068376 A1 | 3/2010 | Chen et al. |
| 2010/0086848 A1* | 4/2010 | Takeuchi ............ H01M 4/364 429/188 |
| 2010/0151332 A1 | 6/2010 | Lopez et al. |
| 2010/0159324 A1 | 6/2010 | Irvin et al. |
| 2010/0210059 A1 | 8/2010 | Milshtein |
| 2010/0210453 A1 | 8/2010 | Hu et al. |
| 2010/0216032 A1 | 8/2010 | Baba et al. |
| 2010/0297502 A1 | 11/2010 | Zhu et al. |
| 2010/0323098 A1 | 12/2010 | Kosuzu et al. |
| 2011/0006254 A1 | 1/2011 | Richard et al. |
| 2011/0027940 A1 | 2/2011 | Oladeji |
| 2011/0039401 A1 | 2/2011 | Nolan |
| 2011/0045206 A1 | 2/2011 | Shang et al. |
| 2011/0065001 A1 | 3/2011 | Pereira et al. |
| 2011/0076556 A1 | 3/2011 | Karthikeyan et al. |
| 2011/0129732 A1 | 6/2011 | Bachrach et al. |
| 2011/0132261 A1 | 6/2011 | Powell et al. |
| 2011/0132262 A1 | 6/2011 | Powell et al. |
| 2011/0132263 A1 | 6/2011 | Powell et al. |
| 2011/0171398 A1 | 7/2011 | Oladeji |
| 2011/0171528 A1 | 7/2011 | Oladeji |
| 2011/0200883 A1 | 8/2011 | Cui et al. |
| 2011/0260099 A1 | 10/2011 | Paulsen et al. |
| 2012/0009469 A1 | 1/2012 | Visco et al. |
| 2012/0032118 A1 | 2/2012 | Fichtner et al. |
| 2012/0056470 A1 | 3/2012 | Kim |
| 2012/0064395 A1 | 3/2012 | Chang et al. |
| 2012/0070744 A1* | 3/2012 | Moriyama ............ C01G 23/005 423/598 |
| 2012/0077082 A1 | 3/2012 | Se-Hee et al. |
| 2012/0100431 A1 | 4/2012 | Yao et al. |
| 2012/0171469 A1 | 7/2012 | Shmyreva |
| 2012/0225356 A1 | 9/2012 | Wietelmann |
| 2012/0244429 A1 | 9/2012 | Lam et al. |
| 2012/0263998 A1 | 10/2012 | Thackeray et al. |
| 2013/0048924 A1 | 2/2013 | Amatucci et al. |
| 2013/0065135 A1 | 3/2013 | Takada et al. |
| 2013/0108802 A1 | 5/2013 | Oladeji |
| 2013/0122370 A1 | 5/2013 | Rho et al. |
| 2013/0177821 A1 | 7/2013 | Tsuchida et al. |
| 2013/0202502 A1 | 8/2013 | Schulz-Dobrick et al. |
| 2013/0224594 A1 | 8/2013 | Yushin |
| 2013/0236764 A1 | 9/2013 | Hu |
| 2013/0252064 A1 | 9/2013 | Kuriki et al. |
| 2013/0302682 A1 | 11/2013 | Amatucci et al. |
| 2013/0335030 A1 | 12/2013 | Joe |
| 2013/0344391 A1 | 12/2013 | Yushin et al. |
| 2014/0050656 A1 | 2/2014 | Kang et al. |
| 2014/0087092 A1 | 3/2014 | Nieh et al. |
| 2014/0117291 A1 | 5/2014 | Amatucci et al. |
| 2014/0170493 A1 | 6/2014 | Holme et al. |
| 2014/0193714 A1 | 7/2014 | Kim et al. |
| 2014/0234715 A1 | 8/2014 | Fasching et al. |
| 2014/0264190 A1 | 9/2014 | Tong et al. |
| 2014/0264198 A1* | 9/2014 | Tong ............... H01M 10/052 252/521.2 |
| 2014/0272564 A1 | 9/2014 | Holme et al. |
| 2014/0272568 A1 | 9/2014 | Frianeza-Kullberg |
| 2014/0284526 A1 | 9/2014 | Shan |
| 2014/0317912 A1 | 10/2014 | Holme et al. |
| 2014/0322603 A1 | 10/2014 | Holme et al. |
| 2015/0050522 A1 | 2/2015 | Manthiram et al. |
| 2015/0072238 A1 | 3/2015 | Woo et al. |
| 2015/0099169 A1 | 4/2015 | Dudney et al. |
| 2015/0155546 A1* | 6/2015 | Yushin ............... H01M 4/1397 427/78 |
| 2015/0188187 A1* | 7/2015 | Strand ............... H01M 10/056 429/317 |
| 2015/0194661 A1 | 7/2015 | Ju et al. |
| 2015/0207140 A1 | 7/2015 | Amatucci et al. |
| 2015/0236341 A1 | 8/2015 | Amatucci et al. |
| 2015/0243974 A1 | 8/2015 | Holme et al. |
| 2016/0049655 A1 | 2/2016 | Fasching et al. |
| 2016/0093874 A1 | 3/2016 | Stimson et al. |
| 2016/0164135 A1 | 6/2016 | Fasching et al. |

FOREIGN PATENT DOCUMENTS

| | | |
|---|---|---|
| CN | 101901936 | 12/2010 |
| CN | 102244231 | 11/2011 |
| CN | 102388487 A | 3/2012 |
| DE | 39 30 804 | 3/1991 |
| EP | 0 149 421 | 7/1985 |
| EP | 0 651 450 | 5/1995 |
| EP | 0 938 147 | 8/1999 |
| EP | 1 049 182 | 11/2000 |
| EP | 1914823 | 2/2010 |
| EP | 1 540 752 | 3/2010 |
| EP | 2 615 057 | 7/2013 |
| EP | 2 816 639 A2 | 12/2014 |
| JP | 8-138635 | 5/1996 |
| JP | 2006-134770 | 5/2006 |
| JP | 2008-527652 A | 7/2008 |
| JP | 2009-529222 A | 8/2009 |
| JP | 2013-73792 A | 4/2013 |
| KR | 2001-0063879 | 7/2001 |
| WO | WO 2001/063879 A1 | 8/2001 |
| WO | WO 2002/097907 A2 | 12/2002 |
| WO | WO 2004/034489 A2 | 4/2004 |
| WO | WO 2006/026773 A2 | 3/2006 |
| WO | WO 2006/078472 A2 | 7/2006 |
| WO | WO 2006/137903 A3 | 12/2006 |
| WO | WO 2007/146453 A2 | 12/2007 |

(56) References Cited

FOREIGN PATENT DOCUMENTS

| WO | WO 2013/133906 | 9/2013 |
|---|---|---|
| WO | WO 2013/133906 A2 | 9/2013 |

OTHER PUBLICATIONS

Adam, Jean-Luc, "Fluoride glass research in France: fundamentals and applications", Journal of Fluorine Chemistry, vol. 107, Feb. 2001, pp. 265-270.
Alchantara et al., "Electrochemical reaction of lithium with the $CoSb_3$ skutterudite", J. Mater. Chem., 1999, vol. 9, pp. 2517-2521.
Al-Sharab et al., "EELS Compositional and Valence Mapping in Iron Fluoride-Carbon Nanocomposites", Journal of Nanoparticle Research, 15: 1500; Mar. 2013, 12 pages.
Amaresh et al., "Facile synthesis of $ZrO_2$ coated $Li_2CoPO_4F$ cathode materials for lithium secondary batteries with improved electrochemical properties," Journal of Power Sources, 2013, vol. 244, pp. 395-402.
Amatucci et al. "Formation of Lithium Fluoride/Metal Nanocomposites for Energy Storage through Solid State Reduction of Metal Fluorides", Journal of Fluorine Chemistry, 2011, vol. 132, pp. 1086-1094.
Amatucci et al., "Fluoride Based Electrode Materials For Advanced Energy Storage Devices", Journal of Fluorine Chemistry, vol. 128, 2007, available online Dec. 13, 2006, pp. 243-262.
Amatucci et al., "Materials' effects on the elevated and room temperature performance of $C/LiMN_2O_4$ Li-ion batteries", Journal of Power Sources, 1997, vol. 69, No. 1, pp. 11-25.
Amine et al., "A New Three-Volt Spinel $Li_{1-x}Mni_{.5}Ni_{0.5}O_4$ for Secondary Lithium Batteries," J. Electrochem. Soc., vol. 143, No. 5, May 1996, pp. 1607-1613.
Antonini et al., "Factors Affecting the Stabilization of Mn Spinel Capacity upon Staring and Cycling at High Temperatures", J. Electrochem. Soc., Aug. 1998, vol. 145, No. 8, pp. 2726-2732.
Arai et al. "Characterization and Cathode Performance of $Li_{1-x}Ni_{1-x}O_2$ Prepared with the Excess Lithium Method", Solid State Ionics 80, 1995, pp. 261-269.
Arai et al., "Cathode Performance and Voltage Estimation of Metal Trihalides", Journal of Power Sources, 1997, vol. 68, pp. 716-719.
Arico et al., "Nanostructured Materials For Advanced Energy conversion And Storage Devices", Nature Materials, May 2005, vol. 4, pp. 366-377.
Ariyoshi et al., "Structural change of $LiNi_{1/2}Mn_{1/2}O_2$ during charge and discharge in nonaqueous lithium cells," Journal of Physics and Chemistry of Solids, 2008, vol. 69, pp. 1238-1241.
Armand et al., "Building better batteries", Nature, Feb. 7, 2008, vol. 451, pp. 652-657.
Armelao et al., "Luminescent Properties of Eu-Doped Lanthanum Oxyfluoride Sol-Gel Thin Films", J. Phys. Chem. C, 2009, vol. 113, No. 32, pp. 14429-14434.
Armstrong et al., "Demonstrating Oxygen Loss and Associated Structural Reorganization in the Lithium Battery Cathode $Li[Ni_{0.2}Li_{0.2}Mn_{0.6}]O_2$," J. Am. Chem. Soc. 2006, vol. 128, pp. 8694-8698.
Armstrong et al., "Synthesis of layered $LiMnO_2$ as an electrode for rechargeable lithium batteries," Nature, vol. 381, Jun. 6, 1996, pp. 499-500.
Armstrong et al., "The Layered Intercalation Compounds $Li(Mn_{1-y}Co_y)O_2$: Positive Electrode Materials for Lithium-Ion Batteries," Journal of Solid State Chemistry, vol. 145, 1999, pp. 549-556.
Arora et al., "Capacity Fade Mechanisms and Side Reactions in Lithium-Ion Batteries", J. Electrochem. Soc., Oct. 1998, vol. 145, No. 10, pp. 3647-3667.
Arroyo y de Dompablo et al., "A computational investigation on fluorinated-polyanionic compounds as positive electrode for lithium batteries", Journal of Power Sources, 2007, vol. 174, pp. 1251-1257.
Ates et al., "A Li-Rich Layered Cathode Material with Enhanced Structural Stability and Rate Capability for Li-ion Batteries" Journal of the Electrochemical Society, 161 (3), 2014, pp. A355-A363.
Ates et al., "Mitigation of Layered to Spinel Conversion of a Li-Rich Layered Metal Oxide Cathode Material for Li-Ion Batteries," Journal of The Electrochemical Society, 161 (3), 2014, pp. A290-A301.
Aurbach et al., "Studies of Aluminum-Doped $LiNi_{0.5}Co_{0.2}Mn_{0.3}O_2$: Electrochemical Behavior, Aging, Structural Transformations, and Thermal Characteristics," Journal of The Electrochemical Society, 162 (6), (2015), pp. A1014-A1027.
Aurbach et al., "In Situ Micromorphological Studies of Li Electrodes by Atomic Force Microscopy in a Glove Box System", Electrochemical and Solid-State Letters, 1999, vol. 2, No. 1, pp. 16-18.
Badway et al., "Carbon Metal Fluoride Nanocomposites—High-Capacity Reversible Metal Fluoride Conversion Materials as Rechargeable Positive Electrodes for Li Batteries", Journal of the Electrochemical Society, 150 (10), 2003, pp. A1318-A1327.
Badway et al., "Carbon Metal Fluroide Nanocomposites Structure and Electrochemistry of $FeF_3$:C", Journal of Electrochemcial Society, 2003, available electronically Jul. 17, 2003, vol. 150, No. 9, pp. A1209-A1218.
Badway et al., "Structure and Electrochemistry of Copper Fluoride Nanocomposites Utilizing Mixed Conducting Matrices", Chem. Mater., 2007, vol. 19, No. 17, pp. 4129-4141.
Bains et al., "$Li(Ni_{0.40}Mn_{0.40}Co_{0.15}Al_{0.05})O_2$: A promising positive electrode material for high-power and safe lithium-ion batteries," Journal of Power Sources, 2011, vol. 196, pp. 8625-8631.
Banerjee et al., "Synthesis and Characterization of Nano-Crystalline Fluorine-Doped Tin Oxide Thin Films by Sol-Gel Method", Journal of Sol-Gel Science and Technology 28, 2003, pp. 105-110.
Bareno al., "Local Structure of Layered Oxide Electrode Materials for Lithium-Ion Batteries," Adv. Mater., 2010, vol. 22, pp. 1122-1127.
Bareno et al., "Long-Range and Local Structure in the Layered Oxide $Li_{1.2}Co_{0.4}Mn_{0.4}O_2$", Chem. Mater., 2011, vol. 23, pp. 2039-2050.
Barker et al., "A Comparative Investigation of the Li Insertion Properties of the Novel Fluorophosphate Phases, $NaVPO_4F$ and $LiVPO_4F$", J. Electrochem. Soc., 2004, vol. 151, No. 10, pp. A1670-A1677.
Barker et al., "A Sodium-Ion Cell Based on the Fluorophosphate Compound $NaVPO_4F$", Electrochemical and Solid-State Letters, 2003, vol. 6, No. 1, pp. A1-A4.
Barker et al., "Electrochemical Insertion Properties of the Novel Lithium Vanadium Fluorophosphate, $LiVPO_4F$", Journal of The Electrochemical Society, 2003, vol. 150, No. 10, pp. A1394-A1398.
Basa et al., "Reaching the full capacity of the electrode material $Li_3FeF_6$ by decreasing the particle size to nanoscale", Journal of Power Sources, 2012, vol. 197, pp. 260-266.
Beard, "Polytetrafluoroethylene Characterized by XPS, with Monochromatic Al Source", Surface Science Spectra, vol. 2, No. 1, Jan. 1993, pp. 8-12.
Behl and Read, "A Study of Cobalt and Manganese Fluorides as Cathode Materials for Rechargeable Lithium Cells", ECS Transactions, 2012, vol. 41, Issue 41, pp. 97-106.
Benedek et al., "Theory of Overlithiation Reaction in $LiMO_2$ Battery Electrodes," Chem. Mater., 2006, vol. 18, pp. 1296-1302.
Berg et al., "A Study of the Volatile Characteristics of Various Metal β-Diketone Chelates", J. Phys. Chem., Apr. 1960, vol. 64, pp. 487-490.
Bervas et al. "Investigation of the Lithiation and Delithiation Conversion Mechanisms of Bismuth Fluoride Nanocomposites", Journal of the Electrochemical Society, 2006, vol. 153, No. 4, pp. A799-A808.
Bervas et al., "Bismuth fluoride nanocomposite as a positive electrode material for rechargeable lithium batteries", Electrochemical Solid-State Letters, 2005, available electronically Feb. 10, 2005, vol. 8, No. 4, pp. A179-A183.
Bervas et al., "Reversible conversion reactions with lithium in bismuth oxyfluoride nanocomposites", Journal of the Electrochemical Society, 2006, vol. 153, No. 1, pp. A159-A170.
Bettge et al., "Improving high-capacity $Li_{1.2}Ni_{0.15}Mn_{0.55}Co_{0.1}O_2$-based lithium-ion cells by modifiying the positive electrode with alumina," Journal of Power Sources, 2013, vol. 233, pp. 346-357.

(56) References Cited

OTHER PUBLICATIONS

Bhattacharya et al., "Prediction of Quaternary Spinel Oxides as Li-Battery Cathodes: Cation Site Preference, Metal Mixing, Voltage and Phase Stability," Journal of The Electrochemical Society, 161 (9), 2014, pp. A1440-A1446.

Blyr et al., "Self-Discharge of $LiMn_2O_4$/C Li-Ion Cells in Their Discharged State", J. Electrochem. Soc., Jan. 1998, vol. 145, No. 1, pp. 194-209.

Bobe et al., "Ion conductivity and diffusion in $ZrF_4$-based fluoride glasses containing LiF ($0 \leq LiF \leq 0.60$)", Journal of Non-Crystalline Solids, Jan. 1997, vol. 209, pp. 122-136.

Bohnke et al., "Electrochemical intercalation of lithium into the perovskite-type $NbO_2F$: influence of the $NbO_2F$ particle size", J Solid State Electrochem, 2001, vol. 5, pp. 1-7.

Brink et al., "Nonstoichiometric, Rutile-Type, Solid Solutions in the $Fe^{II}F_2$—$Fe^{III}OF$ System", Journal of Solid State Chemistry 161, 2001, pp. 31-37.

Brunton, "The crystal structure of $Na_3CrF_6$", Mat. Res. Bull., 1969, vol. 4, pp. 621-626.

Buntem et al., "Fluoride and Antimony-Doped Tin Oxide Film by Spray Pyrolysis", Advanced Materials Research, Aug. 22, 2008, vols. 55-57, pp. 513-516.

Cabana et al., "Beyond Intercalation-Based Li-Ion Batteries: The State of the Art and Challenges of Electrode Materials Reacting Through Conversion Reactions", Adv. Mater. 2010, vol. 22, pp. E170-E192.

Cabrera et al., "Theory of the Oxidation of Metals", 1949 Rep. Prog. Phys. 12, pp. 163-185; (http://iopscience.iop.org/0034-4885/12/1/308).

Caldin et al., "Kinetics and Thermodynamics of the Complex-formation of Nickel(II) and Cobalt(II) Ions with Ammonia and Pyridine-2-azodimethylaniline in Water, at Pressures from 1 bar to 2 kbar," Journal of The Chemical Society, Faraday Transactions 1, vol. 68, 1972, pp. 2247-2258.

Camardese et al., "Synthesis of Spherical Core-Shell $Ni(OH)_{2-Niii2}Mnii_2(OH)_2$ Particles via a Continuously Stirred Tank Reactor," Journal of The Electrochemical Society, 161 (6), 2014, pp. A890-A895.

Cheng et al., "Enhanced Cycleabity in Lithium Ion Batteries: Resulting from Atomic Layer Depostion of $Al_2O_3$ or $TiO_2$ on $LiCoO_2$ Electrodes," J. Phys. Chem. C, 2012, vol. 116, pp. 7629-7637.

Chevrier et al. "First-Principles Study of Iron OxyFluorides and Lithiation of FeOF", Physical Review B 87, 094118, Mar. 29, 2013, pp. 094118-1 through 094118-8.

Chiang et al., "High Capacity, Temperature-Stable Lithium Aluminum Manganese Oxide Cathodes for Rechargeable Batteries," Electrochemical and Solid-State Letters, 1999, vol. 2, No. 3, pp. 107-110.

Chiba et al., "$Na_xLi_{0.7-x}Ni_{1-y}Mn_yO_2$ as a new positive electrode material for lithium-ion batteries," Journal of Power Sources, 2016, vol. 311, pp. 103-110.

Cho, Jaephil et al., "A Breakthrough in the Safety of Lithium Secondary Batteries by Coating the Cathode Material with $AlPO_4$ Nanoparticles," Angew. Chem. Int. Ed. 2003, vol. 42, pp. 1618-1621.

Cho, Woosuk et al., "Improved electrochemical and thermal properties of nickel rich $LiNi_{0.5}Co_{0.2}Mn_{0.2}O_2$ cathode materials by $SiO_2$ coating," Journal of Power Sources, 282, 2015, pp. 45-50.

Cho, Yonghyun et al., "A New Type of Protective Surface Layer for High-Capacity Ni-Based Cathode Materials: Nanoscaled Surface Pillaring Layer," Nano Lett., 2013, 13, pp. 1145-1152.

Cho, Yonghyun et al., Supporting Information "New Type of Protective Surface Layer for High-Capacity Ni-Based Cathode Materials: Nanoscaled Surface Pillaring Layer," Nano Lett., 2013, vol. 13, 16 pages.

Choi et al., "Factors Influencing the Layered to Spinel-like Phase Transition in Layered Oxide Cathodes," Journal of The Electrochemical Society, 2002, 149 (9), pp. A1157-A1163.

Choi et al., "Investigation of the Irreversible Capacity Loss in the Layered $LiNi_{1/3}Mn_{1/3}Co_{1/3}O_2$ Cathodes," Electrochemical and Solid-State Letters, 8 (8), 2005, pp. C102-C105.

Chung et al., "Comparative studies between oxygen-deficient $LiMn_2O_4$ and Al-doped $LiMn_2O_4$," Journal of Power Sources, vol. 146, 2005, pp. 226-231.

Claims pending in Chinese Patent Application No. 201310302774.5 when Office action and Search Report of Chinese Application No. 201310302774.5 mailed; 7 pages.

Clause et al., "Preparation and Characterization of Nickel-Aluminum Mixed Oxides Obtained by Thermal Decomposition of Hydrotalcite-Type Precursors," Journal of Catalysis, 1992, vol. 133, pp. 231-246.

Conry et al., "Structural Underpinnings of the Enhanced Cycling Stability upon Al-Substitution in $LiNi_{0.45}Mn_{0.45}Co_{0.1-y}Al_yO_2$ Positive Electrode Materials for Li-ion Batteries," Chem. Mater. 2012, 24, pp. 3307-3317.

Cordier et al., Synthesis and characterization of the novel $Nb_3O_5F_5$ niobium oxyfluoride: the term n=3 of the $NbnO_{2n-1}F_{n+2}$ series, Journal of Solid State Chemistry, 2004, vol. 177, No. 9, pp. 3119-3126.

Cosandey et al., "Fe valence determination and Li elemental distribution in lithiated $FeO_{0.7}F_{1.3}$/C nanocomposite battery materials by electron energy loss spectroscopy (EELS)", Micron, 2012, vol. 43, pp. 22-29.

Cosandey et al., "EELS spectroscopy of iron fluorides and $FeF_x$/C nanocomposite electrodes used in Li-ion batteries", Microsc. Microanal., 2007, vol. 13, pp. 87-95; DOI: 10.1017/S1431927607070183.

Courtney et al., "Electrochemical and In Situ X-Ray Diffraction Studies of the Reaction of Uthium with Tin Oxide Composites", J Electrochem. Soc., Jun. 1997, vol. 144, No. 6, pp. 2045-2051.

Croft et al., "The crystallography of $Na_3FeF_6$", Mat. Res. Bull., 1968, vol. 3, pp. 571-575.

Croguennec et al, Synthesis of "$Li_{1.1}(Ni_{0.425}Mn_{0.425}Co_{0.15})_{0.9}O_{1.8}F_{0.2}$ materials by different routes: Is there fluorine substitution for oxygen?", Journal of The Electrochemical Society, 2009, vol. 156, No. 5, pp. A349-A355.

Cui et al. "Electrochemical Properties of $MnF_2$ Films Fabricated by Pulsed Laser Deposition," Journal of Inorganic Materials, 2010, 25(2), pp. 145-150. Abstract in English on the first page.

Cui et al. "The Investigation on Electrochemical Reaction Mechanism of $CuF_2$ Thin Film with Lithium", Electrochimica Acta, 2011, vol. 56, pp. 2328-2335.

Dahn et al., "Mechanisms for Lithium Insertion in Carbonaceous Materials", Science, Oct. 27, 1995, vol. 270, pp. 590-593.

De Dea et al., "Growth of magnetic thin films using $CO_2$ RESS expansions", J. of Supercritical Fluids, 2007, vol. 42, pp. 410-418.

Deabart et al., "Reactivity of transition metal (Co, Ni, Cu) sulphides versus lithium: The intriguing case of the copper sulphide", Solid State Sciences, 2006, vol. 8, No. 6, pp. 640-651.

Debart et al., "A Transmission Electron Microscopy Study of the Reactivity Mechanism of Tailor-Made CuO Particles toward Lithium", Journal of The Electrochemical Society, 2001, vol. 148, No. 11. pp. A1266-A1274.

Definition of coextensive (www.dictionary.com) (Feb. 20, 2017).

Definition of overlap (www.dictionary.com) (Feb. 20, 2017).

Delmas et al. "Layered Li(Ni, M)$O_2$ Systems as the Cathode Material in Lithium-Ion Batteries," MRS Bulletin, Aug. 2002, pp. 608-612.

Deng et al., "Influence of Cationic Substitutions on the Oxygen Loss and Reversible Capacity of Lithium-Rich Layered Oxide Cathodes," J. Phys. Chem. C, 2011, 115, pp. 7097-7103.

Deng et al., "Nanostructured Lithium Nickel Manganese Oxides for Lithium-Ion Batteries," Journal of The Electrochemical Society, 157 (4), 2010, pp. A447-A452.

Deokate et al., "Spray deposition of highly transparent fluorine doped cadmium oxide thin films", Applied Surface Science, 2008, vol. 254, No. 7, pp. 2187-2195.

Doan et al., "Recent developments in synthesis of $xLi_2MnO_3 \cdot (1-x)LiMO_2$ (M=Ni, Co, Mn) cathode powders for high-energy lithium rechargeable batteries," Frontiers in Energy Research, Sep. 2014, vol. 2, Article 36, 7 pages.

(56) References Cited

OTHER PUBLICATIONS

Doe et al. "First Principles Study of Li-Bi-F Phase Diagram and Bismuth Fluoride Conversion Reactions with Lithium", Electrochemical and Solid State Letters, 2009, vol. 12, No. 7, pp. A125-A128.
Doe et al., "First-Principles Investigation of the Li—Fe—F Phase Diagram and Equilibrium and Nonequilibrium Conversion Reactions of Iron Fluorides with Lithium", Chem. Mater., 2008, vol. 20, No. 16, pp. 5274-5283.
Dou, Shumei, "Review and prospect of layered lithium nickel manganese oxide as cathode materials for Li-ion batteries," J Solid State Electrochem (2013) 17, pp. 911-926.
Du et al., "Fluorine-doped $LiNi_{0.5}Mn_{1.5}O_4$ for 5 V cathode materials of lithium-ion battery", Materials Research Bulletin, 2008, vol. 43, No. 12, pp. 3607-3613.
Du et al., "High-Resolution $^{19}F$ MAS and $^{19}F$-$^{113}Cd$ REDOR NMR Study of Oxygen/Fluorine Ordering in Oxyfluorides", Journal of Solid State Chemistry, 1998, vol. 140, No. 2, pp. 285-294.
Dugat et al., "Crystal Structures of $Li_4ZrF_5$ and $Li_3Zr_4Fi_9$ and Reinvestigation of the $LiF-ZrF_4$Phase Diagram", Journal of Solid State Chemistry, Nov. 15, 1995, vol. 120, pp. 187-196.
Dyatkin et al., "The Acidic Properties of Fluorine-Containing Alcohols, Hydroxylamines and OximeS," Tetrahedron, 1965, vol. 21, pp. 2991-2995.
El Mofid et al., "A high performance layered transition metal oxide cathode material obtained by simultaneous aluminum and iron cationic substitution," Journal of Power Sources, 2014, vol. 268, pp. 414-422.
Ellis et al., "A multifunctional 3.5 V iron-based phosphate cathode for rechargeable batteries", Nature Materials, Oct. 2007, vol. 6, pp. 749-753.
Ellis et al., Crystal Structure and Electrochemical Properties of $A_2MPO_4F$ Fluorophosphates (A = Na, Li; M = Fe, Mn, Co, Ni), Chem. Mater., 2010, vol. 22, No. 3, pp. 1059-1070.
Eom et al., "Dependence of Electrochemical Behavior on Concentration and Annealing Temperature of $Li_xCoPO_4$ Phase-Grown $LiNi_{0.8}Co_{0.16}Al_{0.04}O_2$ Cathode Materials," Journal of The Electrochemical Society, 155 (3), 2008, pp. A228-A233.
Extended European Search Report dated Apr. 14, 2015 for European Application No. 14169514.8, 6 pages.
Extended European Search Report dated Aug. 29, 2017 for European application No. 15754790.2; 8 pages.
Ezema et al., "Optical Properties of Chemical Bath Deposited Bismuth Fluoride (Bif3) Thin Films", Discovery and Innovation, vol. 19 (1), 2007, pp. 33-36.
Fiordiponti et al., "Nonaqueous Batteries with $BiF_3$ Cathodes", Journal of The Electrochemical Society, Apr. 1978, vol. 125, No. 4, pp. 511-515.
Fu et al., "Electrochemical Reaction of Lithium with Cobalt Fluoride Thin Film Electrode", Journal of the Electrochemical Society, 2005, vol. 152, No. 2, pp. E50-E55.
Fu et al., "Nickel-Rich Layered Microspheres Cathodes: Lithium/Nickel Disordering and Electrochemical Performance" ACS Appl. Mater. Interfaces, 2014, vol. 6, No. 18, pp. 15822-15831.
Fu et al., "Electrochemical Reactions of Lithium with Transition Metal Nitride Electrodes", J. Phys. Chem. B, 2004, vol. 108, No. 7, pp. 2236-2244.
Fu et al., "The Electrochemical Reaction of Zinc Oxide Thin Films with Lithium", J. Electrochemical Society, Jun. 2003, vol. 150, No. 6, pp. A714-A720.
Fu, Xian-Zhu et al., "Nickel oxyhydroxides with various oxidation states prepared by chemicaloxidation of spherical 13-$Ni(OH)_2$," Solid State Ionics, vol. 178, 2007, pp. 987-993.
Gallagher et al., "Correlating hysteresis and voltage fade in lithium- and manganese-rich layered transition-metal oxide electrodes," Electrochemistry Communications, vol. 33, 2013, pp. 96-98.
Ghosh et al., "Electrical conductivity and conductivity relaxation in mixed alkali fluoride glasses", Solid State Ionics, accepted Mar. 28, 2002, vol. 149, pp. 67-72.
Ghosh et al., "Ion dynamics and mixed mobile ion effect in fluoride glasses", Journal of Applied Physics, Jun. 21, 2005, vol. 97, pp. 123525-1 through 123525-5.
Gillot et al., "Electrochemical Reactivity and Design of $NiP_2$ Negative Electrodes for Secondary Li-Ion Batteries", Chemistry of Materials, American Chemical Society, Dec. 13, 2005, vol. 17, No. 25, pp. 6327-6337.
Glaeser et al., "The Kinetics of Ammonia Exchange between Nickel Ammine Complexes and Ammonia in Aqueous and Anhydrous Ammonia Solutions Measured by Nuclear Magnetic Resonance of Nitrogen-14", Inorganic Chemistry, vol. 4, No. 2, Feb. 1965, pp. 206-208.
Gmitter, A. J., et al. "Electrolyte Development for Improved Cycling Performance of Bismuth Fluoride Nanocomposite Positive Electrodes", Journal of Power Sources, vol. 217, 2012, pp. 21-28.
Gmitter, A. J., et al. "Formation, Dynamics, and Implication of Solid Electrolyte Interphase in High Voltage Reversible Conversion Fluoride Nanocomposites", Journal of Materials Chemistry, vol. 20, No. 20, May 28, 2010, pp. 4149-4161.
Gocheva et al., "Direct Synthesis of Cryolite Type $Li_3FeF_6$ and Its Characterization as Positive Electrode in Li Cell", Engineering Sciences Reports, Kyushu University, vol. 31, No. 1, pp. 7-11.
Gocheva et al., "Mechanochemical synthesis of $NaMF_3$ (M = Fe, Mn, Ni) and their electrochemical properties as positive electrode materials for sodium batteries", Journal of Power Sources, 2009, vol. 187, pp. 247-252.
Gonzalo et al., "On the room temperature synthesis of monoclinic $Li_3FeF_6$: A new cathode material for rechargeable lithium batteries", Journal of Power Sources, 2010, vol. 195, pp. 4990-4996.
Gopalakrishnan, "Chimie Douce Approaches to the Synthesis of Metastable Oxide Materials," Chemistry of Materials, vol. 7, No. 7, Jul. 1995, pp. 1265-1275.
Gover et al., "The electrochemical insertion properties of sodium vanadium fluorophosphate, $Na_3$ $V_2(PO_4)_2F_3$", Solid State Ionics, 2006, vol. 177, pp. 1495-1500.
Grosvenor et al., "Use of QUASES™/XPS measurements to determine the oxide composition and thickness on an iron substrate", Surface and Interface Analysis, 2004, vol. 36, pp. 632-639.
Grugeon et al., Particle Size Effects on the Electrochemical Performance of Copper Oxides toward Lithium, Journal of The Electrochemical Society, 2001, vol. 148, No. 4, pp. A285-A292.
Grungeon et al., "An update on the reactivity of nanoparticles Co-based compounds towards Li", Solid State Sciences, 2003, vol. 5, No. 6, pp. 895-904.
Gummow et al., "Improved capacity retention in rechargeable 4 V lithium/lithium manganese oxide (spinel) cells", Solid State Ionics, 1994, vol. 69, pp. 59-67.
Gummow, R J et al., "Lithium Extraction From Orthorhombic Lithium Manganese Oxide and the Phase Transformation to Spinel," Mat. Res. Bull., vol. 28, 1993, pp. 1249-1256.
Gummow, R.J. et al., "Improved capacity retention in rechargeable 4 V lithium/lithiummanganese oxide (spine!) cells," Solid State Ionics, vol. 69, 1994, pp. 59-67.
Gutierrez, A. et al., "Understanding the Effects of Cationic and Anionic Substitutions in Spinel Cathodes of Lithium-Ion Batteries," Journal of The Electrochemical Society, 160 (6), 2013, pp. A901-A905.
Hagenmuller et al., Mineral Chemistry—On two new phases of the silicon-sodium system, C. R. Acad. Sc. Paris, vol. 260, No. 18, May 3, 1965, Group 8, pp. 4764-4767 with an English machine translation.
Han, Ah Reum et al., "Soft Chemical Dehydration Route to Carbon Coating of Metal Oxides: Its Application for Spinel Lithium Manganate," J. Phys. Chem. C, 2007, vol. 111, pp. 11347-11352.
Hang et al., "Effect of binder content on the cycle performance of nano-sized $Fe_2O_3$-loaded carbon for use as a lithium battery negative electrode", Journal of Power Sources, 2008, vol. 178, pp. 402-408.
Hang et al., "Effect of carbonaceous materials on electrochemical properties of nano-sized $Fe_2O_3$-loaded carbon as a lithium battery negative electrode", Journal of Power Sources, 2007, vol. 174, pp. 493-500.

(56) References Cited

OTHER PUBLICATIONS

Hang et al., "Electrochemical properties of nano-sized $Fe_2O_3$-loaded carbon as a lithium battery anode", Journal of Power Sources, Oct. 27, 2006, vol. 161, pp. 1281-1287.

Hayashi, N. et al., "Cathode of $LiMg_yMn_{2-y}O_4$ and $LiMg_yMn_{2-y}O_{4-s}$ Spinel Phases for Lithium Secondary Batteries," Journal of The Electrochemical Society, 146 (4), 1999, pp. 1351-1354.

He et al., "Improved electrochemical performances of nanocrystalline $Li[Li_{0.2}Mn_{0.54}Ni_{0.13}Co_{0.13}]O_2$ cathode material for Li-ion batteries" RSC Advances, 2012, vol. 2, pp. 3423-3429.

He et al., "Synthesis of $LiNi_{1/3}Co_{1/3}Mn_{1/3}O_{2-z}F_z$ cathode material from oxalate precursors for lithium ion battery", Journal of Fluorine Chemistry, 2007, vol. 128, pp. 139-143.

Hirasawa et al., "In Situ Electrochemical Atomic Force Microscope Study on Graphite Electrodes", J. Electrochem. Soc., Apr. 1997, vol. 144, No. 4, pp. L81-L84.

Hong, Jihyun et al., "Critical Role of Oxygen Evolved from Layered Li-excess Metal Oxides in Lithium Rechargeable Batteries," Chem. Mater., 2012, 24 (14), pp. 2692-2697.

Hosono et al., "Fabrication of Nanoparticulate Porous LaOF Films through Film Growth and Thermal Decomposition of Ion-Modified Lanthanum Diacetate Hydroxide", Langmuir, 2004, vol. 20, No. 9, pp. 3769-3774.

Hou, Peiyu et al., "A high energy density Li-rich positive-electrode material with superior performances via a dual chelating agent co-precipitation route," J. Mater. Chem. A, 2015, vol. 3, pp. 9427-9431.

Hou, Peiyu et al., *Supporting Information* "A high energy density Li-rich positive-electrode material with superior performances via a dual chelating agent co-precipitation route," J. Mater. Chem. A, 2015, vol. 3, 11 pages.

Hua, Chuanshan et al., "Study of full concentration-gradient $Li(Ni_{0.8}Co_{0.1}Mn_{0.1})O_2$ cathode material for lithium ion batteries," Journal of Alloys and Compounds, vol. 614, 2014, pp. 264-270.

Hua, Weibo et al., "Na-doped Ni-rich $LiNi_{0.5}Co_{0.2}Mn_{0.3}O_2$ cathode material with both high rate capability and high tap density for lithium ion batteries," Dalton Trans., 2014, vol. 43, pp. 14824-14832.

Hwang et al., "Influence of Mn content on the morphology and electrochemical performance of $LiNi_{1-x-y}Co_xMn_yO_2$ cathode materials" J. Mater. Chem., 2003, vol. 13, pp. 1962-1968.

Hwang et al., "Investigation of Changes in the Surface Structure of $Li_xNi_{0.8}Co_{0.15}Al_{0.05}O_2$ Cathode Materials Induced by the Initial Charge," Chem. Mater. 2014, vol. 26, pp. 1084-1092.

Hwang et al., "Using Real-Time Electron Microscopy To Explore the Effects of Transition-Metal Composition on the Local Thermal Stability in Charged $Li_xNi_yMn_zCo_{1-y-z}O_2$ Cathode Materials," Chem. Mater., 2015, 27, pp. 3927-3935.

Hy, Sunny et al., "Understanding the Role of Ni in Stabilizing the Lithium-Rich High-Capacity Cathode Material $Li[Ni_xLi_{(1-2x)/3}Mn_{(2-x)/3}]O_2$ ($0 \le x \le 0.5$)," Chem. Mater. 2014, 26, pp. 6919-6927.

Inoue et al., "An Investigation of Capacity Fading of Manganese Spinels Stored at Elevated Temperature", J. Electrochem. Soc., Nov. 1998, vol. 145, No. 11, pp. 3704-3707.

International Search Report and Written Opinion dated Mar. 4, 2016 in PCT/US2015/067387, 19 pages.

International Search Report and Written Opinion dated May 29, 2015 in PCT/US2015/17584, 20 pages.

Irving, H. et al., "The Stability of Transition-metal Complexes," Journal of the Chemical Society, Issue 0, 1953, pp. 3192-3210.

Jang et al., "Dissolution of Spinel Oxides and Capacity Losses in 4 V $Li/Li_xMn_2O_4$ Cells", J. Electrochem. Soc., Jul. 1996, vol. 143, No. 7, pp. 2204-2211.

Jarvis, Karalee A. et al., "Atomic Structure of a Lithium-Rich Layered Oxide Material for Lithium-Ion Batteries: Evidence of a Solid Solution", Chem. Mater., 2011, vol. 23, pp. 3614-3621.

Jiang et al., "Sol-gel preparation and electrochemical properties of $Na_3V_2(PO_4)_2F_3/C$ composite cathode material for lithium ion batteries", Journal of Alloys and Compounds, 2009, vol. 478, pp. 604-607.

Johnson et al. "Advanced $FeF_3$ Cathode Enabled Lithium-ion Battery", SAE International Journal of Aerospace, Apr. 2009, vol. 1, No. 1, pp. 1018-1023.

Johnson et al. "Structural and electrochemical studies of a-manganese dioxide($\alpha$-$MnO_2$)" Journal of Power Sources, vol. 68, (1997), pp. 570-577.

Johnson et al., "Structural Characterization of Layered $Li_xNi_{0.5}Mn_{0.5}O_2$ ($0 \le x \le 2$) Oxide Electrodes for Li Batteries," Chem. Mater. 2003, vol. 15, pp. 2313-2322.

Johnson et al., "Synthesis, Characterization and Electrochemistry of Lithium Battery Electrodes: $xLi_2MnO_3 \cdot (1-x)LiMn_{0.333}Ni_{0.333}Co_{0.333}O_2$ ($0 \le x \le 0.7$)," Chem. Mater. 2008, vol. 20, pp. 6095-6106.

Johnson et al., "The role of $Li_2MO_2$ structures (M=metal ion) in the electrochemistry of $(x)LiMn_{0.5}Ni_{0.5}O_2 \cdot (1-x)Li_2TiO_3$ electrodes for lithium-ion batteries," Electrochemistry Communications, vol. 4, 2002, pp. 492-498.

Jouanneau et al., "Preparation, Structure, and Thermal Stability of New $Ni_xCo_{1-2x}Mn_x(OH)_2$ ($0 \le x \le 1/2$) Phases," Chem. Mater., vol. 15, No. 2, 2003 pp. 495-499.

Ju et al., "Optimization of Layered Cathode Material with Full Concentration Gradient for Lithium-Ion Batteries," J. Phys. Chem. C, 2014, vol. 118, pp. 175-182.

Kam et al., "Aliovalent titanium substitution in layered mixed Li Ni—Mn—Co oxides for lithium battery applications," J. Mater. Chem., 2011, vol. 21, pp. 9991-9993.

Kam, Kinson C. et al., "Electrochemical and Physical Properties of Ti-Substituted Layered Nickel Manganese Cobalt Oxide (NMC) Cathode Materials," Journal of The Electrochemical Society, 159 (8), 2012, pp. A1383-A1392.

Kang et al., "Effects of Li Content on Structure and Electrochemical Properties of $Li_{1+x}(Ni_{0.5}Mn_{0.5})_{1-x}O_2$ ($0 \le x \le 0.15$) Electrodes in Lithium Cells (1.0-4.8 V)," Journal of The Electrochemical Society, 154 (4), 2007, pp. A268-A274.

Kang et al., "Enhancing the rate capability of high capacity $xLi_2MnO_3 \cdot (1-x)LiMO_2$ (M = Mn, Ni, Co) electrodes by Li—Ni—$PO_4$ treatment," Electrochemistry Communications, vol. 11, 2009, pp. 748-751.

Kang et al., "First-cycle irreversibility of layered Li—Ni—Co—Mn oxide cathode in Li-ion batteries," Electrochimica Acta, vol. 54, 2008, pp. 684-689.

Kang et al., "Investigating the first-cycle irreversibility of lithium metal oxide cathodes for Li batteries," J Mater Sci, 2008, vol. 43, pp. 4701-4706.

Kang et al., "The Effects of Acid Treatment on the Electrochemical Properties of 0.5 $Li_2MnO_3 \cdot 0.5$ $LiNi_{0.44}Co_{0.25}Mn_{0.31}O_2$ Electrodes in Lithium Cells," Journal of The Electrochemical Society, 153 (6), 2006, pp. A1186-A1192.

Kang, Kisuk et al., "Electrodes with High Power and High Capacity for Rechargeable Lithium Batteries," Science, vol. 311, Feb. 17, 2006, pp. 977-980.

Kang, Kisuk et al., "Factors that affect Li mobility in layered lithium transition metal oxides," Physical Review B, vol. 74, 2006, pp. 094105-1-094195-7.

Kar et al., "Synthesis and Characterization of Pure and Fluorine Doped Tin-Oxide Nano-Particles by Sol-Gel Methods", International Journal of Science and Research (IJSR), vol. 4, No. 1, Jan. 2015, pp. 530-533. ISSN (Online): 2319-7064, Index Copernicus Value (2013): 6.14 | Impact Factor (2013): 4.438.

Karden et al., "Energy storage devices for future hybrid electric vehicles", Journal of Power Sources, 2007, vol. 168, pp. 2-11.

Kasrai et al., "Electronic structure of iron(II) and (III) fluorides using X-ray emission and X-ray photoelectron spectroscopies", J. Chem. Soc., Faraday Transactions II, 1979, 75, pp. 1522-1531.

Kempton et al., "Vehicle-to-grid power fundamentals: Calculating capacity and net revenue", Journal of Power Sources, 2005, vol. 144, pp. 268-279.

Kestner et al., "An Experimental and Modeling Analysis of Vapor Transport Deposition of Cadmium Telluride", Solar Energy Materials & Solar Cells, 2004, vol. 83, pp. 55-65.

Kim et al., "Fabrication of $FeF_3$ Nanoflowers on CNT Branches and Their Application to High Power Lithium Rechargeable Batteries", Advanced Materials, 2010, vol. 22, pp. 5260-5264.

(56) References Cited

OTHER PUBLICATIONS

Kim et al., "Carbon nanotube-amorphous FePO$_4$ core-shell nanowires as cathode material for Li ion batteries", Chem. Commun., 2010, vol. 46, pp. 7409-7411; DOI: 10.1039/c0cc02524k.

Kim et al., "Design of Nickel-rich Layered Oxides Using d Electronic Donor for Redox Reactions," Chem. Mater. 2015, vol. 27, pp. 6450-6456.

Kim, Chunjoong et al., "Stabilization of Battery Electrode/Electrolyte Interfaces Employing Nanocrystals with Passivating Epitaxial Shells," Chem. Mater. 2015, 27, pp. 394-399.

Kim, H.-J. et al., "Coprecipitation and Characterization of Nickel-Cobalt-Manganese Hydroxides Precursor for Battery Cathode Materials," Abstract #849, 224th ECS Meeting, 2013 The Electrochemical Society, 1 page.

Kim, Hyun-Soo et al., "Enhanced electrochemical properties of LiNi$_{1/3}$Co$_{1/3}$Mn$_{1/3}$O$_2$ cathode material by coating with LiAlO$_2$ nanoparticles," Journal of Power Sources, 161, 2006, pp. 623-627.

Kim, Jeom-Soo et al., "Electrochemical and Structural Properties of xLi$_2$M'O$_3$·(1-x)LiMn$_{0.5}$Ni$_{0.5}$O$_2$ Electrodes for Lithium Batteries (M'= Ti, Mn, Zr; $0 \leq x \leq 0.3$)," Chem. Mater. 2004, 16, pp. 1996-2006.

Kim, Ji Woo et al., "Unexpected high power performance of atomic layer deposition coated Li[Ni$_{1/3}$Mn$_{1/3}$Co$_{1/3}$]O$_2$ cathodes," Journal of Power Sources, 254, 2014, pp. 190-197.

Kita et al., "Magnetic Properties of Fe/fluorides (CaF$_2$, LiF) Multilayered Thin Films", Journal of Magnetism and Magnetic Materials, 1992, vol. 117, pp. 294-300, North-Holland.

Kong et al., "Multivalent Li-Site Doping of Mn Oxides for Li-Ion Batteries," J. Phys. Chem. C, 2015, vol. 119, pp. 21904-21912.

Kosova, N.V. et al., "Mixed layered Ni—Mn—Co hydroxides: Crystal structure, electronic state of ions, and thermal decomposition," Journal of Power Sources 174, 2007, pp. 735-740.

Kosova, N.V. et al., "Optimization of Ni$^{2+}$/Ni$^{3+}$ ratio in layered Li(Ni,Mn,Co)O$_2$ cathodes for better electrochemistry," Journal of Power Sources, 174, 2007, pp. 965-969.

Kovanda, František et al., "Mixed oxides obtained from Co and Mn containing layered double hydroxides: Preparation, characterization, and catalytic properties," Journal of Solid State Chemistry, vol. 179, 2006, pp. 812-823.

Kovanda, František et al., "Thermal behaviour of Ni—Mn layered double hydroxide and characterization of formed oxides," Solid State Sciences, vol. 5, 2003, pp. 1019-1026.

Kowalczyk et al., "X-ray photoelectron spectroscopic studies of the electronic structure of transition-metal difluorides", Physical Review B, May 15, 1977, vol. 15, No. 10, pp. 4997-5002.

Koyama et al., "New Fluoride Cathodes for Rechargeable Lithium Batteries", J. Electrochemical Society, Oct. 2000, vol. 147, No. 10, pp. 3633-3636.

Koyama, Yukinori et al., "Crystal and electronic structures of superstructural Li$_{1-x}$[Co$_{1/3}$Ni$_{1/3}$Mn$_{1/3}$]O$_2$ ($0 \leq x \leq 1$)," Journal of Power Sources, 119-121, 2003, pp. 644-648.

Labar, "ProcessDiffraction": A computer program to process electron diffraction patterns from polycrystalline or amorphous samples, EUREM 12, Brno, Czech Republic, Jul. 9-14, 2000, pp. 1379-1380.

Laruelle et al., "On the Origin of the Extra Electrochemical Capacity Displayed by MO/Li Cells at Low Potential", J. Electrochem. Soc., 2002, vol. 149, No. 5, pp. A627-A634.

Lee et al., "Conversion mechanism of nickel fluoride and NiO-doped nickel fluoride in Li ion batteries", Electrochimica Acta 59, 2012, pp. 213-221.

Lee et al., "High capacity Li[Li$_{0.2}$Ni$_{0.2}$Mn$_{0.6}$]O$_2$ cathode materials via a carbonate co-precipitation method," Journal of Power Sources 162, 2006, pp. 1346-1350.

Lee et al., "Low-temperature atomic layer deposited Al$_2$O$_3$ thin film on layer structure cathode for enhanced cycleability in lithium-ion batteries," Electrochimica Acta 55, 2010, pp. 4002-4006.

Lee et al., "Synthetic optimization of Li[Ni$_{1/3}$Co$_{1/3}$Mn$_{1/3}$]O$_2$ via co-precipitation," Electrochimica Acta, vol. 50, 2004, pp. 939-948.

Li et al. "A Mesoporous Iron-Based Fluoride Cathode of Tunnel Structure for Rechargeable Lithium Batteries", Advanced Functional Materials, 2011, vol. 21, pp. 1391-1397.

Li et al. "High-Capacity Lithium-Ion Battery Conversion Cathodes Based on Iron Fluoride Nanowires and Insights into the Conversion Mechanism", Nano Letters, vol. 12 (11), pp. 6030-6037.

Li et al. "Low-Temperature Ionic-Liquid-Based Synthesis of Nanostructured Iron-Based Fluoride Cathodes for Lithium Batteries", Advanced Materials, 2010, vol. 22, pp. 3650-3654.

Li et al. "Reversible Three-Electron Redox Behaviors of FeF$_3$ Nanocrystals as High-Capacity Cathode-Active Materials for Li-Ion Batteries", Journal of Physical Ghemistry C, Feb. 25, 2010, vol. 114, Issue 7, pp. 3190-3195.

Li et al. "Structural and Electronic Properties of Li-Ion Battery Cathode Material FeF$_3$", The Journal of Physical Ghemistry G, 2010, vol. 114(39), p. 16813-16817.

Li et al., "Carbon Nanotube Wiring of Electrodes for High-Rate Lithium Batteries Using an Imidazolium-Based Ionic Liquid Precursor as Dispersant and Binder: A Case Study on Iron Fluoride Nanoparticles", ACS Nano, 2011, vol. 5, No. 4, pp. 2930-2938.

Li et al., "Li-Storage via Heterogeneous Reaction in Selected Binary Metal Fluorides and Oxides", Journal of Electrochemical Society, 2004, accepted Oct. 21, 2003, vol. 151, No. 11, pp. A1878-A1885.

Li et al., "Reversible formation and decomposition of LiF clusters using transition metal fluorides as precursors and their application in rechargeable Li batteries," Advanced Materials, May 2, 2003, vol. 15, No. 9, pp. 736-739.

Li et al., "Electrochemical performance of SrF$_2$-coated LiNi$_{1/3}$Co$_{1/3}$Mn$_{1/3}$O$_2$ cathode materials for Li-ion batteries", Journal of Power Sources, 2009, vol. 190, pp. 149-153.

Li et al., "Improve First-Cycle Efficiency and Rate Performance of Layered-Layered Li$_{1.2}$Mn$_{0.6}$Ni$_{0.2}$O$_2$ Using Oxygen Stabilizing Dopant," ACS Appl. Mater. Interfaces, 2015, 7, pp. 16040-16045.

Li et al., "Synthesis and Characterization of the Lithium-Rich Core-Shell Cathodes with Low Irreversible Capacity and Mitigated Voltage Fade," Chem. Mater. 2015, 27, pp. 3366-3377.

Li, Y. et al., "Understanding Long-Term Cycling Performance of Li$_{1.2}$Ni$_{0.15}$Mn$_{0.55}$Co$_{0.1}$O$_2$-Graphite Lithium-Ion Cells," Journal of The Electrochemical Society, 160 (5), 2013, pp. A3006-A3019.

Li, Zheng et al., "Stability and Rate Capability of Al Substituted Lithium-Rich High-Manganese Content Oxide Materials for Li-Ion Batteries," Journal of The Electrochemical Society, 159 (2), 2012, pp. A116-A120.

Liang, Jianbo et al., "Topochemical Synthesis, Anion Exchange, and Exfoliation of Co—Ni Layered Double Hydroxides: A Route to Positively Charged Co—Ni Hydroxide Nanosheets with Tunable Composition," Chem. Mater. 2010, vol. 22, pp. 371-378.

Liao et al., "Combinatorially Prepared [LiF]$_{1-x}$Fe$_x$ Nanocomposites for Positive Electrode Materials in Li-Ion Batteries", Chemistry of Materials, 2008, vol. 20 (2), pp. 454-461.

Liao, Jin-Yun et al., "Surface-modified concentration-gradient Ni-rich layered oxide cathodes for high-energy lithium-ion batteries," Journal of Power Sources, vol. 282, 2015, pp. 429-436.

Lim, Jae-Hwan et al., "Electrochemical characterization of Li$_2$MnO$_3$—Li[Ni$_{1/3}$Co$_{1/3}$Mn$_{1/3}$]O$_{2-LiNiO2}$ cathode synthesized via co-precipitation for lithium secondary batteries," Journal of Power Sources, 189, 2009, pp. 571-575.

Lin, Feng et al., "Surface reconstruction and chemical evolution of stoichiometric layered cathode materials for lithium-ion batteries," Nature Communications 5:3529, doi: 10.1038/ncomms4529, 2014, pp. 1-9.

Liu et al. "Excellent Cycle Performance of Co-doped FeF$_3$/C Nanocomposite Cathode Material for Lithium-Ion Batteries", Journal of Materials Chemistry, 2012, Issue 22, pp. 17539-17550.

Liu et al. "Spherical nanoporous LiCoPO$_4$/C composites as high performance cathode materials for rechargeable lithium-ion batteries," J. Mater. Chem., 2011, 21, pp. 9984-9987.

Liu et al., "Carbon-coated high capacity layered Li[Li$_{0.2}$Mn$_{0.54}$Ni$_{0.13}$Co$_{0.13}$]O$_2$ cathodes," Electrochemistry Communications 12 (2010), pp. 750-753.

Liu et al., "Conductive Surface Modification with Aluminum of High Capacity Layered Li[Li$_{0.2}$Mn$_{0.54}$Ni$_{0.13}$Co$_{0.13}$]O$_2$ Cathodes," J. Phys. Chem. C 2010, 114, pp. 9528-9533.

(56) References Cited

OTHER PUBLICATIONS

Liu et al., "Electrochemical and In Situ Synchrotron XRD Studies on $Al_2O_3$-Coated $LiCoO_2$ Cathode Material", Journal of The Electrochemical Society, 2004, vol. 151 (9), pp. A1344-A1351.
Liu et al., "$Li_3V_2(PO_4)_3$-coated $Li_{1.17}Ni_{0.2}Co_{0.05}Mn_{0.58}O_2$ as the cathode materialswith high rate capability for Lithium ion batteries," Electrochimica Acta 147, 2014, pp. 696-703.
Liu et al., "Long cycle life lithium ion battery with lithium nickel cobalt manganese oxide (NCM) cathode," Journal of Power Sources, vol. 261, 2014, pp. 285-291.
Liu et al., "Nickel-Rich Layered Lithium Transitional-Metal Oxide for High-Energy Lithium-Ion Batteries," Angew. Chem. Int. Ed. 2015, vol. 54, pp. 4440-4458.
Liu et al., "Structure Evolution and Electrochemical Performance of $Al_2O_3$-coated $LiNi_{0.4}Co_{0.2}Mn_{0.4}O_2$ During Charge-discharge Cycling," Chem. Res. Chinese Universities 2012, 28(4), pp. 686-690.
Liu et al., "Study on the capacity fading of pristine and $FePO_4$ coated $LiNi_{1/3}Co_{1/3}Mn_{1/3}O_2$ by Electrochemical and Magnetical techniques," Electrochimica Acta 148, 2014, pp. 26-32.
Liu et al., "Understanding the Improvement in the Electrochemical Properties of Surface Modified 5 V $LiMn_{1.42}Ni_{0.42}Co_{0.16}O_4$ Spinel Cathodes in Lithium-ion Cells," Chem. Mater. 2009, 21, pp. 1695-1707.
Liu et al., Thermodynamics and Kinetics of the $Li/FeF_3$ Reaction by Electrochemical Analysis, The Journal of Physical Chemistry C, 2012, vol. 116(10), pp. 6467-6473.
Liu Zhaoping et al., "Synthesis, Anion Exchange, and Delamination of Co-Al Layered Double Hydroxide: Assembly of the Exfoliated Nanosheet/Polyanion Composite Films and Magneto-Optical Studies," J. Am. Chem. Soc., 2006, 128, pp. 4872-4880.
Liu Zhi-ming et al., "Preparation of $NaV_{1-x}Al_xPO_4F$ cathode materials for application of sodium-ion battery", Trans. Nonferrous Met. Soc. China 18, 2008, pp. 346-350.
Liu, H. et al., "Electrochemical performance of $LiFePO_4$ cathode material coated with $ZrO_2$ nanolayer," Electrochemistry Communications 10 (2008), pp. 165-169.
Luo et al., "Preparation of $Co_{1-z}Al_z(OH)_2(NO_3)_z$ Layered Double Hydroxides and $Li(Co_{1-z}Al_z)O_2$," Chem. Mater., 2009, vol. 21, pp. 56-62.
Luo, Wenbin et al., "Can Zr be Substituted for Co in $Co_{1-z}Zr_z(OH)_2$ and $LiCo_{1-z}Zr_zO_2$?," Journal of The Electrochemical Society, 158, (2), 2011, pp. A110-A114.
Luo, Wenbin et al., "Synthesis, Characterization, and Thermal Stability of $LiNi_{1/3}Mn_{1/3}Co_{1/3-z}Mg_zO_2$, $LiNi_{1/3-z}Mn_{1/3}Co_{1/3}Mg_zO_2$, and $LiNi_{1/3}Mn_{1/3-z}Co_{1/3}Mg_zO_2$," Chem. Mater., 2010, vol. 22, pp. 1164-1172.
Luo, Wenbin et al., "The Impact of Zr Substitution on the Structure, Electrochemical Performance and Thermal Stability of $Li[Ni_{1/3}Mn_{1/3-z}Co_{1/3}Zr_z]O_2$," Journal of The Electrochemical Society, 158 (4), 2011, pp. A428-A433.
Ma et al. "Atomistic Insights into the Gonversion Reaction in Iron Fluoride: A Dynamically Adaptive Force Field Approach", Journal of the Amerian Chemical Society, 2012, vol. 132, pp. 8205-8211.
Ma et al., "Structural and electrochemical behavior of $LiMn_{0.4}Ni_{0.4}Co_{0.2}O_2$," Journal of Power Sources, 2007, vol. 165, pp. 517-534.
Ma, D., et al. "Three-Dimensionally Ordered Macroporous $FeF_3$ and its in situ Homogeneous Polymerization Coating for High Energy and Power Density Lithium Ion Batteries", Energy & Environmental Science, 2012, vol. 5, pp. 8538-8542.
Ma, Jin et al., "A highly homogeneous nanocoating strategy for Li-rich Mn-based layered oxides based on chemical conversion," Journal of Power Sources, vol. 277, 2015, pp. 393-402.
Mains et al., "Phase Transitions in the $Na_3M_2(PO_4)_2F_3$ Family ($M=Al^{3+}$, $V^{3+}$, $Cr^{3+}$, $Fe^{3+}$, $Ga^{3+}$): Synthesis, Thermal, Structural, and Magnetic Studies", Journal of Solid State Chemistry, 1999, vol. 148, No. 2, pp. 260-277.
Makimura et al. "Electrochemical behavior of low temperature grown iron fluoride thin films", Electrochemistry Communications, 2006, vol. 8, pp. 1769-1774.
Makimura et al. "Pulsed Laser Deposited Iron Fluoride Thin Films for Lithium-Ion Batteries", Applied Surface Science, vol. 252, 2006, pp. 4587-4592.
Makimura et al., "Layered Lithium Vanadium Fluorophosphate, $Li_5V(PO_4)_2F_2$: A 4 V Class Positive Electrode Material for Lithium-Ion Batteries", Chem. Mater., 2008, vol. 20, pp. 4240-4248.
Makimura et al., "Lithium insertion material of $LiNi_{1/2}Mn_{1/2}O_2$ for advanced lithium-ion batteries," Journal of Power Sources, 119-121, 2003, pp. 156-160.
Malandrino et al, "Multifunctional cadmium single source precursor for the selective deposition of CdO or CdS by a solution route", Chem. Commun., 2005, pp. 5681-5683; DOI: 10.1039/b509623e.
Malandrino et al., "A Novel Diamine Adduct of Zinc Bis(2-thenoyl-trifluoroacetonate) as a Promising Precursor for MOCVD of Zinc Oxide Films", Inorganic Chemistry, 2005, vol. 44, No. 26, pp. 9684-9689.
Malini et al. "Conversion reactions: a new pathway to realise energy in lithium-ion battery—review", Ionics, 2009, vol. 15, pp. 301-307.
Mansour et al. "In Situ X-ray Absorption Spectroscopic Investigation of the Electrochemical Conversion Reactions of $CuF_2$-$MoO_3$ Nanocomposite", Journal of Solid State Chemistry, 2010, vol. 183, pp. 3029-3038.
Manthiram, "Materials Challenges and Opportunities of Lithium Ion Batteries," J. Phys. Chem. Lett., 2011, vol. 2, pp. 176-184.
Markus et al., "Computational and Experimental Investigation of Ti Substitution in $Li_1(Ni_xMn_xCo_{1-2x-y}Ti_y)O_2$ for Lithium Ion Batteries," J. Phys. Chem. Lett., 2014, vol. 5, pp. 3649-3655.
Massa et al., "Crystal structure of a new sodium vanadyl(IV) fluoride phosphate $Na_3\{V_2O_2F[PO4]_2\}$", Solid State Sciences, 2002, vol. 4, pp. 495-501.
Matsumoto et al., "Electronic structures of partially fluorinated lithium manganese spinel oxides and their electrochemical properties", Journal of Power Sources, 2009, vol. 189, pp. 599-601.
McCalla et al., "Formation of Layered-Layered Composites in the Li—Co—Mn Oxide Pseudoternary System during Slow Cooling," Chem. Mater. 2013, 25, pp. 912-918.
McCalla et al., "How Phase Transformations during Cooling Affect Li—Mn—Ni—O Positive Electrodes in Lithium Ion Batteries," Journal of the Electrochemical Society, 160 (8), 2013, pp. A1134-A1138.
McCalla et al., "Lithium loss mechanisms during synthesis of layered $Li_xNi_{2-x}O_2$ for lithium ion batteries," Solid State Ionics 219, 2012, pp. 11-19.
McCalla et al., "Structural Study of the Li—Mn—Ni Oxide Pseudoternary System of Interest for Positive Electrodes of Li-Ion Batteries," Chem. Mater., 2013, vol. 25, pp. 989-999.
McCalla et al., "The Role of Metal Site Vacancies in Promoting Li—Mn—Ni—O Layered Solid Solutions," Chem. Mater., 2013, vol. 25, pp. 2716-2721.
McCalla et al., "The spinel and cubic rocksalt solid-solutions in the Li—Mn—Ni oxide pseudo-ternary system," Solid State Ionics, vol. 242, 2013, pp. 1-9.
Meng et al., "Combining Ab Initio Computation with Experiments for Designing New Electrode Materials for Advanced Lithium Batteries: $LiNi_{1/3}Fe_{1/6}Co^{1/6}Mn_{1/3}O_2$," Journal of the Electrochemical Society, 151 (8), 2004, pp. A1134-A1140.
Mizushima et al., "$Li_xCoO_2$ ( $0 < x \leq -1$): A New Cathode Material for Batteries of High Energy Density", Mat. Res. Bull, 1980, vol. 15, No. 6, pp. 783-789.
Mohanty, Debasish et al., "Structural transformation of a lithium-rich $Li_{1.2}Co_{0.1}Mn_{0.55}Ni_{0.15}O_2$ cathode during high voltage cycling resolved by in situ X-ray diffraction," Journal of Power Sources, vol. 229, 2013, pp. 239-248.
Mueller-Neuhaus et al., "Understanding Irreversible Capacity in $Li_xNi_{1-y}Fe_yO_2$ Cathode Materials," Journal of The Electrochemical Society, 147 (10), 2000, pp. 3598-3605.
Mulder et al., "Comparison of commercial battery cells in relation to material properties," Electrochimica Acta, vol. 87, 2013, pp. 473-488.
Myung et al., "Iron trifluoride synthesized via evaporation method and its application to rechargeable lithium batteries", Journal of Power Sources, 2013, vol. 223, pp. 1-8.

(56) References Cited

OTHER PUBLICATIONS

Myung, Seung-Taek et al., "Progress in High-Capacity Core-Shell Cathode Materials for Rechargeable Lithium Batteries," J. Phys. Chem. Lett., vol. 5, 2014, pp. 671-679.
Naghash and Lee, "Lithium Nickel Oxyfluoride ($Li_{1-z}Ni_{1+z}F_yO_{2-y}$) and Lithium Magnesium Nickel Oxide ($Li_{1-z}(Mg_xNi_{1-x})_{1+z}O_2$) Cathodes for Lithium Rechargeable Batteries: Part I. Synthesis and Characterization of Bulk Phases", Electrochimica Acta, 2001, vol. 46, pp. 941-951.
Naghash et al., "Effect of oxygen non-stoichiometry on the electrochemical performance of lithium manganese oxide spinels," Journal of Power Sources, vol. 102, 2001, pp. 68-73.
Nakai et al., "Core-exciton absorption in the F K absorption spectra of 3d transition-metal fluorides", Physical Review B, Jun. 15, 1988, vol. 37, No. 18, pp. 10895-10897.
Nel et al., "Toxic Potential of Materials at the Nanolevel", Science, Feb. 3, 2006, vol. 311, pp. 622-627.
Nelson et al., "Core-level satellites and outer core-level multiplet splitting in Mn model compounds", Journal of Vacuum Science & Technology A, Jul./Aug. 2000, vol. 18, No. 4, pp. 1072-1076.
Nishijima et al. "Cathode Properties of Metal Trifluorides in Li and Na Secondary Batteries", Journal of Power Sources, 2009, vol. 190, pp. 558-562.
Nishijima et al., "Cathode properties of metal trifluorides in Li and Na secondary batteries", Journal of Power Sources 190, 2009, pp. 558-562.
Noh et al., "Cathode Material with Nanorod Structure—An Application for Advanced High-Energy and Safe Lithium Batteries," Chem. Mater., 2013, vol. 25, pp. 2109-2115.
Noh et al., "Comparison of the structural and electrochemical properties of layered $Li[Ni_xCo_yMn_z]O_2$ (x= 1/3, 0.5, 0.6, 0.7, 0.8 and 0.85) cathode material for lithium-ion batteries," Journal of Power Sources, 2013, vol. 233, pp. 121-130.
Noh et al., "Formation of a Continuous Solid-Solution Particle and its Application to Rechargeable Lithium Batteries," Adv. Funct. Mater., 2013, vol. 23, pp. 1028-1036.
Notification of Transmittal of the International Search Report and the Written Opinion of the International Searching Authority, or the Declaration for International Appln. No. PCT/US2015/045332 dated Nov. 23, 2015, 17 pages.
Ochi et al., "Interface Mixing in Fe/LiF Multilayered Thin Film", Journal of The Physical Society of Japan, Jan. 1992, vol. 61, No. 1, pp. 35-38.
Office action and Search Report of Chinese Application No. 201310302774.5 dated Sep. 29, 2016; 18 pages.
Oh et al., *Supporting Information* "Superior Long-Term Energy Retention and Volumetric Energy Density for Li-Rich Cathode Materials," Nano Lett., 2014, vol. 14, 12 pages.
Oh, Pilgun et al., "Superior Long-Term Energy Retention and Volumetric Energy Density for Li-Rich Cathode Materials," Nano Lett., 2014, vol. 14, pp. 5965-5972.
Ohzuku et al., "Electrochemistry and Structural Chemistry of $LiNiO_2$ ($R\bar{3}m$) for 4 Volt Secondary Lithium Cells," J. Electrochem. Soc., 140(7), 1993, pp. 1862-1870.
Ohzuku et al., "Electrochemistry of Manganese Dioxide in Lithium Nonaqueous Cell: III. X-Ray Diffractional Study on the Reduction of Spinel-Related Manganese Dioxide", J. Electrochemical Soc., Mar. 1990, vol. 137, No. 3, pp. 769-775.
Ohzuku et al., "High-capacity lithium insertion materials of lithium nickel manganese oxides for advanced lithium-ion batteries: toward rechargeable capacity more than 300 mA h $g^{-1}$" J. Mater. Chem., 2011, vol. 21, pp. 10179-101888.
Ohzuku et al., "Synthesis and Characterization of $Li[Ni_{1/2}Mn_{3/2}]O_4$ by Two-Step Solid State Reaction," Journal of the Ceramic Society of Japan, 110 (5), 2002, pp. 501-505.
Oishi, Masatsugu et al., "Direct observation of reversible charge compensation by oxygen ion in Li-rich manganese layered oxide positive electrode material, $Li_{1.16}Ni_{0.15}Co_{0.19}Mn_{0.50}O_2$," Journal of Power Sources, 276, 2015, pp. 89-94.

Oka, Y. et al., "High-Temperature Cycling Performance of $LiNi_{1/3}Co_{1/3}Mn_{1/3}O_2$ Cathode with DLC Protective Film," Journal of The Electrochemical Society, 162 (2), 2015, pp. A3032-A3037.
Okada, Shigeto et al., "Fluoride Phosphate $Li_2CoPO_4F$ as a High Voltage Cathode in Li-ion Batteries," Journal of Power Sources, 146, 2005, pp. 565-569.
Okamoto, Kaoru et al., "X-Ray Absorption Fine Structure Study on Layered $LiMO_2$ (M = Ni, Mn, Co) Cathode Materials," Journal of The Electrochemical Society, 153 (6), 2006, pp. A1120-A1127.
Padhi et al., "Effect of Structure on the $Fe^{3+}/Fe^{2+}$ Redox Couple in Iron Phosphates", J. Electrochem. Soc., May 5, 1997, vol. 144, No. 5, pp. 1609-1613.
Padhi et al., "Phospho-olivines as Positive-Electrode Materials for Rechargeable Lithium Batteries", J. Electrochem. Soc., Apr. 4, 1997, vol. 144, No. 4, pp. 1188-1194.
Paik et al., "Lithium and Deuterium NMR Studies of Acid-Leached Layered Lithium Manganese Oxides," Chem. Mater., 2002, vol. 14, pp. 5109-5115.
Palacin et al., "Electrochemical and structural study of the 3.3 V reduction step in defective $Li_xMn_2O_4$ and $LiMn_2O_{(4-y)}F_y$ compounds," Journal of Power Sources 81-82, 1999, pp. 627-631.
Palacin et al., "On the role of defects in decreasing the extra 3.3/3.95 and 4.5 V redox steps in Li—Mn—O spinels," Journal of Power Sources, 97-98, 2001, pp. 398-401.
Pan et al., "Recent development of $LiNi_xCo_yMn_zO_2$: Impact of micro/nano structures for imparting improvements in lithium batteries," Trans. Nonferrous Met. Soc. China, vol. 23, 2013, pp. 108-119.
Park et al., "Amorphous Metal Fluoride Passivation Coatings Prepared by Atomic Layer Deposition on $LiCoO_2$ for Li-Ion Batteries," Chem. Mater. 2015, 27, pp. 1917-1920.
Park et al., "Improvement of structural and electrochemical properties of $AlF_3$-coated $Li[Ni_{1/3}Co_{1/3}Mn_{1/3}]O_2$ cathode materials on high voltage region," Journal of Power Sources, vol. 178, 2008, pp. 826-831.
Park et al., "Lithium-manganese-nickel-oxide electrodes with integrated layered-spinel structures for lithium batteries," Electrochemistry Communications, vol. 9, 2007, pp. 262-268.
Parkinson et al. "Effect of Vertically Structured Porosity on Electrochemical Performance of $FeF_2$ Films for Lithium Batteries", Electrochemica Acta, Apr. 2014, vol. 125, pp. 71-82.
Patnaik, P., "Handbook of Inorganic Chemicals," 2003, McGraw-Hill, NY, NY, pp. 410-413, 428-429, 486-491, 500, 507-508.
Paulsen et al., "Layered Li-Mn-Oxide with the $O_2$ Structure: A Cathode Material for Li-Ion Cells Which Does Not Convert to Spinel," Journal of The Electrochemical Society, 146 (10), 1991, pp. 3560-3565.
Pereira et al., "The Electrochemistry of Germanium Nitride with Lithium", J. Electrochem. Soc., 2003, available electronically Jul. 1, 2003, vol. 150, No. 8, pp. A1118-A1128.
Pereira et al., "Electrochemistry of $Cu_3N$ with Lithium A Complex System with Parallel Processes", Journal of The Electrochemical Society, 2003, vol. 150 No. 9, pp. A1273-A1280.
Pereira, N., et al., "Iron Oxyfluorides as High Capacity Cathode Materials for Lithium Batteries," Journal of the Electrochemical Society, Apr. 3, 2009, vol. 156, No. 6, pp. A407-A416.
Pistora et al., "The effect of $FeF_2$ on the magneto-optic response in $FeF_2/Fe/FeF_2$ sandwiches", J. Phys. D: Appl. Phys. 43, 2010, 155301 (6pp).
Plitz et al. "Structure and Electrochemistry of Carbon-Metal Fluoride Nanocomposites Fabricated by Solid-State Redox Conversion Reaction", Journal of the Electrochemical Society, 152 (2), 2005, pp. A307-A315.
Poizot, "Nano-sized transition-metal oxides as negative-electrode materials for lithium-ion batteries", Nature, Sep. 28, 2000, vol. 407, pp. 496-499.
Poizot, P., et al. "Nano-sized Transition-Metal Oxides as Negative-Electrode Materials for Lithium-Ion Batteries", Letters to Nature, Sep. 28, 2000, vol. 407, pp. 496-499.
Poole, "Photoelectron study of the valence bands of some transition-metal fluorides", Physical Review B, Mar. 15, 1976, vol. 13, No. 6, pp. 2620-2624.

(56) References Cited

OTHER PUBLICATIONS

Pouillerie et al., "The $Li_xNi_{1-y}Mg_yO_2$ (y=0.05, 0.10) system: structural modifications observed upon cycling," Solid State Ionics, vol. 132, 2000, pp. 15-29.
Poulain, "Advanced Glasses", Ann. Chim. Sci. Mat., 2003, vol. 28, pp. 87-94.
Prabu et al., "Synthesis, impedance and electrochemical studies of lithium iron fluorophosphate, $LiFePO_4F$ cathode", Electrochimica Acta 85, 2012, pp. 572-578.
Prakash et al. "A Ferrocene-Based Carbon-Iron Lithium Fluoride Nanocomposite as a Stable Electrode Material in Lithium Batteries", Journal of Materials Chemistry, 2010, vol. 20, pp. 1871-1876.
Prakash et al. "Modified Synthesis of [Fe/LiF/C] Nanocomposite, and its Application as Conversion Cathode Material in Lithium Batteries", Journal of Power Sources, 196, 2011, p. 5936-5944.
Prakash et al., "Modified synthesis of [Fe/LiF/C] nanocomposite, and its application as conversion cathode material in lithium batteries", Journal of Power Sources, 2011, vol. 196, pp. 5936-5944.
Prasad, R. et al., "Dopant-induced stabilization of rhombohedral $LiMnO_2$ against Jahn-Teller distortion," Physical Review B 71, 2005, pp. 134111-1-134111-11.
Qian et al., "Uncovering the roles of oxygen vacancies in cation migration in lithium excess layered oxides" Phys. Chem. Chem. Phys., 2014, vol. 16, pp. 14665-14668.
Qin et al., "Processing and Characterization of $Ta_2O_5$ Films Deposited by Pulsed Laser Ablation", Advanced Materials, Sep. 1999, vol. 11, No. 13, pp. 1119-1119.
Qiu et al., "Self-Limiting Growth of Metal Fluoride Thin Films by Oxidation Reactions Employing Molecular Precursors", Physical Review Letters, Aug. 14, 2000, vol. 85, No. 7, pp. 1492-1495.
Quilan et al., "Surface Characterization of the Spinel $Li_xMn_2O_4$ Cathode before and after Storage at Elevated Temperatures", Chem. Mater., 2001, vol. 13, No. 11, pp. 4207-4212.
Ramasamy et al., "Discharge characteristics of silver vanadium oxide cathodes", Journal of Applied Electrochemistry (2006), vol. 36, pp. 487-497; DOI 10.1007/s10800-005-9103-x.
Rangan et al. "Conversion Reaction of $FeF_2$ Thin Films Upon Exposure to Atomic Lithium", Journal of Physical Chemistry, Apr. 2012, vol. 116 (19), pp. 10498-10503.
Rangan et al. "Electronic Structure and Chemical Composition of Candidate Conversion Material Iron Oxyfluoride", Abstract #1473, 220th ECS Meeting, 2011, The Electrochemical Society, 1 page.
Rangan et al., "Energy Level Alignment of a Zinc(II) Tetraphenylporphyrin Dye Adsorbed onto $TiO_2(110)$ and ZnO($11\bar{2}0$) Surfaces", J. Phys. Chem. C, 2010, vol. 114, No. 2, pp. 1139-1147.
Rashid, Muhammad et al., "Effect of Relaxation Periods over Cycling Performance of a Li-Ion Battery," Journal of The Electrochemical Society, 162 (2), 2015, pp. A3145-A3153.
Ravez, "The Inorganie Fluoride and Oxyfluoride Ferroelectrics", Journal de Physique III, EDP Sciences, 1997, 7 (6), pp. 1129-1144. 10.1051/jp3:1997175. jpa-00249637.
Recham et al., A 3.6 V lithium-based fluorosulphate insertion positive electrode for lithium-ion batteries, Nature Materials, Jan. 2010, vol. 9, pp. 68-74.
Reddy and Fichtner, "Batteries Based on Fluoride Shuttle", Journal of Materials Chemistry, 2011, vol. 21, pp. 17059-17062.
Reddy, M. A., et al. "CFx Derived Carbon-$FeF_2$ Nanocomposites for Reversible Lithium Storage", Advanced Energy Materials, vol. 3, Issue 3, Mar. 2012, pp. 308-313.
Reyes-Garcia et al., "Solid-State Characterization of the Nuclear and Electronic Environments in a Boron-Fluoride Co-doped $TiO_2$ Visible-Light Photocatalyst", J. Phys. Chem. C, 2007, vol. 111, pp. 17146-17154.
Riley, Leah A., "Electrochemical effects of ALD surface modification on combustion synthesized $LiNi_{1/3}Mn_{1/3}Co_{1/3}O_2$ as a layered-cathode material," Journal of Power Sources, 196, 2011, pp. 3317-3324.
Robert, Rosa et al., "Enhancement of the high potential specific charge in layered electrode materials for lithium-ion batteries," J. Mater. Chem. A, 2014, 2, pp. 8589-8598.
Roth et al. "Nanocrystalline LiF via microemulsion systems", J. Mater. Chem., 1999, accepted Nov. 16, 1998, vol. 9, pp. 493-497.
Rougier et al., "Cyclic Voltammetry of Pulsed Laser Deposited $Li_xMn_2O_4$ Thin Films", J. Electrochem. Soc., Sep. 1998, vol. 145, No. 9, pp. 2975-2980.
Rowe, Aaron W. et al., "Positive Electrode Materials in the Li—Mn—Ni—O System Exhibiting Anomalous Capacity Growth during Extended Cycling," Journal of The Electrochemical Society, 161 (3), 2014, pp. A308-A317.
Saavedra-Arias, Jose J. et al., "Synthesis and electrochemical properties of $Li(Ni_{0.8}Co_{0.1}Mn_{0.1})O_2$ cathode material: Ex situ structural analysis by Raman scattering and X-ray diffraction at various stages of charge-discharge process," Journal of Power Sources, 183, 2008, pp. 761-765.
Sauvage et al., "Crystal structure and electrochemical properties vs. Na+ of the sodium fluorophosphate $Na_{1.5}VOPO_4F_{0.5}$", Solid State Sciences, 2006, vol. 8, pp. 1215-1221.
Sekizawa, Oki et al., "Crystal and electronic structure change determined by various method for delithiation process of $Li_x(Ni,Mn)O_2$-based cathode material," Journal of Power Sources, 196, 2011, pp. 6651-6656.
Seo et al., "Multicomponent Olivine Cathode for Lithium Rechargeable Batteries: A First-Principles Study", Chem. Mater., 2010, vol. 22, No. 2, pp. 518-523.
Sharafat, S., et al. "Chemical Compatibility of Structural Materials with Liquid Li and Sn-Li", APEX Meeting, May 10-12, 2000, Argonne National Laboratory, 31 pages.
Shearer-Turrell, S., et al. "Structural Studies of Iron Hexafluorides: Infrared Spectra of $M_3FeF_6$ (M=Li, Na, K, Rb, Cs, Ag, Ti)", Journal of Molecular Structure, 1971, vol. 7, pp. 289-300.
Shen, Chong-Heng et al., "Facile Synthesis of The Li-Rich Layered Oxide $Li_{1.23}Ni_{0.09}Co_{0.12}Mn_{0.56}O_2$ with Superior Lithium Storage Performance and New Insights into Structural Transformation of the Layered Oxide Material during Charge-Discharge Cycle: In Situ XRD Characterization" ACS Appl. Mater. Interfaces, 2014, 6 (8), pp. 5516-5524.
Shinde et al., "Physical properties of transparent and conducting sprayed fluorine doped zinc oxide thin films", Solid State Sciences, 2008, vol. 10, pp. 1209-1214.
Shiratsuchi et al., "$FePO_4$ cathode properties for Li and Na secondary cells", Journal of Power Sources, 2006, vol. 159, pp. 268-271.
Shunmugasundaram, Ramesh et al., "High Capacity Li-Rich Positive Electrode Materials with Reduced First-Cycle Irreversible Capacity Loss," Chem. Mater. 2015, 27, pp. 757-767.
Soling, "The Crystal and Molecular Structure of Indium and Iron(III) Complexes with 1-(2-Thienyl)-4,4,4-trifluoro-1,3-butanedione", Acta Chemica Scandinavica A 30, 1976, pp. 163-170.
Son, In Hyuk et al., "Self-Terminated Artificial SEI Layer for Nickel-Rich Layered Cathode Material via Mixed Gas Chemical Vapor Deposition," Chem. Mater. 2015, 27, pp. 7370-7379.
Song, Jie et al., "Role of Oxygen Vacancies on the Performance of $Li[Ni_{0.5-x}Mn_{1.5+x}]O_4$ (x = 0, 0.05, and 0.08) Spinel Cathodes for Lithium-Ion Batteries," Chem. Mater., 2012, 24 (15), pp. 3101-3109.
Sorokin, "Anion-conducting fluoride and oxyfluoride glasses", Russian Chemical Reviews, 2001, vol. 70, No. 9, pp. 801-807.
Souza et al., "A Reversible Solid-State Crystalline Transformation in a Metal Phosphide Induced by Redox Chemistry", Science, Jun. 14, 2002, vol. 296, pp. 2012-2015.
Stevens et al., "High Capacity Anode Materials for Rechargeable Sodium-Ion Batteries", Journal of the Electrochemical Society, 2000, vol. 147, No. 4, pp. 1271-1273.
Sugiura, "Ka X-Ray Emission Spectra and K X-Ray Absorption-Edge Structures of Fluorine in 3d Transition-Metal Difluorides", Journal of the Physical Society of Japan, Aug. 1991, vol. 60, No. 8, pp. 2710-2717.
Sun et al., "High-energy cathode material for long-life and safe lithium batteries," Nature Materials, vol. 8, 2009, pp. 320-324.

(56) References Cited

OTHER PUBLICATIONS

Sun et al., "Nanostructured high-energy cathode materials for advanced lithium batteries," Nature Materials, vol. 11, 2012, pp. 942-947.

Sun et al., "Synthesis and Characterization of Li[(Ni$_{0.8}$Co$_{0.1}$Mn$_{0.1}$)$_{0.8}$(Ni$_{0.5}$Mn$_{0.5}$)$_{0.2}$]O$_2$ with the Microscale Core-Shell Structure as the Positive Electrode Material for Lithium Batteries," J. Am. Chem. Soc., 2005, vol. 127, pp. 13411-13418.

Sun et al., "The Role of AlF$_3$ Coatings in Improving Electrochemical Cycling of Li-Enriched Nickel-Manganese Oxide Electrodes for Li-Ion Batteries," Adv. Mater. 2012, 24, pp. 1192-1196.

Sun, Yang-Kook, "Concentration-Gradient Materials," Energy Storage & Conversion Material Laboratory, Hanyang University, (03-05-30), 14 pages.

Sural et al., "Conductivity relaxation in zirconium fluoride glasses: effect of substitution of Zr$^{4+}$ by Y$^{3+}$ ions", Solid State Ionics, 1999, vol. 120, pp. 27-32.

Tan et al., "Highly enhanced low temperature discharge capacity of LiNi$_{1/3}$Co$_{1/3}$Mn$_{1/3}$O$_2$ with lithium boron oxide glass modification," Journal of Power Sources, vol. 277, 2015, pp. 139-146.

Tarascon et al., "Issues and challenges facing rechargeable lithium batteries", Nature, Nov. 15, 2001, vol. 414, pp. 359-367.

Tarascon et al., "New concepts for the search of better electrode materials for rechargeable lithium batteries", Comptes Rendus Chimie, 2005, vol. 8, pp. 9-15.

Tarascon et al., "The Li$_{1+x}$Mn$_2$O$_4$/C rocking-chair system: a review", Electrochimica Acta, vol. 38, No. 9, Jun. 1993, pp. 1221-1231.

Tarascon et al., "The Spinel Phase of LiMn$_2$O$_4$ as a Cathode in Secondary Lithium Cells", J. Electrochem. Soc., Oct. 1991, vol. 138, No. 10, pp. 2859-2864.

Tarascon et al., "On the Electrochemical Reactivity Mechanism of CoSb$_3$ vs. Lithium", Journal of The Electrochemical Society, 2003, vol. 150, No. 6, pp. A732-A741.

Tarascon et al., "Synthesis Conditions and Oxygen Stoichiometry Effects on Li Insertion into the Spinel LiMn$_2$O$_4$," Journal of Electrochem. Soc., vol. 141, No. 6, Jun. 1994, pp. 1421-1431.

Tarascon, "Key challenges in future Li-battery research", Phil. Trans. R. Soc. A, 2010, vol. 368, pp. 3227-3241.

Thackeray et al., "Lithium Insertion into Manganese Spinels", Mater. Res. Bull., Feb. 1983, vol. 18, No. 4, pp. 461-472.

Thackeray et al., "Advances in manganese-oxide 'composite' electrodes for lithium-ion batteries," J. Mater. Chem., 2005, vol. 15, pp. 2257-2267.

Thackeray et al., "Comments on the structural complexity of lithium-rich Li$_{1+x}$M$_{1-x}$O$_2$ electrodes (M = Mn, Ni, Co) for lithium batteries," Electrochemistry Communications 8, 2006, pp. 1531-1538.

Thackeray et al., "Li$_2$MnO$_3$-stabilized LiMO$_2$ (M = Mn, Ni, Co) electrodes for lithium-ion batteries," J. Mater. Chem., 2007, vol. 17, pp. 3112-3125.

Thackeray et al., "ZrO$_2$-and Li$_2$ZrO$_3$-stabilized spinel and layered electrodes for lithium batteries," Electrochemistry Communications, vol. 5, 2003, pp. 752-758.

Thackeray, M. M., "Structural Considerations of Layered and Spinel Lithiated Oxides for Lithium Ion Batteries," J. Electrochem. Soc., vol. 142, No. 8, Aug. 1995, pp. 2558-2563.

Thomas et al., "Synthesis and Structural Characterization of the Normal Spinel Li [Ni$_2$] O$_4$", Mater. Res. Bull., Mar. 25, 1985, vol. 20, No. 10, pp. 1137-1146.

Thursday Morning, Nov. 3, 2011; Energy Frontiers Focus Topic, Room: 103—Session EN+NS-ThM; "Nanostructures for Energy Storage and Fuel Cells I"; Moderator: J. Lewis, RTI International; 1 page.

Tian et al., "Synthesis and Characterization of Nano-Crystalline Fluorine-Doped Tin Oxide Thin Films by Sol-Gel Method", Advanced Materials Research, MEMC 2014, vol. 977, pp. 59-62.

Tressaud et al. "Les Hesxafluoferrites M$_3$FeF$_6$ (M=Li, Na, K, Rb, Cs, Ag, Ti, NH$_4$): Etude Radiocristallo-graphique, Spectroscopique et Magnetique", Journal of Inorganic and Nuclear Chemistry, 1970, vol. 32, pp. 2179-2186. Abstract in English on the first page.

Trnovcova et al., "Physical Properties of Multicomponent Fluoride Glasses for Photonic and Superionic Applications", Ionics, Jul. 2001, vol. 7, Issue 4, pp. 456-462.

Valerio et al., "Ab initio study of antiferromagnetic rutile-type FeF$_2$", Physical Review B, Jul. 15, 1995, vol. 52, No. 4, pp. 2422-2427.

Van Aken et al., "Microanalysis of Fe$^{3+}$/ΣFe in oxide and silicate minerals by investigation of electron energy-loss near-edge structures (ELNES) at the Fe M$_{2,3}$ edge", Phys Chem Minerals, Aug. 1999, vol. 26, No. 7, pp. 584-590.

Van Bommel et al., "Analysis of the Growth Mechanism of Coprecipitated Spherical and Dense Nickel, Manganese, and Cobalt-Containing Hydroxides in the Presence of Aqueous Ammonia," Chem. Mater., 2009, 21, pp. 1500-1503.

Van Bommel et al., "Synthesis of Spherical and Dense Particles of the Pure Hydroxide Phase Ni$_{1/3}$Mn$_{1/3}$Co$_{1/3}$(OH)$_2$," Journal of The Electrochemical Society, 156 (5), 2009, pp. A362-A365.

Van Der Ven et al. "Lithium Diffusion in Layered Li$_x$CoO$_2$," Electrochemical and Solid-State Letters, 3 (7) (2000), pp. 301-304.

Vlasse et al., "The Refinement of the Crystal Structure of Iron Oxyfluoride, FeOF", Journal of Solid State Chemistry, Oct. 1973, vol. 8, Issue 2, pp. 109-113.

Vogt et al., "Sr$_3$MO$_4$F (M=Al, Ga)—A New Family of Ordered Oxyfluorides", Journal of Solid State Chemistry, 1999, vol. 144, pp. 228-231.

Wagner et al., Handbook of X-ray Photoelectron Spectroscopy, 1992, 259 pages.

Wall et al., "Synthesis of [Co/LiF/C] nanocomposite and its application as cathode in lithium-ion batteries", Journal of Alloys and Compounds, 2012, vol. 530, pp. 121-126.

Wang et al. "Conversion Reaction Mechanisms in Lithium Ion Batteries: Study of the Binary Metal Fluoride Electrodes", Journal of the American Chemical Society, vol. 133 (46), p. 18828-18836.

Wang et al. "Ionic and Electronic Transport in Metal Fluoride Conversion Electrodes", Northeastern Center for Chemical Energy Storage, PRiME 2012, 222$^{nd}$ Meeting Electrochemical Society, Oct. 9, 2012, 23 pages.

Wang et al., "Ternary Metal Fluorides As New Cathodes of Rechargable Lithium Batteries with Ultrahigh Energy Density," The Electrochemical Society, Jun. 10, 2014, 2 pages.

Wang et al., "High capacity double-layer surface modified Li[Li$_{0.2}$Mn$_{0.54}$Ni$_{0.13}$Co$_{0.13}$]O$_2$ cathode with improved rate capability," Journal of Mater. Chem., 2009, vol. 19, pp. 4965-4972.

Wang et al., "Synthesis of high capacity cathodes for lithium-ion batteries by morphology-tailored hydroxide co-precipitation," Journal of Power Sources, vol. 274, 2015, pp. 451-457.

Wang et al., "Synthesis of Lithium and Manganese-Rich Cathode Materials via an Oxalate Co-Precipitation Method," Journal of The Electrochemical Society, 160 (5), 2013, pp. A3108-A3112.

Wang et al., "Synthesis optimization of Li$_{1+x}$[Mn$_{0.45}$Co$_{0.40}$Ni$_{0.15}$])O$_2$ with different spherical sizes via co-precipitation," Powder Technology, vol. 187, 2008, pp. 124-129.

Wang, et al. "Tracking Lithium Transport and Electrochemical Reactions in Nanoparticles", Nature Communications, vol. 3, Nov. 13, 2012, 8 pages.

Wei et al., "Kinetics Tuning of Li-ion Diffusion in Layered Li(Ni$_x$Mn$_y$Co$_z$)O$_2$," J. Am. Chem. Soc., 2015, vol. 137, pp. 8364-8367.

Wen et al., "FTIR Spectroscopy of Metal Oxide Insertion Electrodes", J. Electrochem. Soc., Jun. 1996, vol. 143, No. 6, pp. L136-L138.

Wertheim et al., "Final-State Structure in Photoemission from Transition-Metal Compounds", Physical Review Letters, May 21, 1973, vol. 30, No. 21, pp. 1050-1053.

Westre et al., "A Multiplet Analysis of Fe K-Edge 1s → 3d Pre-Edge Features of Iron Complexes", J. Am. Chem. Soc., 1997, vol. 119, No. 27, pp. 6297-6314.

Whittingham, "Lithium Batteries and Cathode Materials", Chem. Rev. 2004, vol. 104, pp. 4271-4301.

Wiaderek et al. "Comprehensive Insights into the Structural and Chemical Changes in Mixed-Anion FeOF Electrodes by Using Operando PDF and NMR Spectroscopy", Journal of the American Chemical Society, 2013, 135, 4070-4078.

(56) References Cited

OTHER PUBLICATIONS

Wiaderek et al., Supporting Information, "Comprehensive Insights into the Structural and Chemical Changes in Mixed-Anion FeOF Electrodes by Using Operando PDF and NMR Spectroscopy", Journal of the American Chemical Society, Jan. 8, 2013, pp. S1-S22.
Wilcox et al., "Structure and Electrochemistry of $LiNi_{1/3}Co_{1/3-y}M_yMn_{1/3}O_2$ (M = Ti, Al, Fe) Positive Electrode Materials," Journal of The Electrochemical Society, 156 (3), 2009, pp. A192-A198.
Wilcox et al., "The Impact of Aluminum and Iron Substitution on the Structure and Electrochemistry of $Li(Ni_{0.4}Co_{0.2-y}M_yMn_{0.4})O_2$ Materials," Journal of The Electrochemical Society, 156 (12) 2009, pp. A1011-A1018.
Wolf-Goodrich et al., "Tailoring the surface properties of $LiNi_{0.4}Mn_{0.4}Co_{0.2}O_2$ by titanium substitution for improved high voltage cycling performance," Phys.Chem.Chem.Phys., 2015, vol. 17, pp. 21778-21781.
Woo et al., "Improvement of electrochemical and thermal properties of $Li[Ni_{0.8}Co_{0.1}Mn_{0.1}]O_2$ positive electrode materials by multiple metal (Al, Mg) substitution," Electrochimica Acta, 54, 2009, pp. 3851-3856.
Wu et al., "Effect of $Ni_{2+}$ Content on Lithium/Nickel Disorder for Ni-Rich Cathode Materials," ACS Appl. Mater. Interfaces, 2015, vol. 7, pp. 7702-7708.
Wu et al., "Effect of precursor and synthesis temperature on the structural and electrochemical properties of $Li(Ni_{0.5}Co_{0.2}Mn_{0.3})O_2$," Electrochimica Acta, 75, 2012, pp. 393-398.
Wu et al., "$LiFePO_4$ Nanoparticles Embedded in a Nanoporous Carbon Matrix: Superior Cathode Material for Electrochemical Energy-Storage Devices", Advanced Materials, 2009, vol. 21, pp. 2710-2714; DOI: 10.1002/adma.200802998.
Wu et al., Pulsed-Laser-Deposited $Sn_4P_3$ Electrodes for Lithium-Ion Batteries, J. Electrochem. Soc., 2009, vol. 156, No. 1, pp. A22-A26.
Wu et al., "Sol-gel Synthesis of $Li_2CoPO_4F/C$ Nanocomposite as a High-Power Cathode Material for Lithium Ion Batteries," Journal of Power Sources, vol. 220, 2012, pp. 122-129.
Wu et al., "Structural stability of chemically delithiated layered $(1-z)Li[Li_{1/3}Mn_{2/3}]O_2-zLi[Mn_{0.5-y}Ni_{0.5-y}Co_{2y}]O_2$ solid solution cathodes," Journal of Power Sources, 183, 2008, pp. 749-754.
Wu et al., "Structure and electrochemical performance of $FeF_3/V_2O_5$ composite cathode material for lithium-ion battery", Journal of Alloys and Compounds, 2009, vol. 486, pp. 93-96.
Xia et al., "Capacity Fading on Cycling of 4 V $Li/LiMn_2O_4$ Cells", J. Electrochem. Soc., Aug. 1997, vol. 144, No. 8, pp. 2593-2600.
Xiang et al., "Understanding the Effect of $Co^{3+}$ Substitution on the Electrochemical Properties of Lithium-Rich Layered Oxide Cathodes for Lithium-Ion Batteries," J. Phys. Chem. C, 2014, 118, pp. 21826-21833.
Xiong et al., "A modified LiF coating process to enhance the electrochemical performance characteristics of $LiNi_{0.8}Co_{0.1}Mn_{0.1}O_2$ cathode materials," Materials Letters, 110, 2013, pp. 4-9.
Xiujian et al., "Mixed-alkali effect in fluorozirconate glasses", Journal of Materials Science Letters, Feb. 1987, vol. 6, No. 2, pp. 143-144.
Xu, Bo et al., "Identifying surface structural changes in layered Li-excess nickel manganese oxides in high voltage lithium ion batteries: A joint experimental and theoretical study," Energy Environ. Sci., 2011, DOI: 10.1039/c1ee01131f; 11 pages.
Xue et al., "Electrochemical reaction of lithium with nanostructured thin film of antimony trioxide", Electrochemistry Communications, 2006, vol. 8, pp. 1250-1256.
Xue et al., "Manganese selenide thin films as anode material for lithium-ion batteries", Solid State Ionics, 2007, vol. 178, pp. 273-279.
Yabuuchi et al., "Effect of heat-treatment process on $FeF_3$ nanocomposite electrodes for rechargeable Li batteries", J. Mater. Chem., 2011, vol. 21, pp. 10035-10041.

Yabuuchi et al., "High-capacity electrode materials for rechargeable lithium batteries: $Li_3NbO_4$-based system with cation-disordered rocksalt structure," PNAS, vol. 112, No. 25, Jun. 23, 2015, pp. 7650-7655.
Yabuuchi et al., "Novel lithium insertion material of $LiCo_{1/3}Ni_{1/3}Mn_{1/3}O_2$ for advanced lithium-ion batteries," Journal of Power Sources 119-121, 2003, pp. 171-174.
Yamada et al., "Liquid-phase synthesis of highly dispersed $NaFeF_3$ particles and their electrochemical properties for sodium-ion batteries", Journal of Power Sources, 2011, vol. 196, pp. 4837-4841.
Yamakawa, N., et al. "Identifying the Local Structures Formed During Lithiation of the Conversion Material, Iron Fluoride, in a Li Ion Battery: A Solid-State NMR, X-ray Diffraction, and Pair Distribution Function Analysis Study", Journal of American Chemical Society, 131, 2009, p. 10525-10536.
Yamakawa, N., et al. "Investigation of the Conversion Reaction Mechanisms for Binary Copper (II) Compounds by Solid-State NMR Spectroscopy and X-ray Diffraction", Chemistry of Materials, 2009, vol. 21, pp. 3162-3176.
Yan et al., "Atomic-Resolution Visualization of Distinctive Chemical Mixing Behavior of Ni, Co, and Mn with Li in Layered Lithium Transition-Metal Oxide Cathode Materials," Chem. Mater., 2015, 27 (15), pp. 5393-5401.
Yan et al., "Recent progress in Li-rich layered oxides as cathode materials for Li-ion batteries," RSC Adv., 2014, 4, pp. 63268-63284.
Yang, Feifei et al., "Nanoscale Morphological and Chemical Changes of High Voltage Lithium-Manganese Rich NMC Composite Cathodes with Cycling," Nano Lett., 2014, 14, pp. 4334-4341.
Yang, Xiao-Qing et al., "Crystal structure changes of $LiMn_{0.5}Ni_{0.5}O_2$ cathode materials during charge and discharge studied by synchrotron based in situ XRD," Electrochemistry Communications, vil. 4, 2002, pp. 649-654.
Yang, Yuan et al., "A membrane-free lithium/polysulfide semi-liquid battery for large-scale energy storage," Energy Environ. Sci., 2013, vol. 6, pp. 1552-1558.
Yang, Z., et al. "First Principles Study on the Structural, Magnetic and Electronic Properties of Co-doped $FeF_3$", Computational and Theoretical Chemistry, 2012, vol. 980, pp. 44-48.
NuLi, Yanna et al., "Preparation of $\alpha-Fe_2O_3$ submicro-flowers by a hydrothermal approach and their electrochemical performance in lithium-ion batteries", Electrochimica Acta, 2008, vol. 53, pp. 4213-4218.
Yano, Akira et al., "Surface Structure and High-Voltage Charge/Discharge Characteristics of Al-Oxide Coated $LiNi_{1/3}Co_{1/3}Mn_{1/3}O_2$ Cathodes," Journal of The Electrochemical Society, 162 (2), 2015, pp. A3137-A3144.
Yao, W., et al. "Multilayered Cobalt Oxide Platelets for Negative Electrode Material of a Lithium-Ion Battery", Journal of the Electrochemical Society, 2008, vol. 155, No. 12, pp. A903-A908.
Ye, Delai et al., "Ni-induced stepwise capacity increase in Ni-less Li-rich cathode materials for high performance lithium ion batteries," Nano Research, 8(3), Feb. 2014, pp. 808-820.
Yin, et al., "X-ray/Neutron Diffraction and Electrochemical Studies of Lithium De/Re-Intercalation in $Li_{1-x}Co_{1/3}Ni_{1/3}Mn_{1/3}O_2$ (x=→1)", Chem. Mater. 2006, 18, pp. 1901-1910.
Yoon et al., "Investigation of the Charge Compensation Mechanism on the Electrochemically Li-Ion Deintercalated $Li_{1-x}Co_{1/3}Ni_{1/3}Mn_{1/3}O_2$ Electrode System by Combination of Soft and Hard X-ray Absorption Spectroscopy", J. Am. Chem. Soc., 2005, vol. 127, p. 17479-17487.
Yoon et al., "Electronic structural changes of the electrochemically Li-ion deintercalated $LiNi_{0.8}Co_{0.15}Al_{0.05}O_2$ cathode material investigated by X-ray absorption spectroscopy," Journal of Power Sources, 174, 2007, pp. 1015-1020.
Yoon et al., "Improved Performances of $Li[Ni_{0.65}Co_{0.08}Mn_{0.27}]O_2$ Cathode Material with Full Concentration Gradient for Li-Ion Batteries," Journal of The Electrochemical Society, 162 (2), 2015, pp. A3059-A3063.
Yoon et al., "In Situ X-ray Absorption Spectroscopic Study on $LiNi_{0.5}Mn_{0.5}O_2$ Cathode Material during Electrochemical Cycling," Chem. Mater., 2003, vol. 15, pp. 3161-3169.
Yoon et al., "Investigation of the Local Structure of the $LiNi_{0.5}Mn_{0.5}O_2$ Cathode Material during Electrochemical Cycling by X-Ray Absorption and NMR Spectroscopy," Electrochemical and Solid-State Letters, 5 (11), 2002, pp. A263-A266.

(56) References Cited

OTHER PUBLICATIONS

Yoon et al., "Li MAS NMR and in situ X-ray studies of lithium nickel manganese oxides," Journal of Power Sources 119-121, 2003, pp. 649-653.

Yu et al., "Electrochemical Reactivity of Heterogeneous Nanocomposite $Li_2Se-Cu_3Se_2$", Electrochemical Solid-State Letters, 2007, vol. 10, No. 6, pp. A146-A150.

Yu et al., "Pulsed laser deposited heterogeneous mixture of Li2Se—Sb2Se3 nanocomposite as a new storage lithium material", Electrochimica Acta, 2010, vol. 55, No. 3, pp. 1258-1264.

Yu, Haijun et al., "Study of the lithium/nickel ions exchange in the layered $LiNi_{0.42}Mn_{0.42}Co_{0.16}O_2$ cathode material for lithium ion batteries: experimental and first-principles calculations" Energy Environ. Sci., 2014, vol. 7, pp. 1068-1078.

Yue, Peng et al., "A low temperature fluorine substitution on the electrochemical performance of layered $LiNi_{0.8}Co_{0.1}Mn_{0.1}O_{2-z}F_z$ cathode materials," Electrochimica Acta, vol. 92, 2013, pp. 1-8.

Yue, Peng et al., "Effect of fluorine on the electrochemical performance of spherical $LiNi_{0.8}Co_{0.1}Mn_{0.1}O_2$ cathode materials via a low temperature method", Powder Technology, vol. 237, 2013 pp. 623-626.

Yue, Yang et al., "Growth mechanisms for spherical mixed hydroxide agglomerates prepared by co-precipitation method: A case of $Ni_{1/3}Co_{1/3}Mn_{1/3}(OH)_2$", Journal of Alloys and Compounds, vol. 619, 2015, pp. 846-853.

Zhang et al. "Nanostructured Nickel Fluoride Thin Film as a New Li Storage Material", Solid State Sciences, 2008, vol. 10, pp. 1166-1172.

Zhang et al. "Synthesis and Characterization of in Situ $Fe_2O_3$-Coated $FeF_3$ Cathode Materials for Rechargeable Lithium Batteries", Journal of Materials Chemistry, 2012, vol. 22, pp. 24769-24775.

Zhang et al., "Self-Assembled Hollow Spheres of β-$Ni(OH)_2$ and Their Derived Nanomaterials," Chem. Mater., 2009, vol. 21, pp. 871-883.

Zhang et al., "Surface nitridation of Li-rich layered $Li(Li_{0.17}Ni_{0.25}Mn_{0.58})O_2$ oxide as cathode material for lithium-ion battery", J. Mater. Chem., 2012, vol. 22, pp. 13104-13109.

Zhang Hua et al., "Electrochemical Properties of $CuF_2$ Films Fabricated by Pulsed Laser Deposition", Acta Phys.-Chim. Sin., Jul. 2008, vol. 24, No. 7, pp. 1287-1291; with an English abstract.

Zhao et al., "Enhanced Electrochemical Performance of $Li[Li_{0.2}Ni_{0.2}Mn_{0.6}]O_2$ Modified by Manganese Oxide Coating for Lithium-Ion Batteries," Electrochemical and Solid-State Letters, vol. 14 (1), 2011, pp. A1-A5.

Zhou et al. "LiF/Co Nanocomposite as a New Li Storage Material", Electrochemical and Solid-State Letters, vol. 9, No. 3, 2006, pp. A147-A150.

Zhou et al. "Thermal Stability of $FeF_3$ Cathode for Li-ion batteries", Journal of Power Sources, 195, 2010, pp. 4952-4956.

Zhou et al., "Coprecipitation Synthesis of $Ni_xMn_{1-x}(OH)_2$ Mixed Hydroxides," Chem. Mater., vol. 22, No. 3, 2010, pp. 1015-1021.

Zhou et al., "Electrochemical Characterization of $Li_3N$-13 Si Nanocomposite Thin Films by Pulsed Laser Deposition", J. Electrochem. Society, 2009, vol. 156, No. 6, pp. A425-A429.

Zhou et al., "Reactivity of charged $LiVPO_4F$ with 1 M $LiPF_6$ EC:DEC electrolyte at high temperature as studied by accelerating rate calorimetry", Electrochemistry Communications, 2009, vol. 11, No. 3, pp. 589-591.

Zhou et al., "Solid-State Synthesis as a Method for the Substitution of Al for Co in $LiNi_{1/3}Mn_{1/3}Co_{(1/3-z)}Al_zO_2$," Journal of The Electrochemical Society, 156 (10), 2009, pp. A796-A801.

Zhou et al., "The effect of Al substitution on the reactivity of delithiated $LiNi_{1/3}Mn_{1/3}Co_{(1/3-z)}Al_zO_2$ with non-aqueous electrolyte," Electrochemistry Communications 10 (2008), pp. 1168-1171.

Zhou, Fu et al., "Advantages of Simultaneous Substitution of Co in $Li[Ni_{1/3}Mn_{1/3}Co_{1/3}]O_2$ by Ni and Al," Electrochemical and Solid-State Letters, 12 (4), 2009, pp. A81-A83.

Zhu, Ye et al., "Positive Electrode Passivation by LiDFOB Electrolyte Additive in High-Capacity Lithium-Ion Cells," Journal of The Electrochemical Society, 159 (12), 2012, pp. A2109-A2117.

Zu and Li, "Thermodynamic Analysis on Energy Densities of Batteries", Energy & Environmental Science, 2011, vol. 4, pp. 2614-2624.

\* cited by examiner

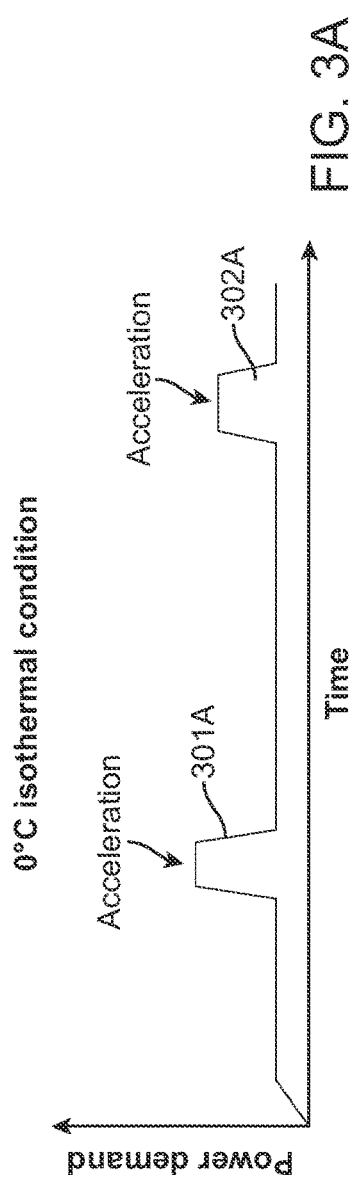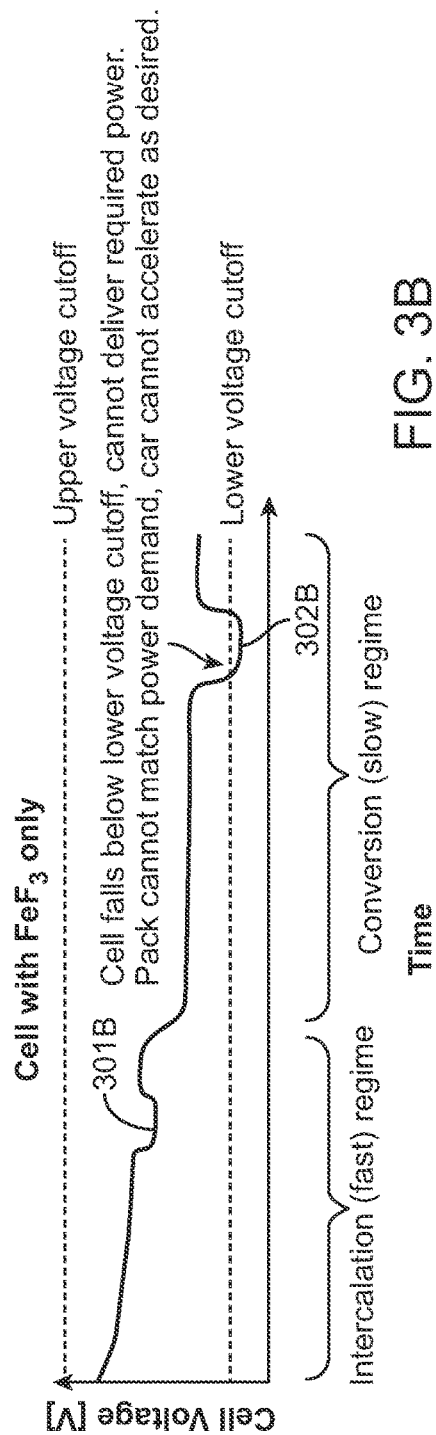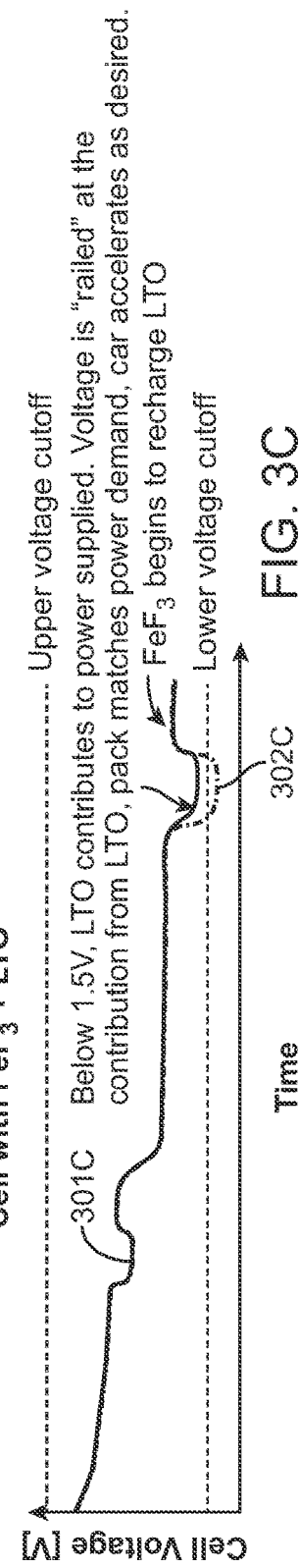

| | X = O | | X = S | | X = N | | X = P | | X = F | |
|---|---|---|---|---|---|---|---|---|---|---|
| | Phase | $E_{conv}$ [V][a] | Phase | $E_{conv}$ [V] | Phase | $E_{conv}$ [V] | Phase | $E_{conv}$ [V] | Phase | $E_{conv}$ [V] |
| M = Ti | | | | | | | | | $TiF_3$ | 0.95 [258] |
| M = V | | | | | | | | | $VF_3$ | 0.4 [258] |
| M = Cr | $Cr_2O_3$ | 0.2 [33] | CrS | 0.85 [192] | CrN | 0.2 [225] | | | $CrF_3$ | 1.8 [c] [259] |
| M = Mn | $MnO_2$ | 0.4 [38] | MnS | 0.7 [165] | | | $MnP_4$ | 0.2 [d] [231] | | |
| | $Mn_2O_3$ | 0.3 [42] | | | | | | | | |
| | MnO | 0.2 [46] | | | | | | | | |
| M = Fe | $Fe_2O_3$ | 0.8 [304] | $FeS_2$ | 1.5 [173] | $Fe_3N$ | 0.7 [224] | $FeP_2$ | 0.3 [241] | $FeF_3$ | 2.0 [c] [260] |
| | $Fe_3O_4$ | 0.8 [67] | FeS | 1.3 [178] | | | FeP | 0.1 [241] | | |
| | FeO | 0.75 [13] | | | | | | | | |
| M = Co | $Co_3O_4$ | 1.1 [87] | $CoS_2$ | 1.65-1.3 [b] [187] | CoN | 0.8 [221] | $CoP_3$ | 0.3 [244] | $CoF_2$ | 2.2 [c] [261] |
| | CoO | 0.8 [87] | $Co_{0.92}S$ | 1.4 [192] | $Co_3N$ | 1.0 [224] | | | | |
| | | | $Co_9S_8$ | 1.1 [189] | | | | | | |
| M = Ni | NiO | 0.6 [13] | $NiS_2$ | 1.6 [194] | $Ni_3N$ | 0.6 [223] | $NiP_3$ | 0.7 [250] | $NiF_2$ | 1.9 [c] [261] |
| | | | NiS | 1.5 [196] | | | NiP2 | 0.5-0.3 [b] [233] | | |
| | | | $Ni_3S_2$ | 1.4 [199] | | | $Ni_3P$ | Slope [249] | | |
| M = Cu | CuO | 1.4 [125] | CuS | 2.0-1.7 [b] [209] | $Cu_3N$ | [229] | CuP2 | 0.7 [251] | $CuF_2$ | 3.0 [c] [270] |
| | $Cu_2O$ | 1.4 [129] | $Cu_2S$ | 1.7 [208] | | | $Cu_3P$ | 0.8 [252] | | |
| M = Mo | $MoO_3$ | 0.45 [148] | $MoS_2$ | 0.6 [214] | | | | | | |
| | $MoO_2$ | Slope [151] | | | | | | | | |
| M = W | | | $WS_2$ | 0.8-0.6 [b] [218] | | | | | | |
| M = Ru | $RuO_2$ | 0.9 [155] | | | | | | | | |

FIG. 6

Average Voltage Relates to Intercalated Amount of Li, as noted in the Li subscript

| Reduced Cell Formula | Average Voltage [V] | Capacity Grav [mAh/g] | Capacity Vol [Ah/L] | Specific E [Wh/kg] | E Density [Wh/L] |
|---|---|---|---|---|---|
| $Li_{1-2}FeSiO_4$ | 2.48 | 165.64 | 508.4 | 410 | 1259 |
| $Li_{2-4}Nb_2Fe_3O_{10}$ | 2.47 | 99.06 | 430.98 | 244 | 1064 |
| $Li_{1-2}NbP_4O_{13}$ | 2.46 | 61.1 | 163.77 | 150 | 403 |
| $Li_{0-1}MoO_2$ | 2.45 | 198.71 | 1009.08 | 487 | 2473 |
| $Li_{0-1}CrPO_4$ | 2.45 | 174.14 | 581.4 | 427 | 1427 |
| $LiSn_2(PO_4)_3$ | 2.45 | 98.69 | 346.25 | 242 | 847 |
| $Li_{0-1}V_2O_3F$ | 2.45 | 152.44 | 593.06 | 373 | 1453 |
| $Li_{4.25-4.75}CoO_4$ | 2.44 | 85.96 | 234.13 | 210 | 571 |
| $Li_{0.5-1}CoO_2$ | 2.44 | 136.92 | 603.57 | 334 | 1473 |
| $Li_{0-1}CrPO_4$ | 2.43 | 174.14 | 588.71 | 423 | 1429 |
| $Li_{3-4}TiFe_3O_8$ | 2.43 | 72.21 | 292.24 | 176 | 710 |
| $Li_{3-4}V_3Fe_3O_{10}$ | 2.43 | 58.62 | 236.89 | 142 | 575 |
| $Li_{-1}VPO_4$ | 2.42 | 175.34 | 580.13 | 424 | 1401 |
| $LiNi(O_2F)_2$ | 2.42 | 123.96 | 325.98 | 300 | 788 |
| $Li_{0-1}Ba_2Ti_{11}O_{24}$ | 2.41 | 22.48 | 95.54 | 54 | 230 |
| $Li_{0-2}MnO_2$ | 2.4 | 531.68 | 1851.47 | 1274 | 4435 |
| $LiP_3(WO_6)_2$ | 2.4 | 119.4 | 544.9 | 287 | 1308 |
| $Li_{0-4}Mn_2Fe_3P_6WO_{24}$ | 2.4 | 101.25 | 362.48 | 243 | 870 |
| $Li_{0-3}Nb_4VO_{12}$ | 2.39 | 126.54 | 592.42 | 303 | 1417 |
| $Li_{0-1}CrS_2$ | 2.38 | 217.78 | 698.34 | 518 | 1662 |
| $Li_{1-2}FeSiO_4$ | 2.38 | 165.64 | 476.27 | 394 | 1132 |
| $Li_{0-1}ScMo_3O_8$ | 2.38 | 57.3 | 278.78 | 136 | 663 |
| $Li_{0-1}VF_3$ | 2.37 | 233.3 | 761 | 552 | 1800 |
| $Li_{0-1.25}VO_2$ | 2.37 | 365.67 | 1414.7 | 867 | 3355 |

FIG. 9A

| Reduced Cell Formula | Average Voltage [V] | Capacity Grav [mAh/g] | Capacity Vol [Ah/L] | Specific E [Wh/kg] | E Density [Wh/L] |
|---|---|---|---|---|---|
| LiCr(PO$_3$)$_3$ | 2.36 | 90.59 | 238.14 | 214 | 563 |
| Li$_{0-0.5}$FeClO | 2.36 | 120.98 | 383.59 | 285 | 905 |
| Li$_{0-1}$V$_5$F$_{11}$ | 2.36 | 56.95 | 177.84 | 134 | 419 |
| Li$_{2-4}$TiV$_3$O$_8$ | 2.35 | 150.38 | 585.4 | 354 | 1377 |
| Li$_{0-1}$PWO$_4$F | 2.35 | 87.95 | 440.67 | 206 | 1034 |
| Li$_{0-1}$KMnO$_2$ | 2.34 | 201.55 | 618.12 | 472 | 1448 |
| Li$_{2-4}$V$_3$CoO$_8$ | 2.34 | 145.85 | 593.17 | 341 | 1387 |
| Li$_{1.2-1.6}$CoO$_2$ | 2.34 | 105.07 | 347.32 | 246 | 812 |
| LiMn(SiO$_3$)$_2$ | 2.34 | 121.28 | 354.09 | 283 | 828 |
| Li$_{0-2}$Sr$_3$Nb$_4$O$_{13}$ | 2.33 | 62.59 | 311.56 | 146 | 725 |
| Li$_{2-3}$TiMn$_3$O$_8$ | 2.33 | 74.14 | 303.14 | 173 | 707 |
| LiTi$_3$V$_3$(PO$_4$)$_6$ | 2.33 | 166.26 | 470.5 | 387 | 1094 |
| Li$_{1-3}$Ti$_2$V$_3$O$_{12}$ | 2.33 | 116.18 | 346.02 | 271 | 807 |
| Li$_{1-2}$V$_2$F$_7$ | 2.33 | 107.74 | 339.38 | 251 | 790 |
| Li$_{0-1}$V$_2$NiO$_6$ | 2.33 | 101.71 | 357.95 | 237 | 835 |
| LiSn(BO$_3$)$_2$ | 2.32 | 104.22 | 326.95 | 241 | 757 |
| LiV(CO$_3$)$_2$ | 2.32 | 145 | 354.69 | 337 | 824 |
| Li$_{0-1}$V$_6$P$_7$O$_{24}$ | 2.31 | 29.34 | 96.89 | 68 | 224 |
| Li$_{0-1}$La$_4$Ti$_3$O$_{12}$ | 2.3 | 29.84 | 178.85 | 69 | 412 |
| LiP(WO$_4$)$_2$ | 2.3 | 50.23 | 269.26 | 116 | 620 |
| Li$_{0-1}$VF$_3$ | 2.29 | 233.3 | 776.08 | 534 | 1776 |
| LiSn$_2$(PO$_4$)$_3$ | 2.29 | 98.69 | 308.36 | 226 | 705 |
| LiV(OF)$_2$ | 2.29 | 189.06 | 610.54 | 432 | 1396 |
| Li$_{0-1}$NbF$_5$ | 2.28 | 137.56 | 449.93 | 313 | 1024 |

FIG. 9B

| | | | | |
|---|---|---|---|---|
| $Li_{1-5}Ti_2V_3O_{10}$ | 2.27 | 241.86 | 945.06 | 549 | 2146 |
| $LiTi_4Mn(PO_4)_6$ | 2.26 | 32.56 | 97.31 | 74 | 220 |
| $Li_{0-1}W_6CCl_{18}$ | 2.26 | 15.23 | 69.16 | 34 | 156 |
| $Li_{2-3}Mn_3CrO_8$ | 2.26 | 73.3 | 310.46 | 166 | 702 |

FIG. 9B (Cont.)

| Reduced Cell Formula | Average Voltage [V] | Capacity Grav [mAh/g] | Capacity Vol [Ah/L] | Specific E [Wh/kg] | E Density [Wh/L] |
|---|---|---|---|---|---|
| $Li_{0-1}VPO_4$ | 2.25 | 175.34 | 598.89 | 395 | 1348 |
| $Li_{0-1}Mn_7O_7F$ | 2.24 | 51.29 | 197.12 | 115 | 442 |
| $Li5_{-6}MnO_4$ | 2.23 | 166.9 | 417.67 | 372 | 930 |
| $LiCr_4(PO_4)_3$ | 2.23 | 53.62 | 178.86 | 120 | 400 |
| $Li_{0-1}Mn_5O_5F$ | 2.23 | 70.41 | 264.47 | 157 | 590 |
| $Li_{0-1}CuS$ | 2.22 | 261.35 | 908.18 | 580 | 2014 |
| $LiV_5(P_3O_{11})_2$ | 2.2 | 130.69 | 394.5 | 288 | 870 |
| $Li_{0-2}V_4Si_4O_{13}$ | 2.19 | 99.64 | 342.35 | 218 | 749 |
| $Li_{0-1.5}MnO_2$ | 2.19 | 412.97 | 1570.3 | 906 | 3444 |
| $Li_{0-1}NbS_2$ | 2.18 | 163.45 | 693.41 | 356 | 1511 |
| $Li_{1-2}Sr_2Nb_3O_{10}$ | 2.15 | 42.69 | 205.23 | 92 | 441 |
| $Li_{5-6}VF_8$ | 2.14 | 109.58 | 300.48 | 234 | 642 |
| $Li_{0-1}VPO_4$ | 2.13 | 175.34 | 590.73 | 374 | 1259 |
| $Li_{0.67-2}TiVO_4$ | 2.12 | 202.25 | 779.17 | 428 | 1650 |
| $Li_{4-10}Mn_3Cr5O_{16}$ | 2.12 | 214.36 | 859.31 | 455 | 1822 |
| $Li_{1-2}VF_4$ | 2.11 | 190.33 | 568.08 | 402 | 1199 |
| $Li_{0-1}Na_2VPO_6$ | 2.1 | 116.11 | 317.84 | 244 | 669 |
| $Li_{0-2}Cr_4Si_4O_{13}$ | 2.07 | 98.86 | 336.41 | 205 | 697 |
| $Li_{1-2}TiVO_4$ | 2.06 | 151.69 | 584.79 | 313 | 1205 |
| $Li_{3-5}V_7O_{12}$ | 2.06 | 91.9 | 391.9 | 189 | 807 |
| $LiCr_5(PO_4)_4$ | 2.05 | 81.99 | 266.28 | 168 | 547 |
| $Li_{1-1.33}LaNb_4O_{12}$ | 2.03 | 12.55 | 58.21 | 26 | 118 |
| $Li_{7-9}Ti_{12}NbO_{30}$ | 2.01 | 44.31 | 164.84 | 89 | 331 |
| $Li_{0.75}CoS_2$ | 2 | 51.54 | 177.1 | 103 | 355 |

FIG. 9C

| | | | | |
|---|---|---|---|---|
| $Li_{0-1}BaCaVP_2O_9$ | 1.99 | 60.74 | 226.95 | 121 | 452 |
| $Li_{2-3}V_3O_3F_5$ | 1.99 | 84.64 | 277.18 | 168 | 551 |
| $Li_{1-2}CrPO_4F$ | 1.98 | 149.02 | 441.41 | 295 | 874 |
| $Li_{2-3}CrO_3$ | 1.96 | 221.83 | 703.81 | 435 | 1379 |

FIG. 9C (Cont.)

| Reduced Cell Formula | Average Voltage [V] | Capacity Grav [mAh/g] | Capacity Vol [Ah/L] | Specific E [Wh/kg] | E Density [Wh/L] |
|---|---|---|---|---|---|
| $Li_{0.8-1.6}MnO_2$ | 1.95 | 218.69 | 766.56 | 427 | 1498 |
| $Li_{3-5}SbS_4$ | 1.95 | 188.26 | 474.1 | 366 | 923 |
| $Li_{0-1}TiP_2O_7$ | 1.95 | 117.16 | 321.23 | 228 | 626 |
| $Li_{3-4}La_5Ti_6Nb_2O_{26}$ | 1.95 | 16.63 | 85.4 | 32 | 167 |
| $Li_{0-0.33}TiO_2$ | 1.94 | 108.71 | 422.03 | 211 | 821 |
| $Li_{4-5}Ti_3O_8$ | 1.93 | 87.5 | 302.2 | 169 | 582 |
| $Li_{4-6}Ba_4Ti_{19}O_{44}$ | 1.93 | 24.32 | 106.38 | 47 | 205 |
| $LiSn(BO_3)_2$ | 1.93 | 104.22 | 345.65 | 201 | 667 |
| $Li_{0-0.38}WO_3$ | 1.92 | 42.87 | 305 | 82 | 584 |
| $Li_{1-1.5}FeSiO_4$ | 1.92 | 84.63 | 231.98 | 163 | 446 |
| $Li_{2-5}CrS_4$ | 1.9 | 374.04 | 806.37 | 711 | 1534 |
| $Li_{0-0.5}NiS$ | 1.89 | 142.21 | 634.77 | 268 | 1197 |
| $Li_{0-1}TiS_2$ | 1.88 | 225.34 | 696.68 | 424 | 1310 |
| $Li_{0-1}K_2VPO_6$ | 1.88 | 101.89 | 262.39 | 192 | 494 |
| $Li_{1-2}TiVO_4$ | 1.87 | 151.69 | 582.49 | 283 | 1086 |
| $LiSn_2(SO_4)_3$ | 1.87 | 50.33 | 157.28 | 94 | 294 |
| $LiMn(FeO_3)_2$ | 1.86 | 352.34 | 1269.21 | 656 | 2363 |
| $Li_{12-14}Mn_2O_9$ | 1.85 | 152.7 | 361.01 | 282 | 666 |
| $Li_{0-1}TiO_2$ | 1.84 | 308.75 | 1205.99 | 568 | 2219 |
| $Li_{0.5-1}KMnO_2$ | 1.84 | 100.78 | 305.79 | 186 | 563 |
| $Li_{1-3}SbO_3$ | 1.84 | 281.26 | 968.6 | 519 | 1786 |
| $Li_{4-7}Ti_{11}O_{24}$ | 1.83 | 83.83 | 304.05 | 153 | 556 |
| $Li_{1-4}Ti_{13}VO_8$ | 1.82 | 229.53 | 885.79 | 417 | 1611 |
| $Li_{0-1}FeCuS_2$ | 1.81 | 140.72 | 566.06 | 254 | 1022 |

FIG. 9D

| | | | | |
|---|---|---|---|---|
| Li$_{0-1}$TiO$_2$ | 1.79 | 308.75 | 1205.54 | 551 | 2153 |
| Li$_{0-1}$VS$_2$ | 1.79 | 219.66 | 701.08 | 393 | 1253 |
| Li$_{0-1}$Na$_3$MnBPO$_7$ | 1.79 | 94.16 | 257.1 | 168 | 459 |
| Li$_{7-8}$BiO$_6$ | 1.78 | 74.34 | 298.81 | 132 | 532 |

FIG. 9D (Cont.)

| Reduced Cell Formula | Average Voltage [V] | Capacity Grav [mAh/g] | Capacity Vol [Ah/L] | Specific E [Wh/kg] | E Density [Wh/L] |
|---|---|---|---|---|---|
| Li$_{0-1}$TiS$_2$ | 1.78 | 225.34 | 699.82 | 401 | 1246 |
| Li$_{2-3}$Nb$_4$ZnO$_{12}$ | 1.78 | 41.24 | 197.93 | 73 | 353 |
| Li$_{0-2}$Mo$_3$S$_4$ | 1.77 | 124.67 | 596.31 | 221 | 1058 |
| Li$_{1-2}$Ti$_2$VO$_6$ | 1.75 | 104.47 | 386.44 | 183 | 678 |
| Li$_{7-8}$NbS$_6$ | 1.74 | 78.64 | 182.84 | 137 | 318 |
| Li$_{1.5-3.5}$K$_2$MnO$_4$ | 1.73 | 242.08 | 646.91 | 418 | 1117 |
| Li$_{12-13}$Nb$_{14}$ZnO$_{42}$ | 1.71 | 12.59 | 56.95 | 22 | 98 |
| Li$_{0-1}$WO$_2$ | 1.7 | 120.3 | 985.74 | 204 | 1672 |
| Li$_{0.75-1}$TiO$_2$ | 1.69 | 77.19 | 308.3 | 130 | 520 |
| Li$_{7-9}$Ti$_7$Nb$_5$O$_{30}$ | 1.67 | 39.94 | 158.97 | 67 | 265 |
| Li$_{0-2}$V$_3$FeO$_8$ | 1.67 | 152.91 | 593.89 | 255 | 989 |
| LiNb$_2$(PO$_4$)$_3$ | 1.66 | 56.11 | 179.85 | 93 | 298 |
| Li$_{4-5}$V$_5$O$_9$F | 1.66 | 59.24 | 229.22 | 99 | 382 |
| Li$_{2-3}$TiV$_2$O$_6$ | 1.65 | 100.54 | 389.67 | 166 | 643 |
| Li$_{0-1}$MoO$_2$ | 1.65 | 198.71 | 1045.57 | 329 | 1729 |
| Li$_{1-1.25}$CuBO$_3$ | 1.65 | 51.14 | 187.3 | 84 | 309 |
| L$_{0-3}$Ti$_4$VO$_8$ | 1.64 | 205.52 | 898.94 | 337 | 1473 |
| Li$_{0-1}$Na$_3$SbP$_2$O$_9$ | 1.64 | 66.4 | 201.02 | 109 | 330 |
| Li$_{0-1.75}$Mo$_3$Se$_4$ | 1.63 | 76.16 | 455.65 | 124 | 744 |
| LiTi$_2$(PO$_4$)$_3$ | 1.63 | 133.52 | 373.1 | 217 | 606 |
| Li$_{0-0.5}$TiO$_2$ | 1.62 | 160.8 | 603.26 | 260 | 975 |
| Li$_{3-4}$NbV$_3$O$_8$ | 1.62 | 66.76 | 284.82 | 108 | 461 |
| LiMn(O$_2$F)$_2$ | 1.6 | 126.15 | 310.66 | 201 | 496 |
| LiTi(SiO$_3$)$_2$ | 1.59 | 129.49 | 418.94 | 206 | 667 |

FIG. 9E

| | | | | |
|---|---|---|---|---|
| LiTi(SiO$_3$)$_2$ | 1.58 | 129.49 | 410.47 | 205 | 650 |
| Li$_{0-1}$TiP$_2$O$_7$ | 1.58 | 117.16 | 336.02 | 185 | 531 |
| Li$_{1-2}$VSiO$_4$ | 1.57 | 170.81 | 519.44 | 269 | 817 |
| Li$_{0-1}$SnS$_2$ | 1.56 | 141.22 | 554.79 | 221 | 867 |

FIG. 9E (Cont.)

| Reduced Cell Formula | Average Voltage [V] | Capacity Grav [mAh/g] | Capacity Vol [Ah/L] | Specific E [Wh/kg] | E Density [Wh/L] |
|---|---|---|---|---|---|
| LiTi$_2$(PO$_4$)$_3$ | 1.55 | 133.52 | 371.84 | 207 | 577 |
| Li$_{0-1}$V$_6$F$_{13}$ | 1.55 | 47.9 | 156.48 | 74 | 242 |
| Li$_{0-2}$ReO$_3$ | 1.55 | 216.07 | 1648.57 | 334 | 2549 |
| LiNb$_2$(PO$_4$)$_3$ | 1.48 | 56.11 | 178.52 | 83 | 264 |
| Li$_{0-1}$TiP$_2$O$_7$ | 1.47 | 117.16 | 330.08 | 172 | 484 |
| Li$_{0-0.5}$WO$_2$ | 1.46 | 61.1 | 487.37 | 89 | 713 |
| Li$_{6-7}$VO$_5$F | 1.45 | 135 | 303.13 | 195 | 438 |
| LiBi$_2$(SO$_4$)$_3$ | 1.45 | 37.59 | 158.39 | 54 | 229 |
| Li$_{0-1}$Na$_2$SrVP$_2$O$_9$ | 1.44 | 67.44 | 221.38 | 97 | 318 |
| LiTi$_2$(PO$_4$)$_3$ | 1.44 | 133.52 | 370.33 | 193 | 534 |
| Li$_{0-1}$TiO$_2$ | 1.43 | 308.75 | 1258.6 | 443 | 1804 |
| Li$_{3-4}$TiCr$_3$O$_8$ | 1.43 | 74.53 | 300.8 | 107 | 431 |
| Li$_{5.25-6}$FeO$_4$ | 1.41 | 124.47 | 316.67 | 175 | 446 |
| Li$_{0-1}$RbVPO$_5$ | 1.41 | 105.38 | 325.28 | 149 | 459 |
| Li$_{5-6}$FeS$_4$ | 1.4 | 118.72 | 240.21 | 166 | 337 |
| Li$_{2-3}$Mn$_3$FeO$_8$ | 1.37 | 72.54 | 311.66 | 99 | 427 |
| Li$_{0.13-0.75}$TiO$_2$ | 1.35 | 196.9 | 742.49 | 265 | 1001 |
| Li$_{1-2}$FeS$_2$ | 1.35 | 200.22 | 545.82 | 270 | 735 |
| Li$_{7-8}$VO$_5$F | 1.34 | 130.44 | 334.57 | 175 | 449 |
| Li$_{0-1}$Na$_2$CaVP$_2$O$_9$ | 1.32 | 76.6 | 228.66 | 101 | 301 |

FIG. 9F

| Reduced Cell Formula | Average Voltage [V] | Capacity Grav [mAh/g] | Capacity Vol [Ah/L] | Specific E [Wh/kg] | E Density [Wh/l] |
|---|---|---|---|---|---|
| $LiNa_5Fe_2P_2(CO_7)_2$ | 3 | 49.31 | 144.32 | 148 | 433 |
| $Li_{0-0.5}CuO$ | 2.99 | 161.42 | 855.6 | 482 | 2557 |
| $Li_{0-1}CrPO_4$ | 2.99 | 174.14 | 565.48 | 521 | 1692 |
| $Li_{0-1}V_3O_5F$ | 2.99 | 103.58 | 418.06 | 309 | 1249 |
| $Li_{1-3}VF_5$ | 2.99 | 321.44 | 831.22 | 961 | 2485 |
| $LiV(CO_3)_2$ | 2.99 | 75.33 | 187.5 | 226 | 561 |
| $Li_{0.25-0.63}FeBO_3$ | 2.98 | 84.46 | 273.83 | 251 | 815 |
| $Li_{0-1}KMnP_3HO_{10}$ | 2.98 | 75.52 | 193.06 | 225 | 575 |
| $Li_{0-2}Fe_2C_2O_7$ | 2.98 | 204.91 | 564.12 | 610 | 1680 |
| $LiRbV(PO_4)_2$ | 2.98 | 80.41 | 244.99 | 239 | 729 |
| $Li_{0.33-0.67}MnO_2$ | 2.98 | 97.57 | 385.08 | 291 | 1148 |
| $Li_{1-2}Fe_2C_2O_7$ | 2.97 | 102.46 | 320.55 | 304 | 952 |
| $Li_{0-2}NiO_2$ | 2.97 | 256.29 | 918.08 | 762 | 2731 |
| $Li_{0-1}Mn_2OF_3$ | 2.97 | 141.2 | 506.19 | 420 | 1505 |
| $Li_{1-1.5}CuO_2$ | 2.96 | 126.47 | 494.24 | 374 | 1461 |
| $LiMn_3(SnO_5)_2$ | 2.96 | 44.9 | 211.55 | 133 | 627 |
| $Li_{0.5-1}CrPO_4$ | 2.96 | 87.07 | 279.86 | 258 | 829 |
| $Li_{0.5-1}CuCO_3$ | 2.96 | 102.69 | 336.06 | 304 | 994 |
| $Li_{0.13-0.88}FeBO_3$ | 2.95 | 166.5 | 547.09 | 491 | 1613 |
| $LiFe_3(BO_3)_4$ | 2.95 | 122.53 | 374.83 | 362 | 1107 |
| $Li_{0-1}MoP_2O_7$ | 2.95 | 96.82 | 319.27 | 286 | 942 |
| $LiSn(PO_3)_4$ | 2.95 | 60.7 | 189.22 | 179 | 559 |
| $Li_{0-1}FeO_2$ | 2.95 | 282.76 | 1295.81 | 835 | 3829 |
| $LiNa_2Mn(PO_3)_5$ | 2.94 | 53.31 | 138 | 157 | 406 |
| $LiTi(Po_3)_4$ | 2.93 | 72.3 | 173.51 | 212 | 508 |
| $Li_{0-1}FePO_4$ | 3.8 | 169.89 | 496.86 | 497 | 1454 |

FIG. 10A

| | | | | |
|---|---|---|---|---|
| Li$_{0-1}$V$_2$O$_5$ | 2.93 | 141.94 | 453.98 | 416 | 1330 |
| Li$_{3-5}$FeNi$_3$O$_8$ | 2.93 | 135.83 | 597.63 | 398 | 1753 |
| Li$_{2-3}$CrO$_4$ | 2.92 | 195.89 | 507.75 | 572 | 1482 |
| Li$_{1-2}$FeSiO$_4$ | 2.92 | 165.64 | 508.47 | 483 | 1482 |
| Li$_{0-1}$MnO$_2$ | 2.92 | 285.49 | 1152.13 | 833 | 3360 |
| L$_{1.5-2}$VO$_2$F | 2.91 | 115.7 | 399.73 | 336 | 1161 |
| Li$_{0-1}$VO$_2$ | 2.91 | 298.19 | 1170.56 | 868 | 3409 |
| Li$_{2-3}$VO$_3$F | 2.91 | 193.15 | 612.14 | 562 | 1782 |
| LiV$_2$(PO$_4$)$_3$ | 2.91 | 258.6 | 752.7 | 752 | 2188 |
| Li$_{1.5-3}$CrPO$_4$CO$_3$ | 2.91 | 176.48 | 467.83 | 514 | 1362 |
| Li$_{0-1}$NbO$_2$ | 2.9 | 203.28 | 1123.52 | 589 | 3258 |
| Li$_{1-2}$CoSnO$_4$ | 2.9 | 104.89 | 541.92 | 304 | 1571 |
| Li$_{0-3}$Mo$_4$P$_7$O$_{24}$ | 2.89 | 27.03 | 89.53 | 78 | 259 |
| LiKSb(PO$_4$)$_2$ | 2.89 | 73.49 | 234.18 | 212 | 676 |
| LiCu(HO)$_4$ | 2.89 | 184.26 | 518.05 | 532 | 1496 |
| LiBa$_2$(CuO$_2$)$_3$ | 2.87 | 47.17 | 259.44 | 136 | 746 |
| Li$_{2-3}$VO$_3$F | 2.87 | 193.15 | 614.49 | 554 | 1763 |
| Li$_{0-3}$Sb$_{17}$S$_{27}$ | 2.86 | 27.2 | 115.06 | 78 | 329 |
| LiCr(PO$_3$)$_3$ | 2.86 | 90.59 | 265.75 | 259 | 761 |
| Li$_{2-4}$VGa$_3$O$_8$ | 2.86 | 128.89 | 487.6 | 368 | 1393 |
| Li$_{0-1}$FePO$_4$ | 2.86 | 169.89 | 419.63 | 487 | 1202 |
| LiV(CO$_3$)$_2$ | 2.86 | 289.99 | 635.11 | 831 | 1819 |
| Li$_{0-3}$Sb$_{11}$S$_{18}$ | 2.85 | 41.5 | 172.75 | 118 | 492 |
| LiCr$_2$(SO$_4$)$_3$ | 2.85 | 132.01 | 355.14 | 377 | 1013 |
| Li$_{0-3}$Mn$_5$O$_8$ | 2.85 | 189.85 | 834.92 | 542 | 2383 |
| LiV(CO$_3$)$_2$ | 2.85 | 289.99 | 690.61 | 826 | 1966 |

FIG. 10B

| | | | | |
|---|---|---|---|---|
| $LiCoSn_3(PO_4)_4$ | 2.85 | 130.31 | 495.4 | 371 | 1411 |
| $Li_{3-4}MnOF_4$ | 2.85 | 153.42 | 429.99 | 437 | 1226 |
| $Li_{2-4}Fe_2Si_3O_{10}$ | 2.84 | 139.7 | 416 | 397 | 1181 |
| $Li_{0-2}MnVO_4$ | 2.84 | 291.7 | 1163.36 | 830 | 3309 |

FIG. 10B (Cont.)

| | | | | |
|---|---|---|---|---|
| $Li_{3-4}VO_3F_2$ | 2.84 | 162.73 | 489.7 | 463 | 1392 |
| $Li_{0-2}V_2F_7$ | 2.84 | 215.49 | 632.02 | 612 | 1796 |
| $LiCr_3(P_2O_7)_2$ | 2.83 | 103.53 | 319.62 | 293 | 906 |
| $Li_{2-2.5}FePO_4CO_3$ | 2.83 | 58.73 | 161.46 | 166 | 456 |
| $Li_{0-1}YMo_3O_8$ | 2.83 | 52.38 | 262.44 | 148 | 742 |
| $LiMo_2(PO_4)_3$ | 2.83 | 55.41 | 171.54 | 157 | 486 |
| $LiMN_2Fe(BO_3)_4$ | 2.83 | 62.51 | 191.29 | 177 | 541 |
| $Li_{1-4}V_3CrO_8$ | 2.82 | 222.99 | 881.86 | 628 | 2483 |
| $Li_{0-2}AlVO_4$ | 2.82 | 172.02 | 621.91 | 486 | 1756 |
| $Li_{4-5}V_2Fe_5O_{12}$ | 2.81 | 44.1 | 193.59 | 124 | 544 |
| $Li_{2-5}Ti_2Mn5O_{12}$ | 2.81 | 134.65 | 554.1 | 378 | 1555 |
| $Li_{0-2}VPO_4F$ | 2.81 | 299.8 | 906.47 | 842 | 2547 |
| $Li_{0-2}VP_2O_7$ | 2.81 | 224.5 | 644.45 | 631 | 1812 |
| $Li_{2-3}Mn_3SbO_8$ | 2.81 | 61.56 | 269.3 | 173 | 756 |
| $Li_{0-1}SbPHO_5$ | 2.81 | 111.36 | 405.63 | 313 | 1140 |
| $Li_{0-1}Fe5P_3O_{13}$ | 2.8 | 45.65 | 168.06 | 128 | 470 |
| $Li_{0-1}Mn_5O_3F_5$ | 2.8 | 63.12 | 235.57 | 177 | 659 |
| $Li_{0.36-0.73}VO_2$ | 2.79 | 110.76 | 426.48 | 309 | 1191 |
| $Li_{0-1}Mo_2P_3O_{11}$ | 2.78 | 57.3 | 202.72 | 159 | 563 |
| $Li_{2-3}Na_2CoO_4$ | 2.77 | 141.26 | 406.45 | 391 | 1126 |
| $Li_{0-1}Cr_6P_7O_{24}$ | 2.77 | 29.14 | 93.52 | 81 | 259 |
| $LiSn(PO_3)_4$ | 2.77 | 60.7 | 162.09 | 168 | 449 |
| $Li_{1-2}FeSiO_4$ | 2.76 | 165.64 | 507.75 | 457 | 1402 |
| $Li_{0.5-1}MnO_2$ | 2.76 | 142.75 | 598.29 | 394 | 1652 |
| $Li_{3-4}NbFe_3O_8$ | 2.75 | 64.4 | 279.36 | 177 | 767 |
| $L_{1-3}P_2WO_8$ | 2.75 | 135.84 | 596.31 | 374 | 1641 |

FIG. 10C

| | | | | |
|---|---|---|---|---|
| LiV(CO$_3$)$_2$ | 2.75 | 217.5 | 511.18 | 597 | 1404 |
| LiCr$_2$(SO$_4$)$_3$ | 2.74 | 132.01 | 370.45 | 361 | 1013 |
| LiFe$_5$(PO$_4$)$_4$ | 2.74 | 79.65 | 277.8 | 218 | 761 |
| LiCr(PO$_4$)$_2$ | 2.74 | 99.37 | 256.32 | 272 | 703 |

FIG. 10C (Cont.)

| | | | | |
|---|---|---|---|---|
| $Li_{2-3}FePO_5$ | 2.74 | 142.84 | 406.83 | 392 | 1116 |
| $Li_{3-4}Mn_2V_5O_{12}$ | 2.74 | 45.87 | 189.6 | 126 | 520 |
| $Li_{1-3}VPO_4CO_3$ | 2.74 | 236.4 | 634.96 | 648 | 1741 |
| $Li_{0-1}Mn_5O_3F_5$ | 2.74 | 63.12 | 239.02 | 173 | 654 |
| $LiV_3(O_2F)_2$ | 2.74 | 102.39 | 403.22 | 280 | 1104 |
| $Li_{4-6}CoO_4$ | 2.73 | 325.7 | 874.4 | 888 | 2385 |
| $Li_{4-6}Ti_9O_{20}$ | 2.73 | 67.64 | 235.5 | 185 | 642 |
| $Li_{7-8}MnO_5F$ | 2.73 | 127.95 | 329.54 | 349 | 900 |
| $LiTi(FeO_2)_4$ | 2.73 | 191.41 | 855.96 | 522 | 2335 |
| $Li_{0-1}V_4P_7O_{24}$ | 2.73 | 33.03 | 97.23 | 90 | 266 |
| $Li_{2-3}FePO_4CO_3$ | 2.73 | 115.7 | 318.29 | 316 | 869 |
| $Li_{3-6}V_5O_{12}$ | 2.73 | 164.65 | 614.99 | 450 | 1679 |
| $Li_{1-3}SiSbCO_7$ | 2.73 | 181.91 | 566.97 | 496 | 1545 |
| $LiV_4(OF_3)_3$ | 2.73 | 237.96 | 808.53 | 649 | 2206 |
| $LiNb(PO_3)_4$ | 2.72 | 64.47 | 189.59 | 175 | 516 |
| $Li_{1-2}FeCO_4$ | 2.72 | 183.91 | 464.52 | 499 | 1261 |
| $Li_{1-2}FeSiO_4$ | 2.71 | 165.64 | 498.57 | 449 | 1353 |
| $Li_{0-2}Ti3VO_8$ | 2.71 | 159.33 | 592.09 | 432 | 1604 |
| $LiNi(PS_3)_2$ | 2.71 | 83.76 | 220.96 | 227 | 599 |
| $LiZrNb(TeO_6)_2$ | 2.71 | 40.66 | 198.86 | 110 | 540 |
| $LiV_3(FeO_5)_2$ | 2.71 | 59.26 | 234.16 | 161 | 634 |
| $Li_{0-2}SnP_2O_7$ | 2.7 | 174.87 | 572.1 | 472 | 1543 |
| $LiV(PO_3)_3$ | 2.7 | 90.91 | 269.96 | 246 | 729 |
| $Li_{3-4}Nb_3TeO_{12}$ | 2.7 | 42.81 | 198.96 | 116 | 538 |
| $LiCrFe_3(PO_4)_6$ | 2.7 | 31.98 | 92.11 | 86 | 249 |
| $Li_{0-1}V_2P_3O_{10}$ | 2.69 | 74.09 | 238.08 | 200 | 641 |

FIG. 10D

| | | | | |
|---|---|---|---|---|
| $Li_{0\text{-}1}CrPO_4$ | 2.69 | 174.14 | 507.72 | 468 | 1364 |
| $LiV_2(SO_4)_3$ | 2.69 | 132.7 | 361.92 | 357 | 973 |
| $Li_{0\text{-}3}V_2P_5O_{16}$ | 2.69 | 150.69 | 405.32 | 406 | 1091 |
| $Li_{0.5\text{-}1}CrPO_4$ | 2.69 | 87.07 | 244.7 | 234 | 659 |

FIG. 10D (Cont.)

| | | | | |
|---|---|---|---|---|
| Li$_{0-2}$SnP$_2$O$_7$ | 2.68 | 174.87 | 567.59 | 469 | 1521 |
| LiCr$_4$(PO$_4$)$_3$ | 2.68 | 53.62 | 171.19 | 144 | 459 |
| Li$_{2-3}$Co$_3$NiO$_8$ | 2.68 | 69.74 | 349.19 | 187 | 934 |
| LiFe$_4$(PO$_4$)$_3$ | 2.68 | 52.02 | 190.41 | 140 | 511 |
| LiTi(PO$_3$)$_4$ | 2.68 | 72.3 | 193.04 | 194 | 518 |
| Li$_{3-5}$Mn$_3$O$_5$F$_3$ | 2.68 | 159.29 | 570.14 | 427 | 1530 |
| Li$_{1-2}$MnBO$_4$ | 2.66 | 186.6 | 581.32 | 496 | 1547 |
| Li$_{0-1}$WCl$_6$ | 2.65 | 66.42 | 205.92 | 176 | 546 |
| Li$_{0-2}$SnP$_2$O$_7$ | 2.65 | 174.87 | 569.5 | 464 | 1512 |
| Li$_{0-1}$SbPO$_5$ | 2.65 | 111.83 | 431.82 | 296 | 1145 |
| Li$_{4-8}$Ti15O$_{32}$ | 2.64 | 83.4 | 294.68 | 220 | 778 |
| Li$_{0-1}$CrPO$_4$ | 2.64 | 174.14 | 571.46 | 460 | 1509 |
| Li$_{0-1}$CrPO$_4$ | 2.64 | 174.14 | 571.92 | 460 | 1510 |
| Li$_{1.33-2}$MnNiO$_4$ | 2.63 | 93.3 | 416.27 | 245 | 1095 |
| Li$_{1-2}$MnFeO$_4$ | 2.62 | 142.06 | 584.59 | 372 | 1531 |
| Li$_{0-1}$PWO$_5$ | 2.62 | 88.82 | 459.93 | 233 | 1206 |
| LiV$_3$(P$_2$O$_7$)$_2$ | 2.62 | 104.17 | 326.81 | 273 | 858 |
| Li$_{0-1}$K$_2$MnPO$_4$CO$_3$ | 2.62 | 90.84 | 233.87 | 238 | 613 |
| LiNb(PO$_4$)$_2$ | 2.61 | 90.32 | 271.43 | 236 | 710 |
| LiVSn(PO$_4$)$_2$ | 2.61 | 143.52 | 513.32 | 374 | 1339 |
| Li$_{2-4}$CrO$_4$ | 2.6 | 372.87 | 964.34 | 970 | 2508 |
| Li$_{1-2}$TiFeO$_4$ | 2.6 | 147.59 | 576.99 | 384 | 1502 |
| LiFe$_3$(SnO$_5$)$_2$ | 2.59 | 89.39 | 436.51 | 231 | 1129 |
| Li$_{0-1}$La2MoO$_6$ | 2.58 | 56.22 | 339.28 | 145 | 876 |
| Li$_{1.33-2}$TiFeO$_4$ | 2.58 | 98.39 | 383.22 | 254 | 990 |
| Li$_{0.75-3.25}$K$_2$FeO$_4$ | 2.58 | 303.74 | 817.33 | 785 | 2111 |

FIG. 10E

| | | | | |
|---|---|---|---|---|
| $Li_{1-2}V_2F_7$ | 2.58 | 107.74 | 293.12 | 278 | 757 |
| $Li_{3.5-4}CoO_3$ | 2.57 | 99.49 | 270.69 | 255 | 695 |
| $Li_{0-2}V_2OF_5$ | 2.57 | 236.39 | 788.39 | 606 | 2023 |
| $Li_{1.33-2}CuO_2$ | 2.56 | 163.28 | 585.66 | 418 | 1500 |

FIG. 10E (Cont.)

| | | | | |
|---|---|---|---|---|
| $Li_{0.2-1}VO_2$ | 2.56 | 238.55 | 936.61 | 612 | 2402 |
| $Li_{1-2}KMnPO_4CO_3$ | 2.56 | 101.95 | 253.31 | 261 | 648 |
| $Li_{0-3}V_6O_{13}$ | 2.56 | 150.44 | 544.68 | 386 | 1396 |
| $LiNb(PO_3)_4$ | 2.55 | 64.47 | 192.95 | 164 | 492 |
| $Li_{0-1}SrVPO_6$ | 2.54 | 98.36 | 362.08 | 250 | 919 |
| $LiV(OF)_2$ | 2.54 | 189.06 | 605.73 | 480 | 1537 |
| $Li_{0-0.25}MnO_2$ | 2.53 | 75.56 | 312.62 | 191 | 790 |
| $LiNb(PO_3)_4$ | 2.52 | 64.47 | 165.7 | 162 | 417 |
| $LiV(CO_3)_2$ | 2.52 | 145 | 338.11 | 365 | 851 |
| $Li_{2-3}K_2CoO_4$ | 2.51 | 120.75 | 351.52 | 303 | 883 |
| $Li_{4-7}Ti_{11}O_{24}$ | 2.5 | 83.83 | 294.61 | 210 | 737 |
| $LiV(CO_3)_2$ | 2.5 | 217.5 | 556.38 | 544 | 1391 |

FIG. 10F

HYBRID ELECTRODES WITH BOTH INTERCALATION AND CONVERSION MATERIALS

CROSS-REFERENCE TO RELATED APPLICATIONS

This application is a divisional of U.S. application Ser. No. 14/631,715, entitled "HYBRID ELECTRODES WITH BOTH INTERCALATION AND CONVERSION MATERIALS," filed on Feb. 25, 2015, which claims priority to U.S. Provisional Patent Application No. 61/944,502, filed Feb. 25, 2014, entitled HYBRID ELECTRODES WITH BOTH INTERCALATION AND CONVERSION MATERIALS, and U.S. Provisional Patent Application No. 62/027,908, filed Jul. 23, 2014, entitled HYBRID ELECTRODES WITH BOTH INTERCALATION AND CONVERSION MATERIALS. Each of these patent applications is incorporated by reference herein for all purposes in their entirety.

BACKGROUND OF THE INVENTION

Recently, with the shortage of fossil-fuels and an increasing awareness of the adverse environmental effects from consuming fossil-fuels, public and private sectors have researched alternative and environmentally friendly technologies for storing and delivering energy, some of which include rechargeable batteries (i.e., secondary batteries, e.g., traction batteries). While many types of rechargeable batteries have been developed, the respective advantages and disadvantages of each type has prevented the widespread commercialization of rechargeable batteries in many applications, particularly automotive applications (e.g., electric and hybrid vehicles), in part due to an inability to tailor the energy, power, cycle-ability, and cost considerations for a given battery to a given application.

The suitability of a particular battery type(s) for a commercial application depends on the battery's physical and performance characteristics as well as the cost of the constituent materials and the associated methods of assembly. For automotive (e.g., electric and hybrid vehicles) applications, high power and energy capacity, wide voltage operation range, and mechanical durability are all desirable characteristics, but unfortunately many conventional battery devices are insufficient in at least one of these respects for current and future automotive demands. For electric automobiles, batteries need to demonstrate both high energy density for long range driving and also high instantaneous power output for acceleration and/or braking scenarios. Since most high energy density batteries lack high power output capabilities, conventional rechargeable batteries have not been widely adopted for automotive applications. Therefore, new and improved battery devices and methods of making and using the same are needed in the field to which the instant disclosure pertains.

BRIEF SUMMARY OF THE INVENTION

The disclosure herein sets forth positive electrode compositions for electrochemical cells which include more than one type of positive electrode active material. In some embodiments, these electrodes include a conversion chemistry active material and an intercalation chemistry active material. In some of these embodiments, the intercalation voltage for the intercalation material may be above the conversion voltage for the conversion chemistry material, in which case the intercalation chemistry is utilized during recharge to provide a voltage ceiling. In some other embodiments, the intercalation voltage for the intercalation material may be below the conversion voltage for the conversion chemistry material, in which case the intercalation chemistry is utilized during discharge to provide a voltage floor. In certain embodiments, the upper operating voltage plateau (i.e., Voltage v. Li at full charge) of the conversion chemistry active material is below the operating voltage plateau for the intercalation chemistry active material, in which case the intercalation material provides a voltage ceiling when the electrochemical cell recharges. In certain embodiments, the upper operating voltage plateau (i.e., Voltage v. Li at full charge) of the conversion chemistry active material is between the upper operating voltage plateau and lower operating voltage plateau for the intercalation chemistry active material, in which case the intercalation material provides a voltage ceiling when the electrochemical cell recharges. In certain other embodiments, the lower operating voltage plateau (i.e., lower voltage limit, Voltage v. Li when discharged) of the intercalation chemistry active material is above the lower operating voltage plateau for the intercalation chemistry active material, in which case the intercalation material provides a voltage floor when the electrochemical cell discharges. In certain other embodiments, the operating voltage plateau (i.e., lower voltage limit, Voltage v. Li when discharged) of the intercalation chemistry active material is between the upper operating voltage plateau and the lower operating voltage plateau for the intercalation chemistry active material, in which case the intercalation material provides a voltage floor when the electrochemical cell discharges. In certain embodiments, the intercalation chemistry materials that are mixed with conversion chemistry material operate at a higher voltage than the intercalation regime voltage range for the conversion chemistry material. In certain other embodiments, the intercalation chemistry materials that are mixed with conversion chemistry materials operate at a lower voltage than the conversion regime voltage range for the conversion chemistry material. In yet other embodiments, the intercalation chemistry materials that are mixed with conversion chemistry materials operate at both a higher voltage than the intercalation regime voltage range for the conversion chemistry material and at a lower voltage than the conversion regime voltage range for the conversion chemistry active materials. Also set forth herein are methods of making and using these positive electrodes.

BRIEF DESCRIPTION OF THE DRAWINGS

FIGS. 3A-C show diagrams illustrating a low temperature acceleration operation for an electrochemical cell having a positive electrode which includes either iron trifluoride ($FeF_3$), only, or both iron trifluoride ($FeF_3$) and lithium titanate ($Li_{4.7}Ti_5O_{12}$, i.e., LTO) positive electrode active materials.

FIG. 6 is a table illustrating operating voltages for different materials suitable for use in conversion chemistry reactions.

FIGS. 9A-F show a list of intercalation materials and their corresponding average voltage (between about 1.3-2.5V), for the intercalated amount of Li noted in the Li subscript, that are suitable for use with the positive electrode active materials, e.g., conversion chemistry materials, also set forth herein.

FIGS. 10A-F show a list of intercalation materials and their corresponding average voltage (between about 2.5-3.8V) for the intercalated amount of Li noted in the Li subscript that are suitable for use with the positive electrode active materials, e.g., conversion chemistry materials, also set forth herein.

DETAILED DESCRIPTION OF THE INVENTION

Definitions

Figure 1:
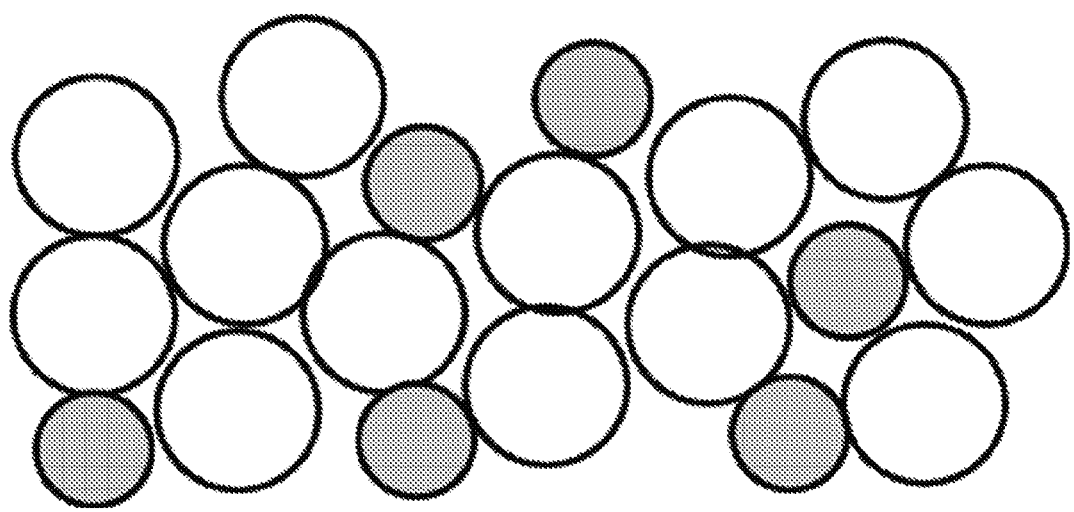
FIG. 1 shows a diagram illustrating a cathode (i.e., positive electrode) active material including randomly mixed intercalation chemistry materials and conversion chemistry materials.

As used herein, the phrase "active material," "active electrode material," or "active material," refers to a material that is suitable for use in a lithium rechargeable battery cell and that is responsible for delivering or receiving lithium ions during the charging and discharging cycles of the battery cell. The active material may undergo a chemical reaction during the charging and discharging cycles. The same battery cell may include a positive active material and a negative active material. For examples, a positive active material may include a metal fluoride that converts to a metal and lithium fluoride during the discharge cycle of the battery cell containing this material.

As used herein, the phrase "at least one member selected from the group," includes a single member from the group, more than one member from the group, or a combination of members from the group. At least one member selected from the group consisting of A, B, and C includes, for example, A, only, B, only, or C, only, as well as A and B as well as A and C as well as B and C as well as A, B, and C or any other all combinations of A, B, and C.

As used herein, a "binder" refers to a material that assists in the adhesion of another material. Binders useful in the present invention include, but are not limited to, polypropylene (PP), atactic polypropylene (aPP), isotactive polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), PE-co-poly(methylene cyclopentane) (PE-co-PMCP), stereoblock polypropylenes, polypropylene polymethylpentene copolymer, polyethylene oxide (PEO), PEO block copolymers, silicone, and the like.

As used herein, the terms "cathode" and "anode" refer to the electrodes of a battery. During a charge cycle in a Li-secondary battery, Li ions leave the cathode and move through an electrolyte and to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode. As used herein, the cathode region is the physical area of the electrochemical cell comprising the cathode. As used herein, the anode region is the physical area of the electrochemical cell comprising the anode. As used herein, the electrolyte region is the physical area of the electrochemical cell electrolyte the cathode.

As used herein, the term "electrolyte" refers to a material that allows ions, e.g., Li$^+$, to migrate therethrough but which does not allow electrons to conduct therethrough. Electrolytes are useful for electrically isolating the cathode and anodes of a secondary battery while allowing ions, e.g., Li$^+$, to transmit through the electrolyte. As used herein, the term "electrolyte," also refers to an ionically conductive and electrically insulating material. Solid electrolytes, in particular, rely on ion hopping through rigid structures. Solid electrolytes may be also referred to as fast ion conductors or super-ionic conductors. Solid electrolytes may be also used for electrically insulating the positive and negative electrodes of a cell while allowing for the conduction of ions, e.g., Li+, through the electrolyte. In this case, a solid electrolyte layer may be also referred to as a solid electrolyte separator. Some electrolytes suitable for use herein include, but are not limited to $Li_2S$—$SiS_2$, Li—$SiS_2$, Li—S—Si, and/or a catholyte consisting essentially of Li, S, and Si, $Li_xSi_yS_z$ where $0.33 \leq x \leq 0.5$, 0, $1 \leq y \leq 0.2$, $0.4 \leq z \leq 0.55$, which may include up to 10 atomic % oxygen, a mixture of $Li_2S$ and $SiS_2$, in which the ratio of $Li_2S:SiS_2$ is 90:10, 85:15, 80:20, 75:25, 70:30, 2:1, 65:35, 60:40, 55:45, or 50:50 molar ratio, $Li_2S$—$SnS_2$, $Li_2S$—SnS, Li—S—Sn, and/or a catholyte consisting essentially of Li, S, and Sn, $Li_xSn_yS_z$ where $0.25 \leq x \leq 0.65$, $0.05 \leq y \leq 0.2$, and $0.25 \leq z \leq 0.65$, a mixture of $Li_2S$ and $SnS_2$ in the ratio of 80:20, 75:25, 70:30, 2:1, or 1:1 molar ratio, which may include up to 10 atomic % oxygen and/or may be doped with Bi, Sb, As, P, B, Al, Ge, Ga, and/or In. Other suitable electrolytes are found, for example, in International Patent Application No. PCT/US2014/038283, filed May 16, 2014, and entitled SOLID STATE CATHOLYTE OR ELECTROLYTE FOR BATTERY USING $Li_4MP_BS_C$ (M=Si, Ge, AND/OR Sn), which is incorporated by reference herein in its entirety. Other suitable electrolytes include $Li_xP_yS_z$ where $0.33 \leq x \leq 0.67$, $0.07 \leq y \leq 0.2$ and $0.4 \leq z \leq 0.55$, or a mixture of $Li_2S:P_2S_5$ wherein the molar ratio is 10:1, 9:1, 8:1, 7:1, 6:1 5:1, 4:1, 3:1, 7:3, 2:1, or 1:1, also $Li_xP_yS_zO_w$ where $0.33 \leq x \leq 0.67$, $0.07 \leq y \leq 0.2$, $0.4 \leq z \leq 0.55$, $0 \leq w \leq 0.15$. Other suitable electrolytes include Li-stuffed garnet oxides that are characterized by a crystal structure related to a garnet crystal structure. Li-stuffed garnets include compounds having the formula $Li_aLa_bM'_cM''_dZr_eO_f$, $Li_aLa_bM'_cM''_dTa_eO_f$, or $Li_aLa_bM'_cM''_dNb_eO_f$ where $4<a<8.5$, $1.5<b<4$, $0 \leq c \leq 2$, $0 \leq d \leq 2$; $0 \leq e < 2$, $10 < f < 13$, and M' and M'' are, independently in each instance, selected from Al, Mo, W, Nb, Sb, Ca, Ba, Sr, Ce, Hf, Rb, or Ta, or $Li_aLa_bZr_cAl_dMe''_eO_f$ where $5<a<7.7$, $2<b<4$, $0 \leq c \leq 2.5$, $0 \leq d \leq 2$, $0 \leq e \leq 2$, $10<f<13$ and Me'' is a metal selected from Nb, Ta, V, W, Mo, or Sb and as described herein. "Garnets," as used herein, also include those garnets described above that are doped with $Al_2O_3$. Garnets, as used herein, also include those garnets described above that are doped so that $Al^{3+}$ substitutes for Li$^+$. As used herein, Li-stuffed garnets, and garnets, generally, include, but are not limited to, $Li_{7.0}La_3(Zr_{t1}+Nb_{t2}+Ta_{t3})O_{12}+0.35Al_2O_3$, wherein (t1+t2+t3=subscript 2) so that the La:(Zr/Nb/Ta) ratio is 3:2. Also, garnet and lithium-stuffed garnets as used herein can include $Li_xLa_3Zr_2O_{12}+yAl_2O_3$, where x ranges from 5.5 to 9 and y ranges from 0 to 1. In some embodiments, x is 7 and y is 1.0. In some embodiments, x is 7 and y is 0.35. In some embodiments, x is 7 and y is 0.7. In some embodiments x is 7 and y is 0.4. Also, garnets as used herein can include $Li_xLa_3Zr_2O_{12}+yAl_2O_3$. Exemplary lithium-stuffed garnets are found in the compositions set forth in International Patent Application Nos. PCT/US2014/059575 and PCT/US2014/059578, filed Oct. 7, 2014, entitled GARNET MATERIALS FOR LI SECONDARY BATTERIES AND METHODS OF MAKING AND USING GARNET MATERIALS.

As used herein, the phrase "conversion chemistry active material," or "conversion chemistry material" refers to a material that undergoes a chemical reaction during the charging and discharging cycles of a secondary battery. Conversion chemistry materials useful in the present invention include, but are not limited to, LiF, Fe, Cu, Ni, $FeF_2$, $FeO_dF_{3-2d}$, $FeF_3$, $CoF_3$, $CoF_2$, $CuF_2$, $NiF_2$, where $0 \leq d \leq 0.5$, and the like. Exemplary conversion chemistry materials are found, for example, in U.S. Patent Publication No. 2014/0117291, filed Oct. 25, 2013, and entitled METAL FLUORIDE COMPOSITIONS FOR SELF FORMED BATTERIES, and in U.S. Provisional Patent Application No. 62/038,059, filed Aug. 15, 2014, entitled DOPED CONVERSION MATERIALS FOR SECONDARY BATTERY CATHODES, all of which are incorporated by reference herein in their entirety. Exemplary conversion chemistry materials are found, for example, in U.S. Patent Application Publication No. 2014/0170493, entitled NANOSTRUCTURED MATERIALS FOR ELECTROCHEMICAL CONVERSION REACTIONS, and filed Jun. 19, 2013 as U.S. patent application Ser. No. 13/922,214, the contents of which are incorporated by reference in their entirety.

As used herein, the term "C-rate" of C/1 is defined as a constant current cycle where the nameplate capacity is discharged in one hour. A C-rate of C/X is defined in reference to that rate, where the charge and discharge current is 1/X of that at C/1, approximately corresponding to a full discharge at constant current in X hours.

As used herein, the phrase "intercalation chemistry material," or "intercalation chemistry active material," refers to a material that undergoes a lithium insertion reaction during the charging and discharging cycles of a secondary battery. For example, intercalation chemistry materials include $LiFePO_4$ and $LiCoO_2$. In these materials, Li$^\rightarrow$ inserts into and also deintercalates out of the intercalation material during the discharging and charging cycles of a secondary battery.

As used herein, a "metal fluoride" (MF) refers to a material including a metal component and a fluorine (F) component. A MF can optionally include a lithium (Li) component. In the charged state, the MF includes a fluoride of a metal which can convert into a lithium fluoride salt and a reduced metal, in the discharged state. For example, the charged state MF can convert to a metal and lithium fluoride during discharge of a battery in accordance with the following reaction: Li+MF→LiF+M. MFs useful with the disclosure herein include, but are not limited to, LiF, $Li_zFeF_3$, $Li_7CuF_2$, $Li_zNiF_2$, $Li_zCoF_2$, $Li_zCoF_3$, $Li_zMnF_2$, $Li_zMnF_3$, where $0 \leq z \leq 3$, and the like. In some embodiments, the MF can be nanodimensioned and, in some embodiments, the MF is in the form of nanodomains. In some embodiments, the MF can be LiF and can further include a nanodimensioned metal including, Fe, Co, Mn, Cu, Ni, Zr, or combinations thereof. MFs useful in the present invention include those set forth in U.S. Patent Application Publication No. 2014/0170493, entitled NANOSTRUCTURED MATERIALS FOR ELECTROCHEMICAL CONVERSION REACTIONS, and filed Jun. 19, 2013 as U.S. patent application Ser. No. 13/922,214, the contents of which are incorporated by reference in their entirety. MFs useful in the present invention also include those set forth in U.S. Provisional Patent Application No. 62/038,059, entitled DOPED CONVERSION MATERIALS FOR SECONDARY BATTERY CATHODES, and filed Aug. 15, 2014, the contents of which are incorporated by reference in their entirety.

As used herein, the phrase "positive electrode" refers to the electrode in a secondary battery towards which positive ions, e.g., Li+, conduct, flow or move during discharge of the battery. As used herein, the phrase "negative electrode" refers to the electrode in a secondary battery from where positive ions, e.g., Li+, flow or move during discharge of the battery. In a battery comprised of a Li-metal electrode and a conversion chemistry electrode (i.e., active material; e.g., $NiF_x$), the electrode having the conversion chemistry materials is referred to as the positive electrode. In some common usages, cathode is used in place of positive electrode, and anode is used in place of negative electrode. When a Li-secondary battery is charged, Li ions move from the positive electrode (e.g., $NiF_x$) towards the negative electrode (Li-metal). When a Li-secondary battery is discharged, Li ions move towards the positive electrode (e.g., $NiF_x$; i.e., cathode) and from the negative electrode (e.g., Li-metal; i.e., anode).

As used herein, the term "catholyte" refers to an ion conductor that is intimately mixed with, or that surrounds, or that contacts the positive electrode active material. Catholytes include those catholytes set forth in International PCT Patent Application No. PCT/US14/38283, entitled SOLID STATE CATHOLYTE OR ELECTROLYTE FOR BATTERY USING $Li_4MP_BS_C$ (M=Si, Ge, AND/OR Sn), filed May 15, 2014, the contents of which are incorporated by reference in their entirety. Catholytes include those catholytes set forth in International PCT Patent Application No. PCT/US2014/059575, entitled GARNET MATERIALS FOR LI SECONDARY BATTERIES AND METHODS OF MAKING AND USING GARNET MATERIALS, filed Oct. 7, 2014, the contents of which are incorporated by reference in their entirety.

As used herein, the phrase "about 70% w/w," refers to a range that includes ±10% around the number qualified by the word about. For example, about 70 includes 63, 64, 65, 66, 67, 68, 69, 70, 71, 72, 73, 74, 75, 76, or 77. For example, about 30 includes 27, 28, 29, 30, 31, 32, or 33.

As used herein, the phrase "substantially segregated," refers to a layered material in which there is an observable distinction between one material which is separate in space from another material. In some examples, when two or more materials are substantially segregated, these materials are separated in space or segregated from each other.

As used herein, the phrase "proximate to" refers to the relative position of two or more materials and means that the material which is proximate to another material is closest to that another material.

As used herein, the phrase "providing" refers to the provision of, generation or, presentation of, or delivery of that which is provided. Providing includes making something available. For example, providing LiF refers to the process of making LiF available, or delivering LiF, such that LiF can be used as set forth in a method described herein.

The disclosure herein is directed to battery devices and their constituent components as well as methods of making and using the same. More specifically, embodiments set forth herein provide a battery electrode (e.g., a positive electrode) that comprises both intercalation chemistry materials and conversion chemistry materials, which can be used in automotive applications. There are other embodiments as well.

The following description is presented to enable one of ordinary skill in the art to make and use devices and components set forth herein and to incorporate them in the context of particular applications. Various modifications, as well as a variety of uses in different applications will be readily apparent to those skilled in the art, and the general principles defined herein may be applied to a wide range of embodiments. Thus, the instant disclosure is not intended to be limited to the embodiments presented, but is to be accorded the widest scope consistent with the principles and novel features disclosed herein.

In the following detailed description, numerous specific details are set forth in order to provide a more thorough understanding of the disclosure set forth herein. However, it will be apparent to one skilled in the art that the instant disclosure may be practiced without necessarily being limited to these specific details. In other instances, well-known structures and devices are shown in block diagram form, rather than in detail, in order to avoid obscuring the disclosure set forth herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Under most common operating conditions (e.g., temperature above 0° C.), secondary energy storage devices that rely on conversion chemistry cathodes can provide higher energy density and better performance than batteries with intercalation chemistry cathodes. For example, conversion chemistry cathodes can provide an energy density of over 1000 mWh/g. In addition, certain types of conversion chemistry cathode can operate at high temperature level (e.g., over 50° C., or over 80° C., or over 100° C.). For example, conversion chemistry material and processes thereof are described in U.S. patent application Ser. No. 13/922,214, filed Jun. 19, 2013, entitled NANOSTRUCTURED MATERIALS FOR ELECTROCHEMICAL CONVERSION REACTIONS, which is incorporated by reference herein in its entirety for all purposes. For example, conversion chemistry materials and processes thereof are described in U.S. Provisional Patent Application No. 62/038,059, filed Aug. 15, 2014, entitled DOPED CONVERSION MATERIALS FOR SECONDARY BATTERY CATHODES, and in U.S. Provisional Patent Application No. 62/043,353, filed Aug. 28, 2014, entitled DOPED CONVERSION MATERIALS FOR SECONDARY BATTERY CATHODES, both provisional patent applications of which are incorporated by reference herein in their entirety for all purposes.

There are specific performance characteristics and operating conditions for conversion chemistry cathodes. According to implementations of the disclosure herein, a cathode (i.e., positive electrode) may include active material particles with fast kinetics (high power capability) and active material particles with slower kinetics but high energy density. A conversion chemistry cathode can provide a high level of energy density, but in some conditions, low power density. For instance, at low temperature (<0° C. for example), a conversion material may have a low power density compared to an intercalation material. In comparison, an intercalation chemistry cathode typically has relatively low energy density, but relatively high power density.

Thus it is to be appreciated that embodiments disclosed herein provide positive electrodes that include conversion chemistry particles of high energy density (e.g., $FeF_2$, $FeO_xF_{3-2x}$, $FeF_3$, $CoF_3$, $CuF_2$, $NiF_2$, etc.), with intercalation oxide particles (e.g., $LiMPO_4$ (M=Fe, Ni, Co, Mn), $Li_xTi_yO_z$, wherein x is from 0 to 8, y is from 1 to 12, z is from 1 to 24, $LiMn_2O_4$, $LiMn_{2-a}Ni_aO_4$, wherein a is from 0 to 2, $LiCoO_2$, $Li(NiCoMn)O_2$, $Li(NiCoAl)O_2$, Nickel Cobalt Aluminum Oxides [NCA], and related intercalation oxides). Additional intercalation oxide particles are found in U.S. Provisional Patent Application No. 62/096,510, entitled LITHIUM RICH NICKEL MANGAGESE OXIDE, filed Dec. 23, 2014, the contents of which are herein incorporated by reference in its entirety for all purposes. To obtain desired performance, conversion and intercalation materials are mixed (e.g., homogeneously or heterogeneously depending on the application), layered, multilayered, or graded, and operated according to the methods set forth herein. For example, under conditions of pulse (high power demand) regenerative charge or pulse discharge, the power may be drawn from the intercalation chemistry active materials. Depending on the materials selected and co-formulated, the intercalation voltage may be above or below the conversion voltage. If above, the intercalation chemistry is utilized during recharge to provide a voltage ceiling, and if below, the intercalation chemistry is utilized during discharge to provide a voltage floor. Detailed descriptions are provided below.

Depending on the implementation, intercalation and conversion materials can be mixed in various ways. FIG. 1 is a simplified diagram illustrating a cathode material comprising randomly mixed intercalation material and conversion material according to an embodiment of the disclosure set forth herein. This diagram is merely an example, which should not unduly limit the scope of the claims. One of ordinary skill in the art would recognize many variations, alternatives, and modifications. In FIG. 1, shaded circles represent intercalation material particles, and the unshaded circles represent conversion material particles. For automotive applications, where batteries are used to power electric vehicles (or hybrid vehicles with electric motors), the energy capacity is often more important than power capacity for most operations. As such, in some examples herein, the conversion chemistry materials, which have a relatively higher energy capacity than intercalation materials, are formulated as the majority component in a hybrid positive electrode which includes both conversion chemistry materials and intercalation chemistry materials. For example, as shown in FIG. 1, a smaller quantity of intercalation chemistry material is provided than the conversion chemistry material. In some examples, the composition of a cathode materials set forth herein has less than 20% intercalation material with the remaining percentage being the conversion chemistry material. Depending on the implementation, ratios between intercalation material and conversion material may vary.

In some examples, the respective volume ratio of conversion chemistry active material to intercalation chemistry active material is 99:1. In some other examples, the respective volume ratio of conversion chemistry active material to intercalation chemistry active material is 98:2. In other examples, the respective volume ratio of conversion chemistry active material to intercalation chemistry active material is 97:3. In certain examples, the respective volume ratio of conversion chemistry active material to intercalation chemistry active material is 96:4. In some examples, the respective volume ratio of conversion chemistry active material to intercalation chemistry active material is 95:5. In some other examples, the respective volume ratio of conversion chemistry active material to intercalation chemistry active material is 94:6. In other examples, the respective volume ratio of conversion chemistry active material to intercalation chemistry active material is 93:7. In certain examples, the respective volume ratio of conversion chemistry active material to intercalation chemistry active material is 92:8. In some examples, the respective volume ratio of conversion chemistry active material to intercalation chemistry active material is 91:9. In some other examples, the respective volume ratio of conversion chemistry active material to intercalation chemistry active material is 90:10. In other examples, the respective volume ratio of conversion chemistry active material to intercalation chemistry active material is 89:11. In certain examples, the respective volume ratio of conversion chemistry active material to intercalation chemistry active material is 88:12. In some examples, the respective volume ratio of conversion chemistry active material to intercalation chemistry active material is 87:13. In some other examples, the respective volume ratio of conversion chemistry active material to intercalation chemistry active material is 86:14. In other examples, the respective volume ratio of conversion chemistry active material to intercalation chemistry active material is 85:15. In certain examples, the respective volume ratio of conversion chemistry active material to intercalation chemistry active material is 84:16. In some examples, the respective volume ratio of conversion chemistry active material to intercalation chemistry active material is 83:17. In some other examples, the respective volume ratio of conversion chemistry active material to intercalation chemistry active material is 82:18. In other examples, the respective volume ratio of conversion chemistry active material to intercalation chemistry active material is 81:19. In certain examples, the respective volume ratio of conversion chemistry active material to intercalation chemistry active material is 80:20. In some examples, the respective volume ratio of conversion chemistry active material to intercalation chemistry active material is 79:21. In some other examples, the respective volume ratio of conversion chemistry active material to intercalation chemistry active material is 78:22. In other examples, the respective volume ratio of conversion chemistry active material to intercalation chemistry active material is 77:23. In certain examples, the respective volume ratio of conversion chemistry active material to intercalation chemistry active material is 76:24. In some examples, the respective volume ratio of conversion chemistry active material to intercalation chemistry active material is 75:15. In some other examples, the respective volume ratio of conversion chemistry active material to intercalation chemistry active material is 74:26. In other examples, the respective volume ratio of conversion chemistry active material to intercalation chemistry active material is 73:27. In certain examples, the respective volume ratio of conversion chemistry active material to intercalation chemistry active material is 72:28. In some examples, the respective volume ratio of conversion chemistry active material to intercalation chemistry active material is 71:29. In some other examples, the respective volume ratio of conversion chemistry active material to intercalation chemistry active material is 70:30. In other examples, the respective volume ratio of conversion chemistry active material to intercalation chemistry active material is 69:31. In certain examples, the respective volume ratio of conversion chemistry active material to intercalation chemistry active material is 68:32. In some examples, the respective volume ratio of conversion chemistry active material to intercalation chemistry active material is 67:33. In some other examples, the respective volume ratio of conversion chemistry active material to intercalation chemistry active material is 66:34. In other examples, the respective volume ratio of conversion chemistry active material to intercalation chemistry active material is 65:35. In certain examples, the respective volume ratio of conversion chemistry active material to intercalation chemistry active material is 64:36. In some examples, the respective volume ratio of conversion chemistry active material to intercalation chemistry active material is 63:37. In some other examples, the respective volume ratio of conversion chemistry active material to intercalation chemistry active material is 62:38. In other examples, the respective volume ratio of conversion chemistry active material to intercalation chemistry active material is 61:39. In certain examples, the respective volume ratio of conversion chemistry active material to intercalation chemistry active material is 60:40. In some examples, the respective volume ratio of conversion chemistry active material to intercalation chemistry active material is 59:41. In some other examples, the respective volume ratio of conversion chemistry active material to intercalation chemistry active material is 58:42. In other examples, the respective volume ratio of conversion chemistry active material to intercalation chemistry active material is 57:43. In certain examples, the respective volume ratio of conversion chemistry active material to intercalation chemistry active material is 56:44. In some examples, the respective volume ratio of conversion chemistry active material to intercalation chemistry active material is 55:45. In some other examples, the respective volume ratio of conversion chemistry active material to intercalation chemistry active material is 54:46. In other examples, the respective volume ratio of conversion chemistry active material to intercalation chemistry active material is 53:47. In certain examples, the respective volume ratio of conversion chemistry active material to intercalation chemistry active material is 52:48. In some examples, the respective volume ratio of conversion chemistry active material to intercalation chemistry active material is 51:49.

In some examples, the respective weight ratio of conversion chemistry active material to intercalation chemistry active material is 99:1. In some other examples, the respective weight ratio of conversion chemistry active material to intercalation chemistry active material is 98:2. In other examples, the respective weight ratio of conversion chemistry active material to intercalation chemistry active material is 97:3. In certain examples, the respective weight ratio of conversion chemistry active material to intercalation chemistry active material is 96:4. In some examples, the respective weight ratio of conversion chemistry active material to intercalation chemistry active material is 95:5. In some other examples, the respective weight ratio of conversion chemistry active material to intercalation chemistry active material is 94:6. In other examples, the respective weight ratio of conversion chemistry active material to intercalation chemistry active material is 93:7. In certain examples, the respective weight ratio of conversion chemistry active material to intercalation chemistry active material is 92:8. In some examples, the respective weight ratio of conversion chemistry active material to intercalation chemistry active material is 91:9. In some other examples, the respective weight ratio of conversion chemistry active material to intercalation chemistry active material is 90:10. In other examples, the respective weight ratio of conversion chemistry active material to intercalation chemistry active material is 89:11. In certain examples, the respective weight ratio of conversion chemistry active material to intercalation chemistry active material is 88:12. In some examples, the respective weight ratio of conversion chemistry active material to intercalation chemistry active material is 87:13. In some other examples, the respective weight ratio of conversion chemistry active material to intercalation chemistry active material is 86:14. In other examples, the respective weight ratio of conversion chemistry active material to intercalation chemistry active material is 85:15. In certain examples, the respective weight ratio of conversion chemistry active material to intercalation chemistry active material is 84:16. In some examples, the respective weight ratio of conversion chemistry active material to intercalation chemistry active material is 83:17. In some other examples, the respective weight ratio of conversion chemistry active material to intercalation chemistry active material is 82:18. In other examples, the respective weight ratio of conversion chemistry active material to intercalation chemistry active material is 81:19. In certain examples, the respective weight ratio of conversion chemistry active material to intercalation chemistry active material is 80:20. In some examples, the respective weight ratio of conversion chemistry active material to intercalation chemistry active material is 79:21. In some other examples, the respective weight ratio of conversion chemistry active material to intercalation chemistry active material is 78:22. In other examples, the respective weight ratio of conversion chemistry active material to intercalation chemistry active material is 77:23. In certain examples, the respective weight ratio of conversion chemistry active material to intercalation chemistry active material is 76:24. In some examples, the respective weight ratio of conversion chemistry active material to intercalation chemistry active material is 75:15. In some other examples, the respective weight ratio of conversion chemistry active material to intercalation chemistry active material is 74:26. In other examples, the respective weight ratio of conversion chemistry active material to intercalation chemistry active material is 73:27. In certain examples, the respective weight ratio of conversion chemistry active material to intercalation chemistry active material is 72:28. In some examples, the respective weight ratio of conversion chemistry active material to intercalation chemistry active material is 71:29. In some other examples, the respective weight ratio of conversion chemistry active material to intercalation chemistry active material is 70:30. In other examples, the respective weight ratio of conversion chemistry active material to intercalation chemistry active material is 69:31. In certain examples, the respective weight ratio of conversion chemistry active material to intercalation chemistry active material is 68:32. In some examples, the respective weight ratio of conversion chemistry active material to intercalation chemistry active material is 67:33. In some other examples, the respective weight ratio of conversion chemistry active material to intercalation chemistry active material is 66:34. In other examples, the respective weight ratio of conversion chemistry active material to intercalation chemistry active material is 65:35. In certain examples, the respective weight ratio of conversion chemistry active material to intercalation chemistry active material is 64:36. In some examples, the respective weight ratio of conversion chemistry active material to intercalation chemistry active material is 63:37. In some other examples, the respective weight ratio of conversion chemistry active material to intercalation chemistry active material is 62:38. In other examples, the respective weight ratio of conversion chemistry active material to intercalation chemistry active material is 61:39. In certain examples, the respective weight ratio of conversion chemistry active material to intercalation chemistry active material is 60:40. In some examples, the respective weight ratio of conversion chemistry active material to intercalation chemistry active material is 59:41. In some other examples, the respective weight ratio of conversion chemistry active material to intercalation chemistry active material is 58:42. In other examples, the respective weight ratio of conversion chemistry active material to intercalation chemistry active material is 57:43. In certain examples, the respective weight ratio of conversion chemistry active material to intercalation chemistry active material is 56:44. In some examples, the respective weight ratio of conversion chemistry active material to intercalation chemistry active material is 55:45. In some other examples, the respective weight ratio of conversion chemistry active material to intercalation chemistry active material is 54:46. In other examples, the respective weight ratio of conversion chemistry active material to intercalation chemistry active material is 53:47. In certain examples, the respective weight ratio of conversion chemistry active material to intercalation chemistry active material is 52:48. In some examples, the respective weight ratio of conversion chemistry active material to intercalation chemistry active material is 51:49.

Figure 2:
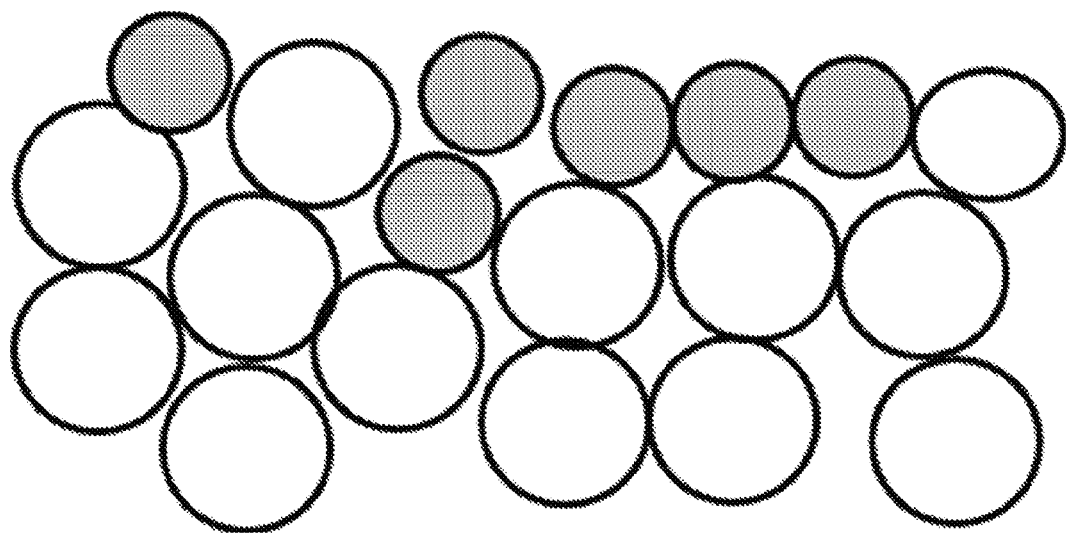
FIG. 2 shows a diagram illustrating a cathode with a graded composition.

The mixing of intercalation and conversion materials varies. For example, FIG. 1 shows substantially random mixing of intercalation and conversion materials. FIG. 2 is a simplified diagram illustrating a cathode with graded composition according to an embodiment of the disclosure set forth herein. This diagram is merely an example, which should not unduly limit the scope of the claims. One of ordinary skill in the art would recognize many variations, alternatives, and modifications. In FIG. 2, shaded circles represent intercalation material particles, and the unshaded circles represent conversion material particles. The intercalation chemistry material is in much smaller amount relative to the conversion chemistry material, and is positioned on the top region of the cathode (i.e., the region of the cathode which interfaces with or is most proximal to the electrolyte). For example, by positioning intercalation materials close to the electrolyte, the intercalation material may be accessed at higher rates as compared to the conversion chemistry material when the electrochemical cell is charging or discharging and lithium ions move through the electrolyte into or out of the cathode. In various discharging implementations, the intercalation materials are positioned to react with incoming lithium ions before these ions reacts with the conversion chemistry materials in the cathode. For example, in various automotive related applications, power capacity is important when starting an electric vehicle at low temperatures and during pulse discharging for electric vehicle acceleration. In these example high power capacity examples, the intercalation materials most proximal to the electrolyte will be the first material in the cathode to react with lithium ions, and before these ions react with the conversion chemistry materials.

In some examples, provided is an electrochemical cell in which the intercalation chemistry active materials in the hybrid positive electrode are closer to, or proximal to, the electrolyte which separates the positive and negative electrodes that is the conversion chemistry active materials.

In certain embodiments, conversion chemistry and intercalation chemistry materials are arranged in layers. In the case of a graded or layered mixture, the graded chemistry can be fabricated by slurry coating in a dual pass coater, and other processes are possible as well. For example, if the particles are a different size or density, the particles may be made to preferentially segregate in the slurry during deposition and/or drying.

In certain embodiments, conversion chemistry and intercalation chemistry materials are arranged in layers. In some examples, the layer in direct contact with the electrolyte is the intercalation material and the conversion chemistry material is in direct contact with the intercalation material but not in direct contact with the electrolyte. In some other examples, the layer in direct contact with the electrolyte is the conversion chemistry material and the intercalation chemistry material is in direct contact with the intercalation material but not in direct contact with the electrolyte.

In certain embodiments, the positive electrode includes alternating layers of intercalation and conversion chemistry active materials, in which the layer most proximal to the electrolyte is the intercalation material. In certain other embodiments, the positive electrode includes alternating layers of intercalation and conversion chemistry active materials, in which the layer most proximal to the electrolyte is the conversion chemistry material.

As a cathode material, conversion chemistry material can provide much higher energy density than intercalation chemistry material. For the most part, it is desirable to have as much conversion chemistry material in the cathode as possible. The use of intercalation chemistry material is for specific purposes in electric vehicle applications, such as regenerative braking, lower temperature start up, and acceleration. In portable devices as well, low temperature operation may benefit from the introduction of an intercalation material in a predominantly conversion cathode.

As an example, cathodes with mixed intercalation and conversion chemistry are especially useful in EV regenerative braking application, especially in cold weather. In low temperature operating environment, conversion chemistry material may have low power capability. The intercalation chemistry material, which is implemented as a part of cathodes, can provide the pulse power in this condition. In addition, intercalation chemistry material can be very useful during EV acceleration, where stored electricity is quickly discharged, and the intercalation chemistry material can provide the needed pulse power.

In various implementations, the cathode chemistry is specifically configured to power the electric vehicle and works in accordance with the powertrain voltage parameters. For example, the power electronics of electric vehicles typically handle a voltage ratio from the floor to ceiling of 1.5 to 2.5. By including intercalation chemistry material (e.g., LTO material) with a discharge potential at just above 1.5V, the voltage floor can be raised from 1.3V to 1.5V, allowing a voltage ceiling of 2.5*1.5=3.75V instead of 2.5*1.3=3.25V. The increased voltage ceiling can provide operating freedom and power efficiency as needed for operating electric vehicles, especially under exacting conditions.

As explained above, conversion chemistry materials are characterized by a high level of energy capacity. Exemplary conversion chemistry materials include, but not limited to, $FeF_2$, $FeO_xF_{3-2x}$, $FeF_3$, $CoF_3$, $CoF_2$, $BiF_3$, $CuF_2$, $MnF_3$, $NiF_2$, and/or other high energy density conversion chemistry materials. In various implementations, conversion chemistry materials may be nanostructured materials that can provide an energy capacity of over 1000 mWh/g. The intercalation chemistry materials are characterized by a high level of power capacity. Exemplary intercalation chemistry materials include lithium titanate on the low voltage side, and on the high voltage side, lithium iron phosphate, a spinel, an olivine, $LiCoO_2$, NCM, NCA, and/or other higher voltage intercalation chemistry materials. Exemplary intercalation chemistry materials are included in the tables in FIGS. 9 and 10.

The following example illustrates how the fraction of intercalation material in a cathode composition may be calculated depending on a given battery use condition. It also illustrates that the amount of intercalation material required for extreme applications does not significantly diminish the energy density of the battery. An electric vehicle may require about 10 to 30 seconds of discharge pulse power of 3.5 E at 0° C. A 3.5 E rate means that the battery is providing power equivalent to 3.5 times the rated energy that would be obtained from a 1 hour continuous power draw (i.e., discharge) that would fully discharge the battery. The following example assumes a high power demand scenario of 30 second pulse in which the conversion chemistry material insufficiently supplies a fraction of the power demanded at this operating condition (temperature and rate). In this example, for a cell rated at 100 Wh, the pulse is a demand of roughly 3 Wh (3.5*100 W*30 s*1 hr/3600 s), or 3% of the cell energy. Therefore, 3% of the energy of active materials would be contributed in this architecture by the power chemistry. To work out the mass fraction contribution, if the cathode includes a discharge power chemistry comprising $Li_4Ti_5O_{12}$ (LTO), which has a specific capacity of 165 mAh/g (including Li) and a 1.5V discharge potential. A 3 Wh contribution from LTO implies that the cell must include 2Ah capacity of LTO (3 Wh/1.5V=2Ah). If the 100 Wh cell includes 42Ah of $FeF_3$ with a specific capacity of 601 mAh/g (including Li), then the mass fraction of LTO is 14% of total weight (i.e., 12.1 g vs 69.9 g). This example illustrates that a small fraction of the battery cathode may be comprised of the fast intercalation material, with the majority component of the cathode being a conversion chemistry material, and meet the high power demand contemplated in this example. Depending on the required operating conditions, the amount of intercalation material used varies.

In another example, a battery cathode composition includes a high voltage, fast intercalation cathode material co-formulated with the conversion material. In this example, the specification requires a 3 E pulse charge for 10 seconds at 0° C. and the conversion material cannot deliver that charge rate, in which case an intercalation chemistry material can be formulated with the conversion chemistry material in order to meet the requirements of this scenario. If $LiCoO_2$ (LCO) is used (4V, 137 mAh/g specific capacity including lithium) as the intercalation chemistry material to deliver the 300 W for 10 seconds, then 208 mAh needs to be delivered from LCO. In this example, 1.5 g of LCO is included, or a mass fraction of about 2%. The mass fraction is lower in this example because a shorter pulse is required, and because the voltage of LCO is higher, so the specific energy is higher, and a smaller mass is required to deliver that energy. As demonstrated in the above two examples, the amount and types of intercalation material used depends on many factors, such as characteristics of the intercalation chemistry material, conversion chemistry material, expected operating condition, desired tolerance, energy and power requirements of electric vehicles, and other factors.

For certain example electric vehicle applications, the high voltage intercalation chemistry materials has a charge voltage greater than the low rate, high temperature charge potential of the conversion chemistry material (e.g., around 3.7V in the case of $FeF_3$), but lower than the system high voltage cutoff (around 4.2V in some cases). Examples of high voltage materials that can be used are $LiMPO_4$ (M=Co, Ni, Mn, Fe, and combinations thereof), $LiNi_{0.5}Mn_{1.5}O_4$, $LiMn_{0.5}Ni_{0.5}O_2$, $LiMn_2O_4$, $LiCoO_2$, and $Li_3V_2PO_4$. Additional high voltage materials are listed in FIGS. 10A-10F. Low-voltage intercalation chemistry materials are to have a discharge potential greater than the system low voltage cutoff (around 1.3V in some cases) but lower than the high temperature, low rate discharge potential of the conversion chemistry material (2.4V in the case of $FeF_3$). Examples of lower voltage materials that can be used are $Li_4Ti_5O_{12}$. Additional low voltage materials are listed in FIGS. 9A-9F. In some examples set forth herein, the conversion chemistry material is co-formulated with both a low-voltage intercalation chemistry material and also a high-voltage intercalation chemistry material. In some examples set forth herein, the conversion chemistry material is co-formulated with an intercalation chemistry material listed in the tables in FIGS. 9A-F and also with an intercalation chemistry material listed in the tables in FIGS. 10A-F.

As described above, the intercalation chemistry materials and conversion chemistry materials are synergistic in at least one respect. A low voltage intercalation chemistry material like LTO can provide the discharge energy on a discharge pulse (e.g., high power demand pulse or acceleration), and it can then be recharged by the conversion chemistry material (e.g., $FeF_3$) as the pulse completes. The processed can be used repeatedly, for each discharge pulse, so long as the discharge pulses are spaced sufficiently temporally apart to allow the low voltage intercalation chemistry material (e.g., LTO) to recharge. In a preferred embodiment, only enough LTO needs to be included in the hybrid positive electrode to provide energy for the single longest expected discharge pulse.

FIG. 3 is a simplified diagram illustrating operation of a mixed material cathode according to embodiments of the disclosure set forth herein at low temperature where the electric vehicle accelerates. This diagram is merely an example, which should not unduly limit the scope of the claims. One of ordinary skill in the art would recognize many variations, alternatives, and modifications. FIG. 3A shows an example power demand of a vehicle at low temperature (e.g., 0° Celsius). FIG. 3B shows voltage output, as a function of time, for a battery cell comprising a conversion chemistry material (e.g., $FeF_3$ or other types of conversion chemistry material). FIG. 3C shows voltage output t, as a function of time, for a battery cell comprising both conversion chemistry materials and intercalation chemistry materials (e.g., LTO or other types of intercalation materials).

As shown in FIG. 3A, in some examples, the power demand for an electric vehicle is substantially constant, except when the electric vehicle accelerates at time 301A and 302A, when the power demand peaks. Depending on the state of charge, the battery cells for the electric vehicle may or may not have enough power to satisfy the power demand when the electric vehicle accelerates. As shown in FIG. 3B, the cell voltage of the battery cells for the electric vehicle gradually drops below the operating lower voltage cutoff, as the electric vehicle operates, from the initially high voltage level (close to upper voltage cutoff level) to low voltage level (close to the lower voltage cutoff level), when the cathode only includes a conversion chemistry material (e.g., $FeF_3$ and/or other types of conversion chemistry materials). However, and as shown in FIG. 3C, when the cathode also includes a low voltage intercalation material, the lower voltage cut-off is railed. In FIG. 3C, the battery voltage does not drop below the lower voltage cut-off because the intercalation material maintains a higher cell voltage that would be possible if only the conversion chemistry material was present.

Depending on the state of charge and the type of conversion material, the battery cell with conversion chemistry material may operate under two regimes. When the battery charge is substantially full, the battery cell operates in an intercalation (fast) regime. That is, the conversion chemistry material discharges with intercalation processes. During the intercalation regime, the cell voltage is relatively high and has enough headroom to provide the power and voltage needed at time 301B. At time 301B, the drop in voltage corresponding to electric vehicle acceleration at time 301A does not cause the cell voltage level to drop below the lower voltage cutoff, and the electric vehicle operates normally.

However, when the battery cell operates in the conversion regime (i.e., the conversion material is discharging or charging by way of a conversion chemistry reaction and not by way of an intercalation chemistry reaction) as shown in FIG. 3B between time 301B and 302B, the battery cell voltage is substantially constant, but is at a lower level, which can be close to lower voltage cutoff level. When the electric vehicle accelerates, during time 302A, the increased power demand may cause the cell voltage to drop below the lower voltage cutoff level, as shown in time 302B. When the voltage level of the battery cell falls below the lower voltage cutoff, the cell cannot deliver the required power. When the battery cell (or the battery pack made of a large of battery cells) is not above the lower voltage cutoff level, it cannot meet the power demand, and as a result, the electric vehicle cannot accelerate as needed.

When the cathode includes both intercalation and conversion chemistry materials, the operation of the electric vehicles is significantly improved, as demonstrated in FIG. 3C. The graph in FIG. 3C shows the cell voltage for a battery cathode having both intercalation chemistry materials (e.g., LTO) and conversion chemistry material (e.g., $FeF_3$). As explained above, other types of intercalation chemistry materials and conversion chemistry materials can be used as well. At time 301C, the cell voltage is well above the lower voltage cutoff level, and thus even when the acceleration at time 301A causes the cell voltage level to drop, the cell voltage level is still well above the lower voltage cutoff level. At time 302C, the cell, which primarily comprises (e.g., over 80% of total weight) conversion chemistry materials, is operating in the conversion regime. At time 302C, the cell voltage is close to the lower voltage cutoff level. The intercalation chemistry material, at time 302C, provides much needed power to when the electric vehicle operates at time 302A, thereby preventing the cell voltage to drop below the lower voltage cutoff at time 302C and allowing the electric vehicle to accelerate as needed. For example, the lower voltage cutoff level is about 1.5V. At around 1.5V, the intercalation chemistry material contributes to the power needed by the electric vehicle. Cell voltage is "railed" or otherwise stabilized at the voltage level attributed to the intercalation material, and the battery back as a whole can satisfy the power demand of the electric vehicle for acceleration. It is to be noted that when the electric vehicle accelerates, the increased power demand causes the cell voltage to drop. When the acceleration stops and power demands decreases, the conversion chemistry material can discharge and thereby recharge the intercalation chemistry material. As mentioned above, the intercalation material is specifically configured to provide operating headroom in situations such as time 302C, and only makes up a small portion of battery cell cathode. Thus, the intercalation material is recharged when possible, and the recharged intercalation material can provide supplemental power at a later time when needed.

Figure 4A:
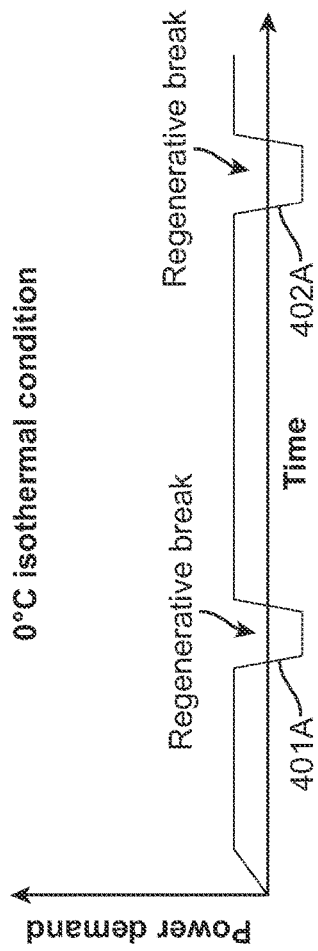
FIGS. 4A-C show diagrams illustrating a low temperature regenerative braking operation for an electrochemical cell having a positive electrode which includes either iron trifluoride ($FeF_3$), only, or both iron trifluoride ($FeF_3$) and lithium titanate ($Li_{4.7}Ti_5O_{12}$, i.e., LTO) positive electrode active materials.
Figure 4B:
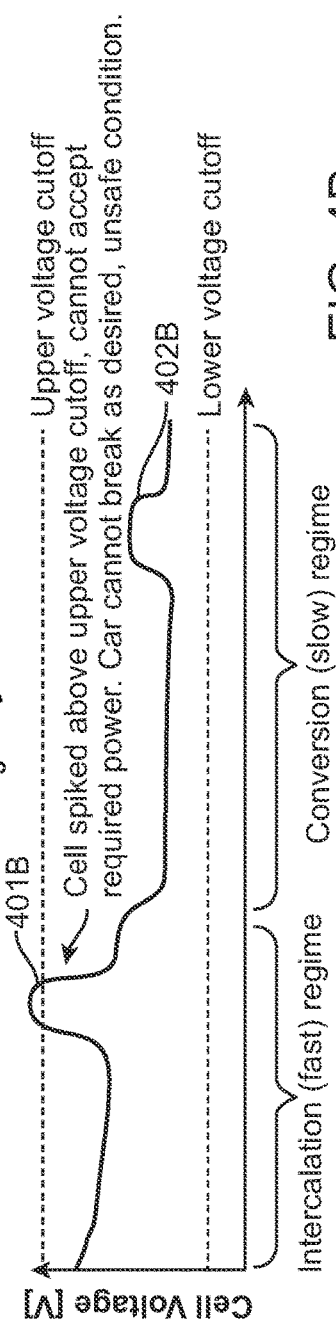
Figure 4C:
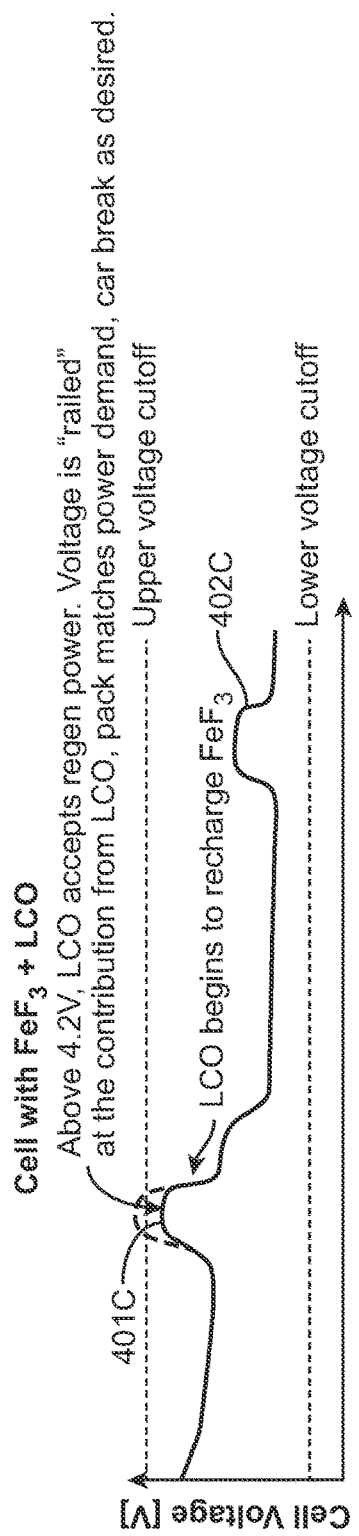

FIG. 4 is a simplified diagram illustrating operation of a mixed material cathode at low temperature when the electric vehicle performs regenerative braking. This diagram is merely an example, which should not unduly limit the scope of the claims. One of ordinary skill in the art would recognize many variations, alternatives, and modifications. FIG. 4A shows the power demand as a function of time for regenerative braking of a vehicle at low temperature (e.g., 0° Celsius). For example, the vehicle can be an electric vehicle or a hybrid vehicle. FIG. 4B shows voltage output, as function of time, for a battery cell whose cathode comprises a conversion chemistry material (e.g., $FeF_3$ or other types of conversion chemistry material). FIG. 4C shows voltage output, as a function of time, for a battery cell whose cathode comprises both conversion chemistry materials and intercalation chemistry materials (e.g., LTO or other types of intercalation materials).

As shown in FIG. 4A, power demand from the vehicle, under 0° C. isothermal condition, is substantially constant, except during time 401A and time 401B when the vehicle is braking. During time 401A and 401B, the power demand is low and negative, as the regenerative braking process generates power from the braking process, and the power from the regenerative braking process can be used to charge the battery. In FIG. 4B, the graph shows operation of a battery cell comprising a conversion chemistry material (e.g., $FeF_3$ or other types of conversion chemistry materials). The conversion-chemistry-only battery cell in FIG. 4B operates in two regimes: initially in the intercalation regime and then later in time, as the voltage drops, in the conversion regime. During the intercalation regime, the cell voltage starts relatively high and is close to the upper voltage cutoff level. For example, the upper voltage cutoff level may be around 4.2V. As vehicle operation drains the battery cell, the cell voltage drops, until the battery cell starts operating in the conversion region. During time 401B, which corresponds to time 401A of generative braking, the cell voltage goes up as the battery is recharged by the regenerative braking process. Since the cell voltage level at time 401B is relatively high and close to the upper voltage cutoff level, the recharging of the battery from the regenerative braking process spikes up the cell voltage to a level above the upper voltage cutoff level. While recharging of the battery cell is generally desirable, the battery cell cannot accept the recharging once the voltage is above the upper level cutoff. In addition to wasting the power from regenerative braking recharge, the power over the upper voltage cutoff level can lead to unsafe operating condition for the battery cell. When the battery cell operates in conversion regime, the voltage level is relatively low, cell voltage spike at time 402B does not pose the same type of problem as when the cell voltage is high and close to the high voltage cutoff.

FIG. 4C shows the benefit of a battery cell that includes both intercalation chemistry and conversion chemistry materials. For example, intercalation chemistry material include, but are not limited to LCO material, and the conversion chemistry material include, but are not limited to, $FeF_3$ material. Other materials are possible as well. At time 401C, which corresponds to time 401A, battery cell is recharged from the regenerative braking, but the cell voltage does not go over the upper voltage cutoff level (e.g., 4.2V). This is because when the voltage level goes above 4.2V, the intercalation chemistry material (e.g., LCO material) accepts the regenerative power. Voltage is "railed" at the upper voltage cutoff level, because the power over 4.2V is absorbed by the intercalation chemistry material; in other words, the intercalation chemistry material is charged at time 401C. Since the intercalation chemistry material absorbs the power when voltage is at or above the upper voltage cutoff level, the potentially unsafe operating condition of voltage over 4.2V is avoided at time 401C. The intercalation chemistry material can be partially charged during time 402C, but is it not necessarily so for the purposed of keeping voltage level below the upper voltage cutoff level.

Depending on the application, a cathode may include, in addition to a conversion chemistry material, two or more intercalation chemistry materials. The two intercalation chemistry materials have different operating voltages, which can widen the range of operating conditions. For example, the two intercalation chemistry materials include a first intercalation material that is characterized by a voltage plateau lower than that of the second intercalation material and the conversion chemistry material but above the system cutoff voltage. The second intercalation material is characterized by a voltage plateau higher than that of the first intercalation material and the conversion chemistry material but lower than the system cutoff voltage. In a specific embodiment, the first intercalation material includes $Li_4Ti_5O_{12}$ or other lithium titanate, and its voltage plateau is about 1.5V vs Li; the second intercalation material includes $LiCoO_2$ or other lithium cobalt oxide, and its voltage plateau is about 4V vs Li. A cathode with two intercalation chemistry materials and a conversion chemistry material can therefore have an operating voltage range of about 1.5 to 4.2V.

As shown in the FIGS. 3-4 and described above, conversion chemistry materials, depending on voltage and/or state of charge, operate in both an intercalation regime and a conversion regime. It is to be understood that when operating in intercalation regime, the conversion chemistry material has a first voltage range, and when operating in the conversion regime, the conversion chemistry material has a second voltage range that is different from the first voltage range. For example, the conversion chemistry material $CoF_3$ has a voltage range of about 3-5V during intercalation regime, and a voltage range of about 1.6-2.4V during the conversion regime. As an example, iron fluoride is a conversion chemistry material that operates in both the intercalation regime and the conversion regime.

$Li^+ + FeF_3 + e^- = LiFeF_3$ (intercalation)

$2Li^+ + LiFeF_3 + 2e^- = 3LiF + Fe$ (conversion)

With iron fluoride, the intercalation reaction is typically at a voltage of about 2.7-4V, and the conversion reaction is typically at a voltage below 2.4V. Other types of conversion chemistry materials have their respective intercalation and conversion voltages, where the intercalation regime voltage range is higher than the conversion regime voltage range.

According to certain embodiments set forth herein, intercalation chemistry materials that are mixed with conversion chemistry material operate at a higher voltage than the intercalation regime voltage range and/or a lower voltage than the conversion regime voltage range.

Figure 5A:
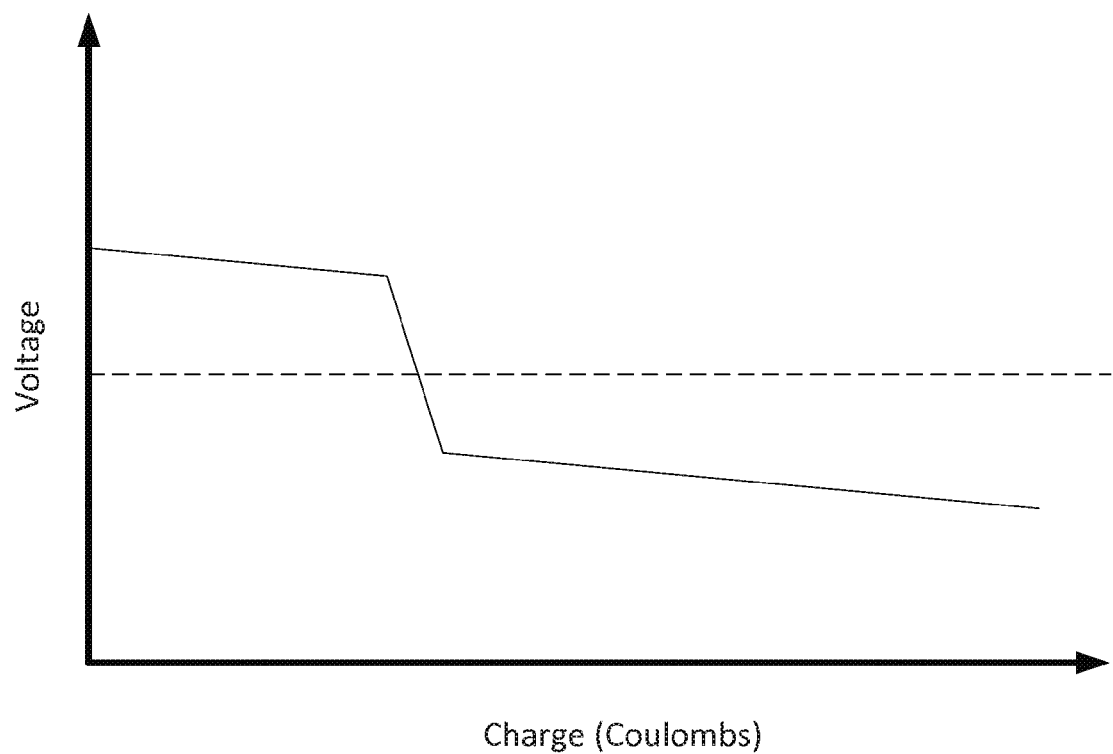
FIGS. 5A-E illustrate a variety of operating scenarios for electrochemical cells having positive electrodes which include mixtures of intercalation chemistry active materials and conversion chemistry active materials.
Figure 5B:
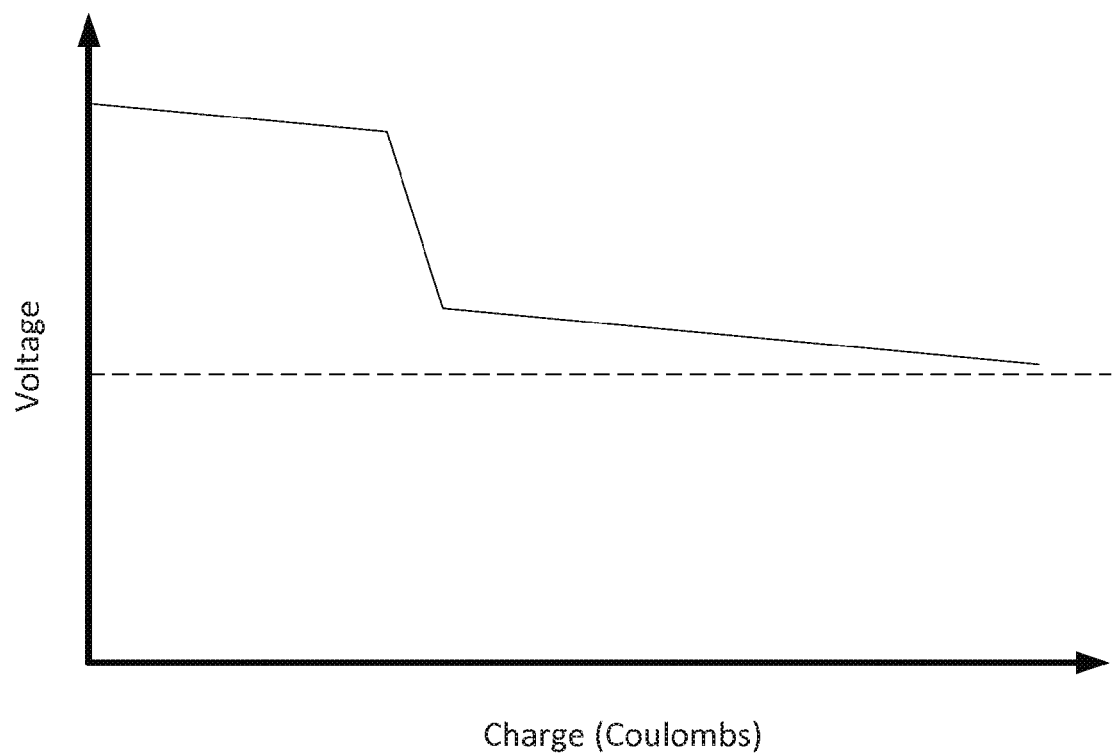
Figure 5C:
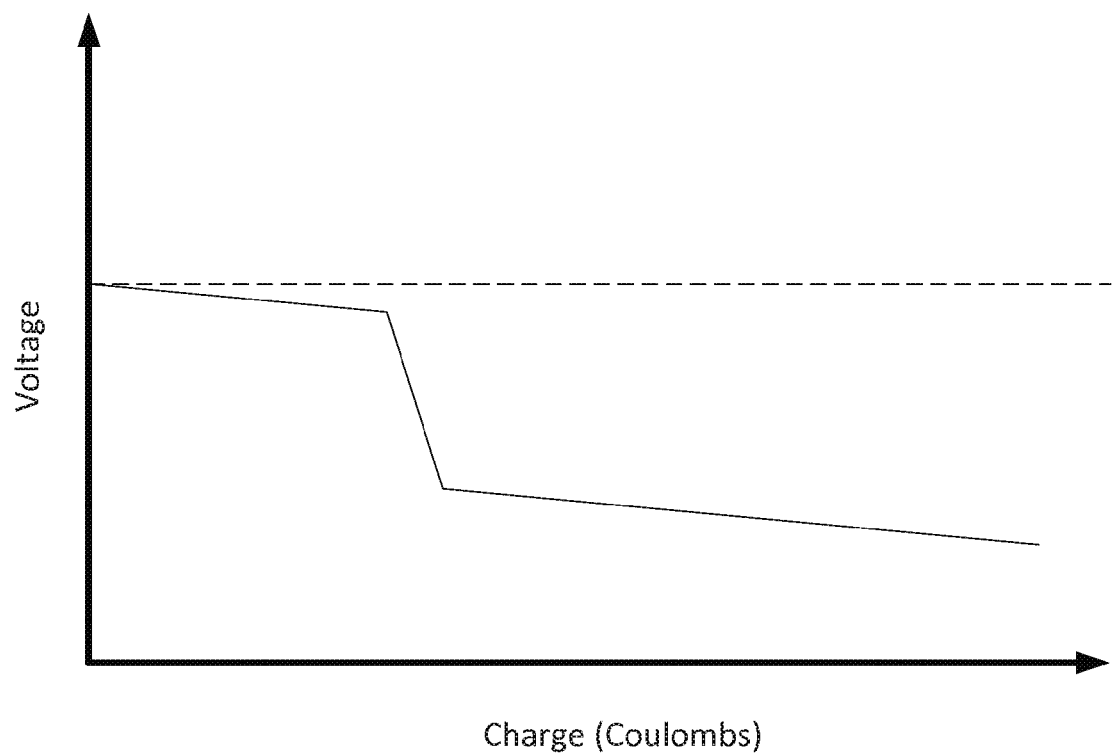
Figure 5D:
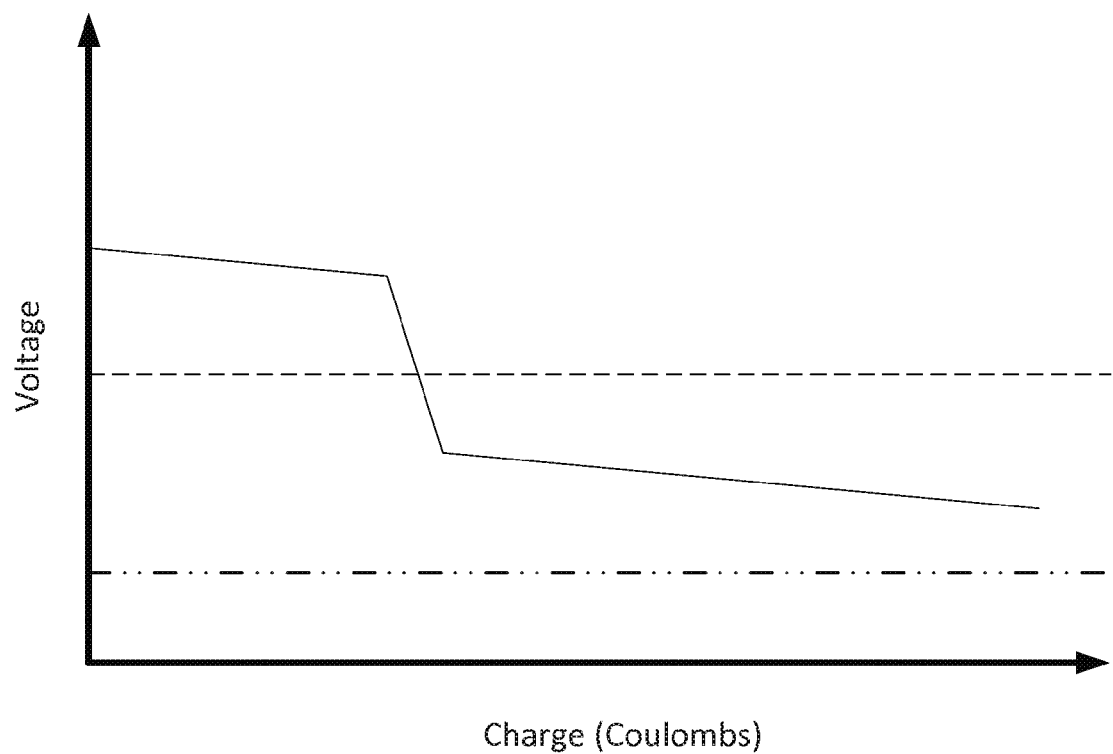
Figure 5E:
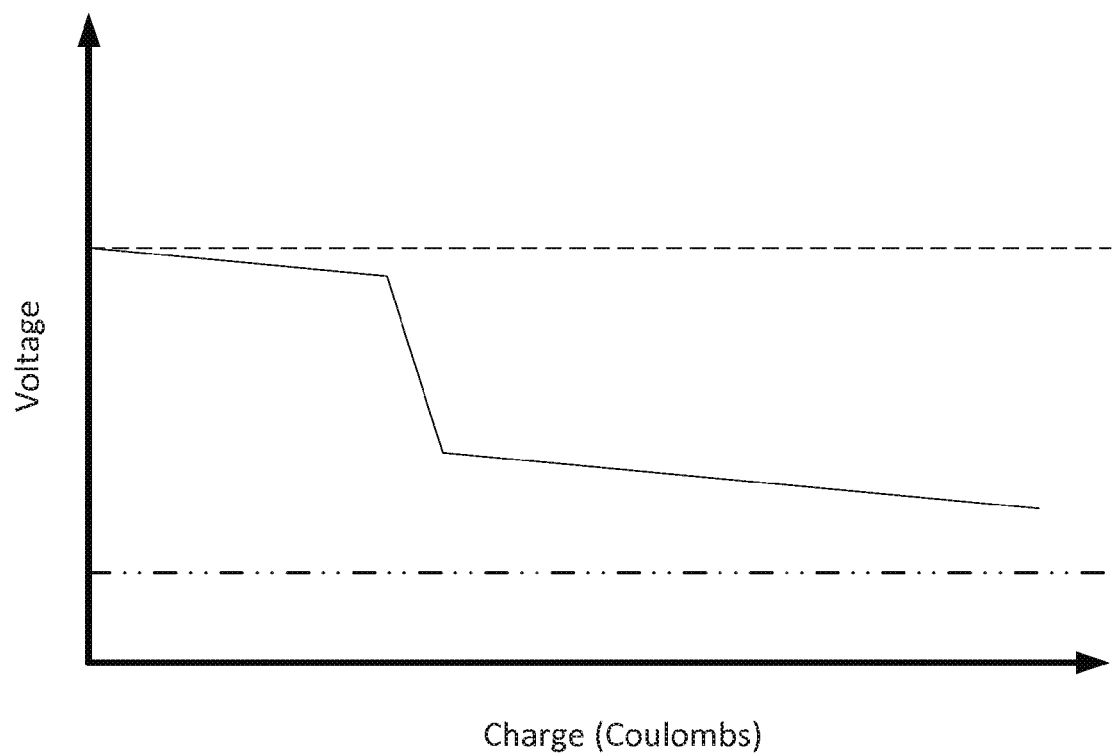

FIGS. 5A-E are simplified diagrams illustrating operating scenarios of cathode with mixed conversion and intercalation materials according to embodiments of the disclosure set forth herein. These diagrams merely provide an example, which should not unduly limit the scope of the claims. One of ordinary skill in the art would recognize many variations, alternatives, and modifications. Conversion materials, during discharge, may be characterized by one or two voltage plateaus or levels. A voltage plateau is a region on a plot of voltage versus charge with a gradual slope during a low-rate (e.g. constant current rate of C/10 or slower) discharge. FIG. 5A illustrates a nonlimiting example voltage versus charge curve of a conversion material that has an intercalation voltage regime and a conversion voltage (lower) regime and a second material with an intercalation voltage between the two voltage regimes of the conversion material. FIG. 5B illustrates a nonlimiting example intercalation material with a voltage plateau below the conversion potential of the conversion material, an arrangement that may help in conditions of low temperature acceleration at low state of charge (SOC). FIG. 5C shows an intercalation material with a voltage plateau above the high voltage of the intercalation material, an arrangement that may help in conditions of low temperature regenerative breaking at high SOC. FIG. 5D shows two intercalation materials with voltage plateaus bracketing the conversion material conversion voltage. FIG. 5E shows two intercalation materials, one with a voltage plateau above the intercalation regime of the conversion material and another with a voltage plateau below the conversion plateau of the conversion material.

It is to be appreciated that there are many types of conversion chemistry and intercalation chemistry materials, and different materials have different operating conditions, such as operating temperature, operating voltage, and others. FIG. 6 is a table illustrating operating voltages of different metal materials in conversion reactions. Thermodynamic calculations and tables such as FIG. 6 may be used to determine approximate voltages of conversion materials, while experiments may be required to demonstrate the voltages empirically. FIG. 6 may therefore be used to design a hybrid intercalation/conversion positive electrode by selection of intercalation materials with the appropriate voltage plateaus.

Figure 7:
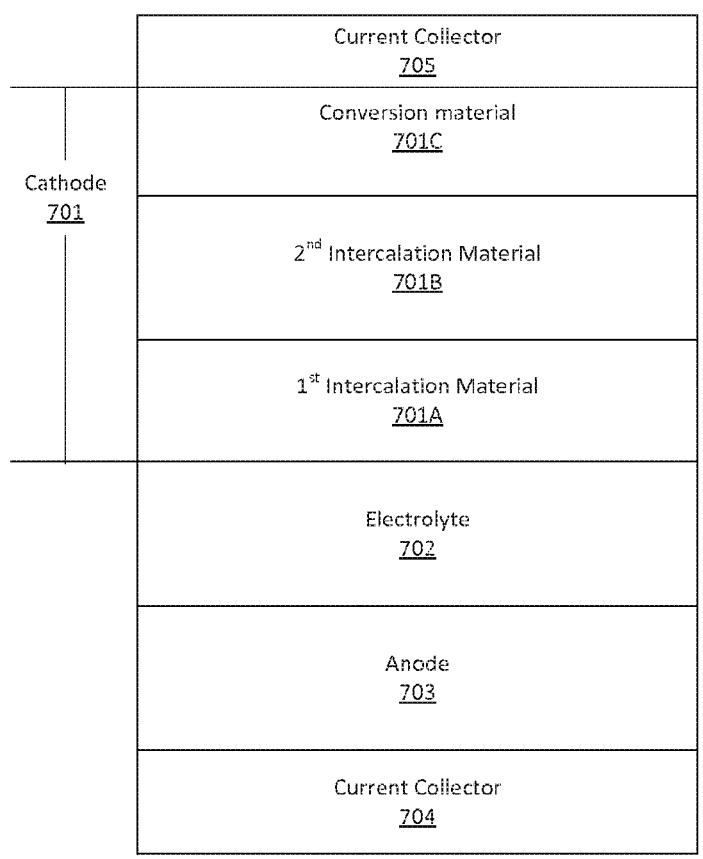
FIG. 7 is a diagram illustrating an example battery cell which includes a hybrid electrode having a conversion chemistry active material and two types of intercalation chemistry active materials according to an embodiment set forth in this disclosure.

FIG. 7 is a simplified diagram illustrating a battery cell according to an embodiment of the disclosure herein. This diagram is merely an example, which should not unduly limit the scope of the claims. One of ordinary skill in the art would recognize many variations, alternatives, and modifications. As shown in FIG. 7, the battery cell 700 includes current collectors 705 and 704, anode 703, electrolyte 702, and cathode 701. Cathode 701 includes three layers of materials: conversion material 701C, first intercalation material 701A, and second intercalation material 701B. In some examples, the first intercalation material 701A has a lower voltage plateau than the lower voltage of the conversion material and is positioned closer to the electrolyte 702 relative to the second intercalation material 701B and the conversion material 701C. The second conversion material 701B has a higher voltage plateau than the upper voltage of the conversion material, and is positioned between the first intercalation material 701A and the conversion material 701C. In various implementations, the first intercalation material 701A has a lower voltage and therefore would likely be subjected to higher current density than the second intercalation material 701B and the conversion material 701C, and therefore needs closer ionic access to the electrolyte 702.

Figure 23:
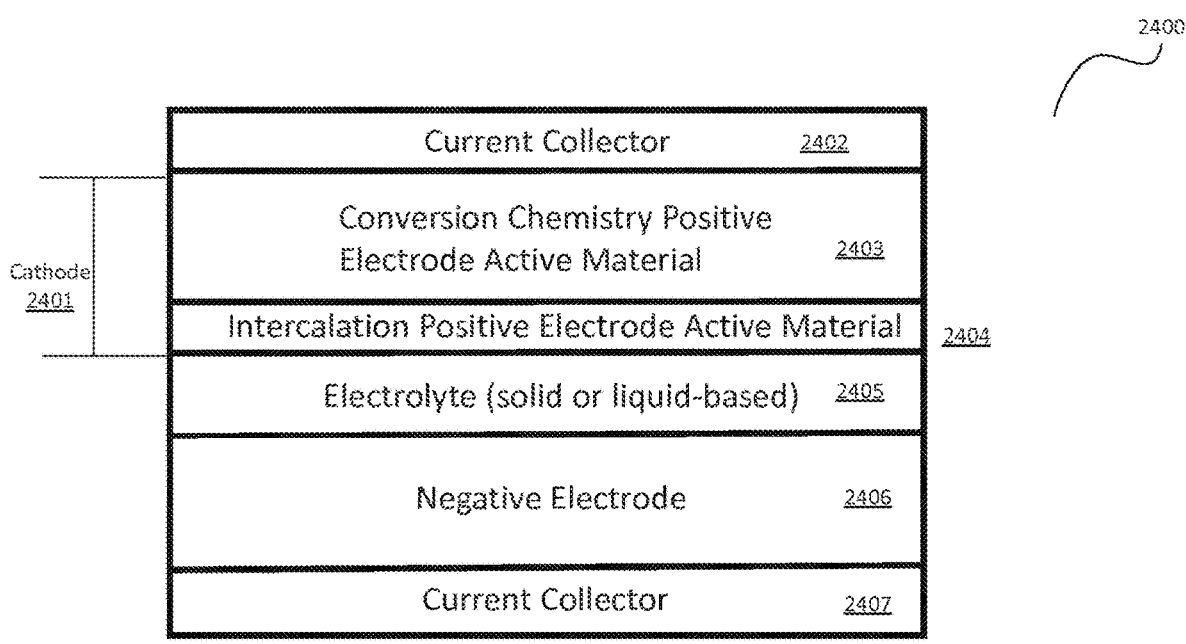
FIG. 23 shows an example electrochemical cell including a hybrid positive electrode according to an embodiment set forth in this disclosure.

FIG. 23 is a simplified diagram illustrating a battery cell according to an embodiment of the disclosure herein. This diagram is merely an example, which should not unduly limit the scope of the claims. One of ordinary skill in the art would recognize many variations, alternatives, and modifications. As shown in FIG. 23, the battery cell 2400 includes current collectors 2402 and 2407, negative electrode 2406, electrolyte 2405, and positive electrode 2401. Positive electrode 2401 includes two layers of materials: conversion material 2403 and intercalation material 2404. In some examples, the intercalation material 2404 has a lower voltage plateau than the lower voltage of the conversion material and is positioned closer to the electrolyte 2405 than the conversion material 2403. In some other examples, the intercalation material 2404 has a higher voltage plateau than the higher voltage of the conversion material and is positioned closer to the electrolyte 2405 than the conversion material 2403.

Figure 8:
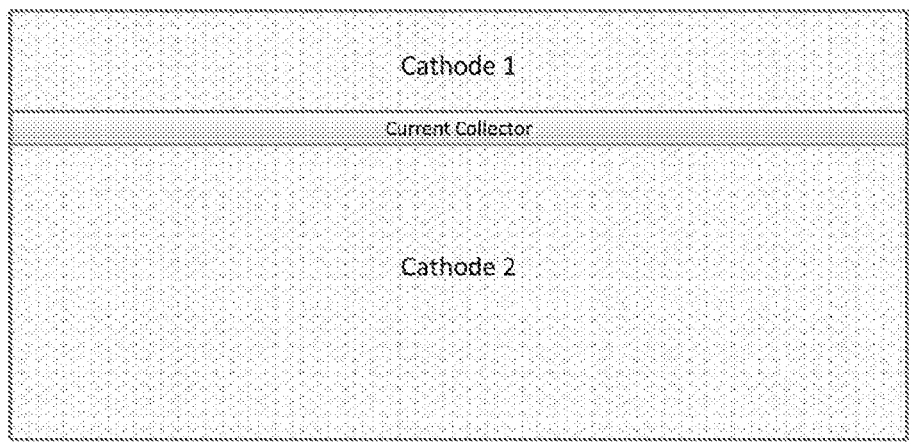
FIG. 8 shows an example double sided cathode electrode suitable for use with a battery device embodiment set forth herein.

FIG. 8 shows an example cathode electrode suitable for use with the battery devices set forth herein. In FIG. 8, a current collector for a cathode has cathode active materials on two opposing sides of the current collector. These cathode active materials can include conversion chemistry materials, intercalation chemistry materials, both conversion chemistry materials and intercalation chemistry materials, more than one type of intercalation material, conversion chemistry materials and more than one type of intercalation material, or combinations of these options. A catholyte may also be included with these cathode active materials. In some examples, as described below, different types of conversion chemistry materials are used on each opposite side of the current collector. In some examples, the thickness of the cathode on one side of the current collector is not equal to the thickness of the cathode on the other side of the current collector, as shown in FIG. 8. In some examples, one side of the current collector has a thicker layer of cathode active materials than the layer of cathode active materials on the other side of the current collector.

FIG. 9 (presented as FIGS. 9A-9F) shows a list of intercalation materials with discharge voltages between about 1.3-2.5V that are suitable for use with the cathode active materials, e.g., conversion chemistry materials, also set forth herein. In some examples, the compositions set forth herein include at least one or more intercalation materials with discharge voltages between about 1.8-2.1V in combination with conversion chemistry materials, e.g., metal fluorides.

FIG. 10 (presented as FIGS. 10A-10F) shows a list of intercalation materials with discharge voltages between about 2.5-3.8V that are suitable for use with the cathode active materials, e.g., conversion chemistry materials, also set forth herein. In some examples, the compositions set forth herein include at least one or more intercalation materials with discharge voltages between about 2.5-3.8V in combination with conversion chemistry materials, e.g., metal fluorides, nickel fluorides.

In some examples, the compositions set forth herein include at least one or more intercalation materials with discharge voltages between about 1.8-2.1V in combination with at least one or more intercalation materials with discharge voltages between about 2.5-3.8V and in combination with conversion chemistry materials, e.g., metal fluorides, nickel fluorides, iron fluorides.

Example Combinations of Conversion Chemistry and Intercalation Chemistry Materials In Cathode In some examples set forth herein, the hybrid electrodes include a conversion chemistry material, described in this application, in combination with at least one intercalation material that is an oxide or a phosphate or both. In some examples, these oxides or phosphates are selected from the materials listed in the table in FIG. 9 (presented in the form of multiple sheets labeled FIGS. 9A-9F). In some examples, these intercalation materials have discharge voltages between 1.3 and 2.5V. In some other examples, these intercalation materials have discharge voltages between 1.8 and 2.1V. In some of these examples, the conversion material combined with these intercalation materials is iron fluoride.

In some examples, these oxides or phosphates are selected from the materials listed in the table in FIG. 10. In some examples, these intercalation materials have discharge voltages between 2.5 and 3.0V. In some of these examples, the conversion material combined with these intercalation materials is nickel fluoride. In some of these examples, the conversion material combined with these intercalation materials is iron fluoride. In some of these examples, the conversion material combined with these intercalation materials is a combination of nickel fluoride and iron fluoride (e.g., $FeF_3$).

In some examples, when the conversion chemistry material is nickel fluoride the combined intercalation chemistry materials have discharge voltages between 2.5 and 3.0V.

In some examples, the hybrid electrode includes a metal fluoride as the conversion chemistry material (e.g., $NiF_2$, $FeF_3$, or combinations thereof) and a member selected from the group consisting of $TiS_2$, $FeS_2$, $FeS_2$, CuS, LTO (e.g., $LiTiO_2$, or $Li_{4.7}Ti_5O_{12}$, or $Li_4Ti_5O_{12}$ i.e., lithium titanate or LTO), and combinations thereof. In some of these examples, the metal fluoride is a member selected from the group consisting of $FeF_3$, $CuF_2$, $NiF_2$, and combinations thereof. In some of these examples, the metal fluoride is a member selected from the group consisting of iron fluoride, copper fluoride, nickel fluoride, and combinations thereof. In some of these examples, the metal fluoride is doped with Cu, Ni, $Li_2O$, a transition metal oxide, or combinations thereof. In some examples, the hybrid electrode includes $FeF_3$ and an intercalation material in FIGS. 9A-F, in FIGS. 10A-F, or intercalations materials selected from both FIGS. 9A-F and FIGS. 10A-F.

In some examples, the hybrid electrode includes $FeF_3$ and $TiS_2$. In some examples, the hybrid electrode includes $FeF_3$ and FeS. In some examples, the hybrid electrode includes $FeF_3$ and $FeS_2$. In some examples, the hybrid electrode includes $FeF_3$ and CuS. In some examples, the hybrid electrode includes $FeF_3$ and LTO (i.e., a lithium titanate). In some examples, the hybrid electrode includes $FeF_3$ and $Li_{0.1}TiO_2$. In some examples, the hybrid electrode includes $FeF_3$ and $Li_{0.1}FeCuS_2$.

In some of these examples, FeS has a discharge voltage at 1.6V vs. Li. In some examples, $FeS_2$ has a discharge voltage at about 1.5V-1.8V vs. Li. In some examples, CuS has a discharge voltage at about 1.7-2.05V vs. Li. In some examples, $TiS_2$ has a discharge voltage at 1.6-2.2V vs. Li. In some examples, LTO has a discharge voltage at 1.5V vs. Li.

In some of these examples, a catholyte is included with these cathode combinations of conversion chemistry materials and intercalation chemistry materials. In some examples, the catholyte is a lithium, phosphorus, and sulfur containing specie. In some examples, the catholyte comprises a lithium, phosphorus, and sulfur containing specie. In some examples, the catholyte is a lithium stuffed garnet. In some examples, the catholyte is a lithium stuffed garnet doped with alumina. In some examples, the catholyte is a lithium silicon sulfide. In some examples, the catholyte comprises a lithium silicon sulfide. In some examples, the catholyte comprises a lithium, phosphorus, tin, silicon sulfide. Suitable catholyte materials may be found in International PCT Patent Application No. PCT/US 14/38283, entitled SOLID STATE CATHOLYTE OR ELECTROLYTE FOR BATTERY USING $Li_4MP_BS_C$((M=Si, Ge, AND/OR Sn), filed May 15, 2014, the entire contents of which are herein incorporated by reference for all purposes.

In some examples, the cathode includes $FeF_3$, a catholyte, and an intercalation material with a discharge voltage between 1.8 and 2.1V vs. Li. In some examples, the cathode includes $FeF_3$, a catholyte, and an intercalation material with a discharge voltage of about 2.0V vs. Li. In some examples, the cathode includes $FeF_3$, a catholyte, and an intercalation material with a discharge voltage of 2.0V vs. Li. In some examples, the cathode includes $FeF_3$, a catholyte, and an intercalation material with a discharge voltage of about 1.3-2.5V vs. Li. In some examples, the cathode includes $FeF_3$, a catholyte, and an intercalation material with a discharge voltage of about 1.8-2.1V v. Li. In some examples, the cathode includes $FeF_3$, a catholyte, and an intercalation material selected from a member in the table in FIG. 9 or combinations of the members in the table in FIG. 9.

In some examples, the hybrid electrode includes $NiF_2$ and $Li_{0.1}FeO_2$. In some examples, the hybrid electrode includes $NiF_2$ and $Li_{0.1}MnO_2$. In some examples, the hybrid electrode includes $NiF_2$ and $Li_{1.33-2}CuO_2$. In some examples, the hybrid electrode includes $NiF_2$ and an intercalation material in FIG. 10.

Double-Side Coated Electrode

In some examples, the battery device set forth herein includes a double-side coated electrode with one side of the current collector foil coated with a thicker electrode and the other side coated with a thinner electrode. For example, FIG. 8 illustrates a non-limiting example of such a double-sided coated electrode. In some examples, the thicker electrode is a metal fluoride with a conversion plateau higher than the discharge voltage of the cathode active material of the thinner electrode.

In some examples, the combination of intercalation chemistry materials and conversion chemistry materials includes metal fluorides as the conversion chemistry material. In some examples, both sides of the double-side coated electrode include conversion chemistry materials and intercalation chemistry materials. In some examples, both sides of the double-side coated electrode include conversion chemistry materials and intercalation chemistry materials, but each side of the double-side coated electrode has a different type of conversion chemistry material. In some of these examples, one side has a metal fluoride, and the other side has a doped metal fluoride. In some examples, both sides of the double-side coated electrode include conversion chemistry materials and intercalation chemistry materials, but each side of the double-side coated electrode has a different amount of conversion chemistry material.

In some examples, both sides of the double-side coated electrode include conversion chemistry materials and intercalation chemistry materials, but each side of the double-side coated electrode has a different type of intercalation chemistry material. In some examples, both sides of the double-side coated electrode include conversion chemistry materials and intercalation chemistry materials, but each side of the double-side coated electrode has a different amount of intercalation chemistry material.

In some examples, both sides of the double-side coated electrode include conversion chemistry materials and intercalation chemistry materials, but each side of the double-side coated electrode has a different type of conversion chemistry material and of intercalation chemistry material. In some examples, both sides of the double-side coated electrode include conversion chemistry materials and intercalation chemistry materials, but each side of the double-side coated electrode has a different amount of each type of conversion chemistry material and intercalation chemistry materials.

In yet other examples, one side of the double-side coated electrode includes a conversion chemistry material and the other side of the double-side coated electrode includes an intercalation chemistry material.

In some examples, the thicker electrode side includes a doped conversion material that has a higher, for example, 50-200 mV higher, discharge conversion plateau than the thinner electrode. This architecture surprisingly provides a driving force for "recharging" the thinner electrode after it is depleted in a pulse or low temperature power event.

In some examples, one or both sides of the double-side coated cathode is graded. In some examples, one or both sides of the double-side coated cathode is a two-layer single electrode.

In some examples, one or both sides of the double-side coated cathode is a two-layer single electrode where the layer in immediate contact with the current collector includes a "doped" conversion material with a higher voltage conversion plateau than the other cathode active material. In this architecture, the undoped conversion material serves as the "power" layer. In some examples of this architecture, the open circuit voltage difference between these layers provides an enthalpic driving force for one layer of the cathode to recharge the other layer of the cathode.

Nanodimensioned Conversion Chemistry and Intercalation Chemistry Materials in Cathode In some examples set forth herein, either the conversion chemistry material or the intercalation chemistry material, or both, are nanodimensioned. In some examples, the conversion chemistry material is nanodimensioned and described as particles or grains of conversion chemistry material wherein the particles or grains have a $d_{50}$ diameter of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 nm. In some examples, the intercalation chemistry material is nanodimensioned and described as particles or grains of intercalation chemistry material wherein the particles have a $d_{50}$ diameter of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 nm. In some examples, these nanodimensioned particles of conversion chemistry materials and intercalation chemistry materials are intimately mixed together.

As used herein, $d_{50}$ refers to the median diameter or the median size, in a distribution of sizes, measured by microscopy techniques, such as, but not limited to, scanning electron microscopy. As used herein, $d_{50}$ includes the characteristic dimension at which 50% of the particles are smaller than the recited size.

As used herein, $d_{50}$ is measured by light scattering, for example, on a Horiba LA-950 V2 particle size analyze using acetonitrile as a solvent and one-minute sonication before measurement.

In some examples, the grains of conversion chemistry materials that are mixed with intercalation chemistry materials have a $d_{50}$ of 1 nm. In some other examples, the grains of conversion chemistry materials that are mixed with intercalation chemistry materials have a $d_{50}$ of 2 nm. In other examples, the grains of conversion chemistry materials that are mixed with intercalation chemistry materials have a $d_{50}$ of 3 nm. In still other examples, the grains of conversion chemistry materials that are mixed with intercalation chemistry materials have a $d_{50}$ of 4 nm. In yet other examples, the grains of conversion chemistry materials that are mixed with intercalation chemistry materials have a $d_{50}$ of 5 nm. In some examples, the grains of conversion chemistry materials that are mixed with intercalation chemistry materials have a $d_{50}$ of 6 nm. In some other examples, the grains of conversion chemistry materials that are mixed with intercalation chemistry materials have a $d_{50}$ of 7 nm. In other examples, the grains of conversion chemistry materials that are mixed with intercalation chemistry materials have a $d_{50}$ of 8 nm. In still other examples, the grains of conversion chemistry materials that are mixed with intercalation chemistry materials have a $d_{50}$ of 9 nm. In yet other examples, the grains of conversion chemistry materials that are mixed with intercalation chemistry materials have a $d_{50}$ of 10 nm. In some examples, the grains of conversion chemistry materials that are mixed with intercalation chemistry materials have a $d_{50}$ of 11 nm. In some other examples, the grains of conversion chemistry materials that are mixed with intercalation chemistry materials have a $d_{50}$ of 12 nm. In other examples, the grains of conversion chemistry materials that are mixed with intercalation chemistry materials have a $d_{50}$ of 13 nm. In still other examples, the grains of conversion chemistry materials that are mixed with intercalation chemistry materials have a $d_{50}$ of 14 nm. In yet other examples, the grains of conversion chemistry materials that are mixed with intercalation chemistry materials have a $d_{50}$ of 15 nm. In some examples, the grains of conversion chemistry materials that are mixed with intercalation chemistry materials have a $d_{50}$ of 16 nm. In some other examples, the grains of conversion chemistry materials that are mixed with intercalation chemistry materials have a $d_{50}$ of 17 nm. In other examples, the grains of conversion chemistry materials that are mixed with intercalation chemistry materials have a $d_{50}$ of 18 nm. In still other examples, the grains of conversion chemistry materials that are mixed with intercalation chemistry materials have a $d_{50}$ of 19 nm. In yet other examples, the grains of conversion chemistry materials that are mixed with intercalation chemistry materials have a $d_{50}$ of 20 nm. In some examples, the grains of conversion chemistry materials that are mixed with intercalation chemistry materials have a $d_{50}$ of 21 nm. In some other examples, the grains of conversion chemistry materials that are mixed with intercalation chemistry materials have a $d_{50}$ of 22 nm. In other examples, the grains of conversion chemistry materials that are mixed with intercalation chemistry materials have a $d_{50}$ of 23 nm. In still other examples, the grains of conversion chemistry materials that are mixed with intercalation chemistry materials have a $d_{50}$ of 24 nm. In yet other examples, the grains of conversion chemistry materials that are mixed with intercalation chemistry materials have a $d_{50}$ of 25 nm. In some examples, the grains of conversion chemistry materials that are mixed with intercalation chemistry materials have a $d_{50}$ of 26 nm. In some other examples, the grains of conversion chemistry materials that are mixed with intercalation chemistry materials have a $d_{50}$ of 27 nm. In other examples, the grains of conversion chemistry materials that are mixed with intercalation chemistry materials have a $d_{50}$ of 28 nm. In still other examples, the grains of conversion chemistry materials that are mixed with intercalation chemistry materials have a $d_{50}$ of 29 nm. In yet other examples, the grains of conversion chemistry materials that are mixed with intercalation chemistry materials have a $d_{50}$ of 30 nm.

Amounts of Conversion Chemistry and Intercalation Chemistry Materials in Cathode In some examples, the amount of intercalation chemistry material that is mixed with the conversion chemistry material is less than 30% w/w (by weight). In some examples, the amount of intercalation chemistry material that is mixed with the conversion chemistry material is present in the cathode at an amount of 29.5% w/w. In other examples, the amount of intercalation chemistry material that is mixed with the conversion chemistry material is present in the cathode at an amount of 29.0% w/w. In certain examples, the amount of intercalation chemistry material that is mixed with the conversion chemistry material is present in the cathode at an amount of 28.5% w/w. In other examples, the amount of intercalation chemistry material that is mixed with the conversion chemistry material is present in the cathode at an amount of 28.0% w/w. In yet other examples, the amount of intercalation chemistry material that is mixed with the conversion chemistry material is present in the cathode at an amount of 27.5% w/w. In still other examples, the amount of intercalation chemistry material that is mixed with the conversion chemistry material is present in the cathode at an amount of 27.0% w/w. In some examples, the amount of intercalation chemistry material that is mixed with the conversion chemistry material is present in the cathode at an amount of 26.5% w/w. In other examples, the amount of intercalation chemistry material that is mixed with the conversion chemistry material is present in the cathode at an amount of 26.0% w/w. In certain examples, the amount of intercalation chemistry material that is mixed with the conversion chemistry material is present in the cathode at an amount of 25.5% w/w. In other examples, the amount of intercalation chemistry material that is mixed with the conversion chemistry material is present in the cathode at an amount of 25.0% w/w. In yet other examples, the amount of intercalation chemistry material that is mixed with the conversion chemistry material is present in the cathode at an amount of 24.5% w/w. In still other examples, the amount of intercalation chemistry material that is mixed with the conversion chemistry material is present in the cathode at an amount of 24.0% w/w. In some examples, the amount of intercalation chemistry material that is mixed with the conversion chemistry material is present in the cathode at an amount of 23.5% w/w. In other examples, the amount of intercalation chemistry material that is mixed with the conversion chemistry material is present in the cathode at an amount of 23.0% w/w. In certain examples, the amount of intercalation chemistry material that is mixed with the conversion chemistry material is present in the cathode at an amount of 22.5% w/w. In other examples, the amount of intercalation chemistry material that is mixed with the conversion chemistry material is present in the cathode at an amount of 22.0% w/w. In yet other examples, the amount of intercalation chemistry material that is mixed with the conversion chemistry material is present in the cathode at an amount of 21.5% w/w. In still other examples, the amount of intercalation chemistry material that is mixed with the conversion chemistry material is present in the cathode at an amount of 21.0% w/w. In some examples, the amount of intercalation chemistry material that is mixed with the conversion chemistry material is present in the cathode at an amount of 20.5% w/w. In other examples, the amount of intercalation chemistry material that is mixed with the conversion chemistry material is present in the cathode at an amount of 19.0% w/w. In certain examples, the amount of intercalation chemistry material that is mixed with the conversion chemistry material is present in the cathode at an amount of 18.5% w/w. In other examples, the amount of intercalation chemistry material that is mixed with the conversion chemistry material is present in the cathode at an amount of 18.0% w/w. In yet other examples, the amount of intercalation chemistry material that is mixed with the conversion chemistry material is present in the cathode at an amount of 17.5% w/w. In still other examples, the amount of intercalation chemistry material that is mixed with the conversion chemistry material is present in the cathode at an amount of 17.0% w/w. In some examples, the amount of intercalation chemistry material that is mixed with the conversion chemistry material is present in the cathode at an amount of 16.5% w/w. In other examples, the amount of intercalation chemistry material that is mixed with the conversion chemistry material is present in the cathode at an amount of 16.0% w/w. In certain examples, the amount of intercalation chemistry material that is mixed with the conversion chemistry material is present in the cathode at an amount of 15.5% w/w. In other examples, the amount of intercalation chemistry material that is mixed with the conversion chemistry material is present in the cathode at an amount of 15.0% w/w. In yet other examples, the amount of intercalation chemistry material that is mixed with the conversion chemistry material is present in the cathode at an amount of 15.5% w/w. In still other examples, the amount of intercalation chemistry material that is mixed with the conversion chemistry material is present in the cathode at an amount of 15.0% w/w. In some examples, the amount of intercalation chemistry material that is mixed with the conversion chemistry material is present in the cathode at an amount of 14.5% w/w. In other examples, the amount of intercalation chemistry material that is mixed with the conversion chemistry material is present in the cathode at an amount of 14.0% w/w. In certain examples, the amount of intercalation chemistry material that is mixed with the conversion chemistry material is present in the cathode at an amount of 13.5% w/w. In other examples, the amount of intercalation chemistry material that is mixed with the conversion chemistry material is present in the cathode at an amount of 13.0% w/w. In yet other examples, the amount of intercalation chemistry material that is mixed with the conversion chemistry material is present in the cathode at an amount of 12.5% w/w. In still other examples, the amount of intercalation chemistry material that is mixed with the conversion chemistry material is present in the cathode at an amount of 12.0% w/w. In some examples, the amount of intercalation chemistry material that is mixed with the conversion chemistry material is present in the cathode at an amount of 11.5% w/w. In other examples, the amount of intercalation chemistry material that is mixed with the conversion chemistry material is present in the cathode at an amount of 11.0% w/w. In certain examples, the amount of intercalation chemistry material that is mixed with the conversion chemistry material is present in the cathode at an amount of 10.5% w/w. In other examples, the amount of intercalation chemistry material that is mixed with the conversion chemistry material is present in the cathode at an amount of 9.0% w/w. In yet other examples, the amount of intercalation chemistry material that is mixed with the conversion chemistry material is present in the cathode at an amount of 9.5% w/w. In still other examples, the amount of intercalation chemistry material that is mixed with the conversion chemistry material is present in the cathode at an amount of 8.0% w/w. In some examples, the amount of intercalation chemistry material that is mixed with the conversion chemistry material is present in the cathode at an amount of 8.5% w/w. In other examples, the amount of intercalation chemistry material that is mixed with the conversion chemistry material is present in the cathode at an amount of 7.0% w/w. In certain examples, the amount of intercalation chemistry material that is mixed with the conversion chemistry material is present in the cathode at an amount of 7.5% w/w. In other examples, the amount of intercalation chemistry material that is mixed with the conversion chemistry material is present in the cathode at an amount of 6.0% w/w. In yet other examples, the amount of intercalation chemistry material that is mixed with the conversion chemistry material is present in the cathode at an amount of 6.5% w/w. In still other examples, the amount of intercalation chemistry material that is mixed with the conversion chemistry material is present in the cathode at an amount of 6.0% w/w. In some examples, the amount of intercalation chemistry material that is mixed with the conversion chemistry material is present in the cathode at an amount of 5.5% w/w. In other examples, the amount of intercalation chemistry material that is mixed with the conversion chemistry material is present in the cathode at an amount of 4.0% w/w. In certain examples, the amount of intercalation chemistry material that is mixed with the conversion chemistry material is present in the cathode at an amount of 4.5% w/w. In other examples, the amount of intercalation chemistry material that is mixed with the conversion chemistry material is present in the cathode at an amount of 4.0% w/w. In yet other examples, the amount of intercalation chemistry material that is mixed with the conversion chemistry material is present in the cathode at an amount of 3.5% w/w. In still other examples, the amount of intercalation chemistry material that is mixed with the conversion chemistry material is present in the cathode at an amount of 3.0% w/w. In some examples, the amount of intercalation chemistry material that is mixed with the conversion chemistry material is present in the cathode at an amount of 2.5% w/w. In other examples, the amount of intercalation chemistry material that is mixed with the conversion chemistry material is present in the cathode at an amount of 2.0% w/w. In certain examples, the amount of intercalation chemistry material that is mixed with the conversion chemistry material is present in the cathode at an amount of 1.5% w/w. In other examples, the amount of intercalation chemistry material that is mixed with the conversion chemistry material is present in the cathode at an amount of 1.0% w/w. In still other examples, the amount of intercalation chemistry material that is mixed with the conversion chemistry material is present in the cathode at an amount of 0.5% w/w.

In some examples, the conversion material is $FeF_3$ or $NiF_2$ and the intercalation material is present in the cathode at an amount of 10% w/w. In some examples, the conversion material is $FeF_3$ or $NiF_2$ and the intercalation material is present in the cathode at an amount of 5% w/w.

It is to be appreciated that embodiments of the disclosure set forth herein provide numerous advantages over conventional battery systems and methods. Among other things, with mixed intercalation and conversion chemistry materials, the cathode regions of battery cells can provide both high energy density and operating flexibility. The relatively small amount of the intercalation chemistry material at the cathode can provide additional degrees of flexibility in battery design to meet requirements of battery operation at low temperature or near its voltage limits, without adding too much weight. For example, during regenerative braking process of operating an electric vehicle, the intercalation chemistry material absorbs electrical power when voltage is too high for the conversion chemistry material. As another example, when conversion chemistry material is operating under conversion regime and the cell voltage is low, the intercalation chemistry material can satisfy peak power demand. The conversion chemistry material, which offers higher energy density and capacity than the intercalation chemistry material, provides energy at a steady voltage for other operation of electric motors. There are other benefits as well.

EXAMPLES

Example 1—Positive Electrode Preparation

Positive electrodes were prepared by mixing and milling either crystalline $FeF_3$ or an 80:20 w/w mixture of crystalline iron trifluoride (i.e., $FeF_3$) and lithium titanate (LTO) with carbon (C65 Conductive Carbon Black) and an Ethylene Propylene Rubber binder (EPR). These positive electrodes were disposed onto a liquid electrolyte including celgard membrane which was disposed on and contacting a Li-metal anode. The celgard separator contained the liquid electrolyte and physically separated the positive and negative electrodes. The liquid electrolyte included ethylene carbonate (EC) dimethylcarbonate (DMC) solvents in a 50:50 v/v (EC:DMC) ratio with 1M $LiPF_6$ salt. In some examples, the electrochemical cells included only $FeF_3$ as the positive electrode active material. In some other examples, the electrochemical cells included both $FeF_3$ and LTO in an 80:20 w/w ratio as the positive electrode active material.

Figure 11:
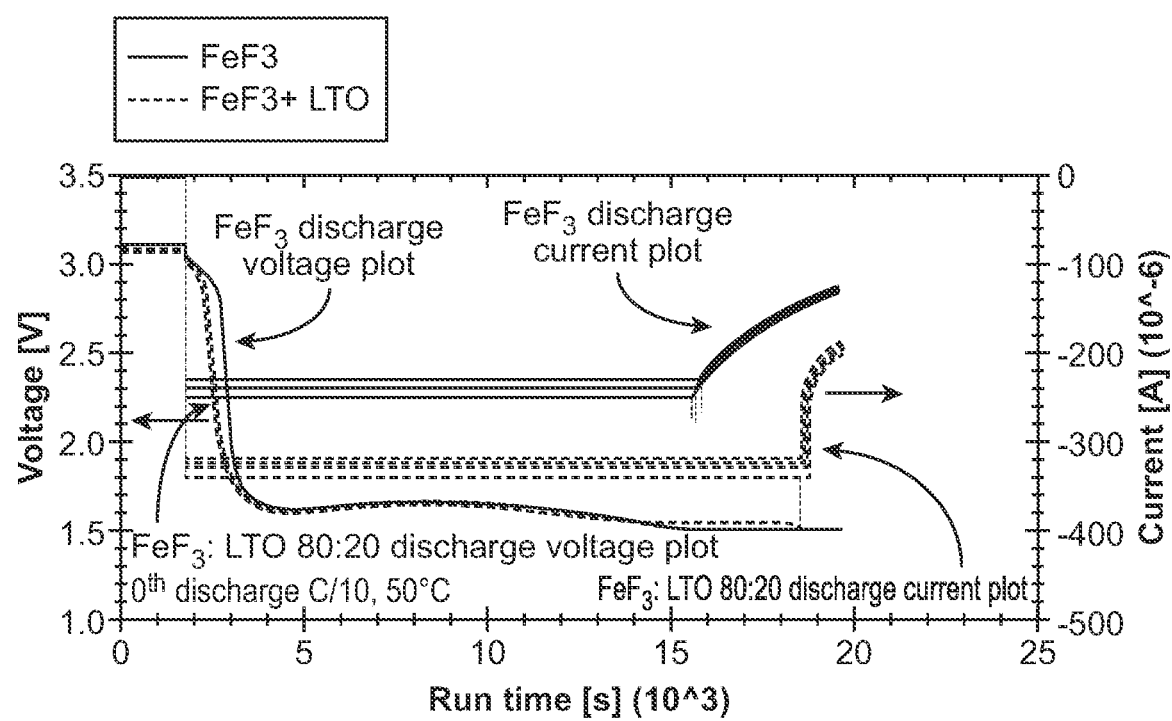
FIG. 11 shows overlaid plots of Voltage v. Discharge Run Time, and Current v. Discharge Run Time, for electrochemical cells having either $FeF_3$ positive electrode active materials, only, or a 80:20 combination of iron trifluoride ($FeF_3$) and lithium titanate (LTO, i.e., $Li_{4-7}Ti_{5.5}O_{12}$) positive electrode active materials. Cells were discharged at C/10 at 50° C.

Example 2—Electrochemical Testing of Hybrid Positive Electrodes with Comparison to Positive Electrodes Having Conversion Chemistry Active Materials FIG. 11 shows a high rate discharge initially after assembling the electrochemical cell (i.e., $0^{th}$ discharge). The discharge was run at C/10 rate and at 50° C. The plateau at 1.6V in the LTO-including sample shows that the positive electrode with both $FeF_3$ and LTO took a longer time during discharge to reach the 1.5V floor. This example demonstrates that LTO, with a lower operating voltage above the lowest conversion voltage for $FeF_3$ "railed," or prevented, the electrochemical cell from dropping to 1.5V as soon as it would have in the absence of LTO (i.e., in the electrochemical cell having only $FeF_3$).

Figure 12:
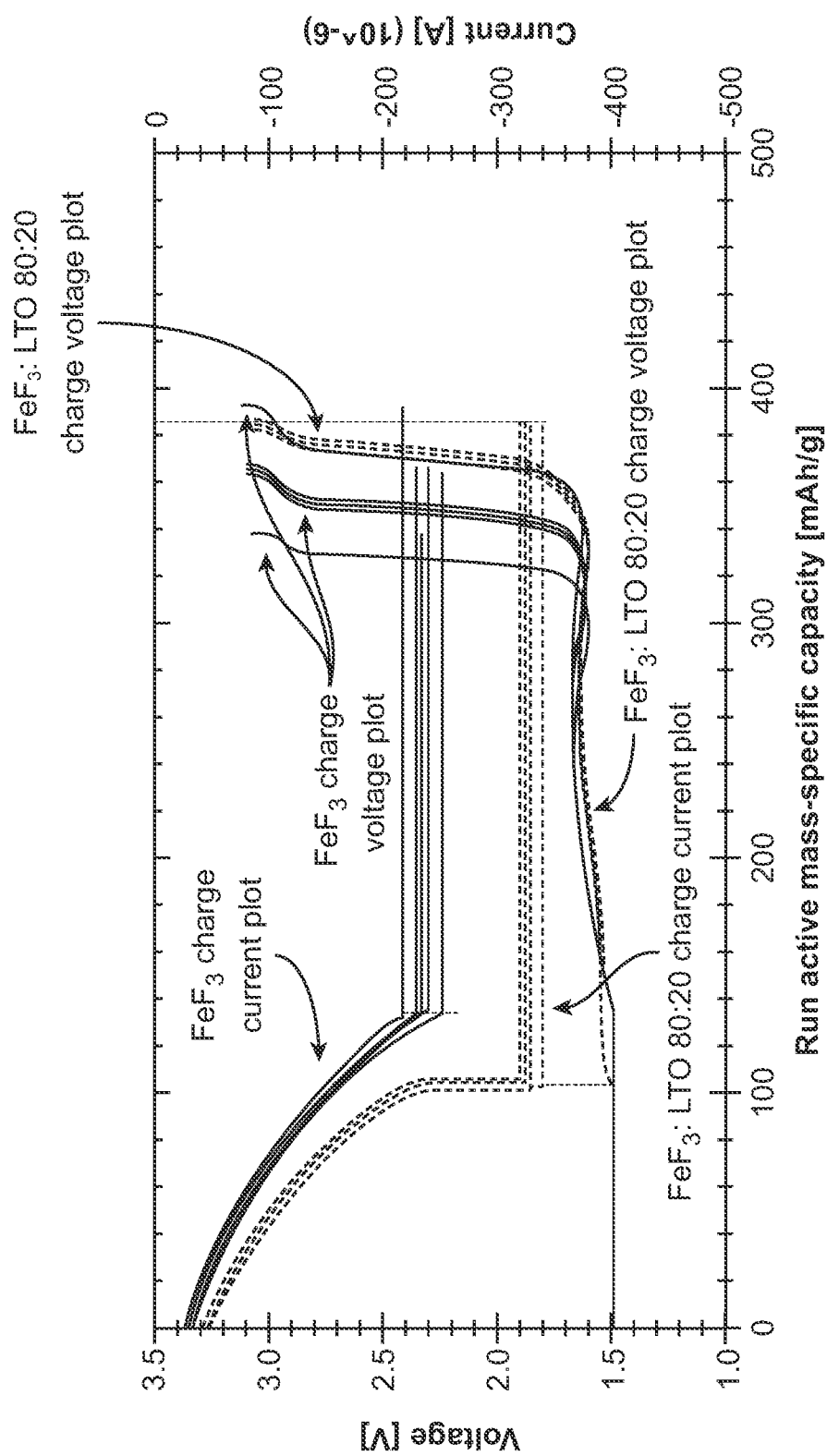
FIG. 12 shows an overlaid plot of Voltage v. Run active mass-specific capacity (mAh/g), and Current v. Run active mass-specific capacity (mAh/g), for electrochemical cells having either $FeF_3$ positive electrode active materials, only, or a 80:20 combination of iron trifluoride ($FeF_3$) and lithium titanate (LTO, i.e., $Li_{4-7}Ti_{5.5}O_{12}$) positive electrode active materials.

FIG. 12 shows the subsequent charging of the electrochemical cells used in the experiment to generate the data in FIG. 11. The initial plateau at 1.6V in the LTO-including sample shows that the positive electrode with both $FeF_3$ and LTO begins the charging cycle at a higher voltage than the positive electrode with only $FeF_3$ active material. This example also demonstrates that LTO, which has a lower operating voltage which is above the lowest conversion voltage for $FeF_3$, "railed" the electrochemical cell from dropping to 1.5V as soon as it would have in the absence of LTO (i.e., in the electrochemical cell having only $FeF_3$).

Example 3—Electrochemical Testing of Hybrid Positive Electrodes with Comparison to Positive Electrodes Having Conversion Chemistry Active Materials Electrochemical cells were prepared according to Example 1. These electrochemical cells were analyzed at 50° C. using the following pulse cycle: An C/10 rate continuous discharge pulse, followed by a rest to allow the cell voltage to equilibrate, and 1 minute current pulses of C/5, C/3, and C/2, each with a five (5) minute rest period in between the discharge pulse. The cell Voltage (V v. Li) as a function of Run Time (s) was observed and recorded as FIGS. 13-18. The control samples only included $FeF_3$ as the positive electrode active material. The LTO samples included both $FeF_3$ and LTO (lithium titanate) in an 80:20 w/w ratio.

Figure 13:
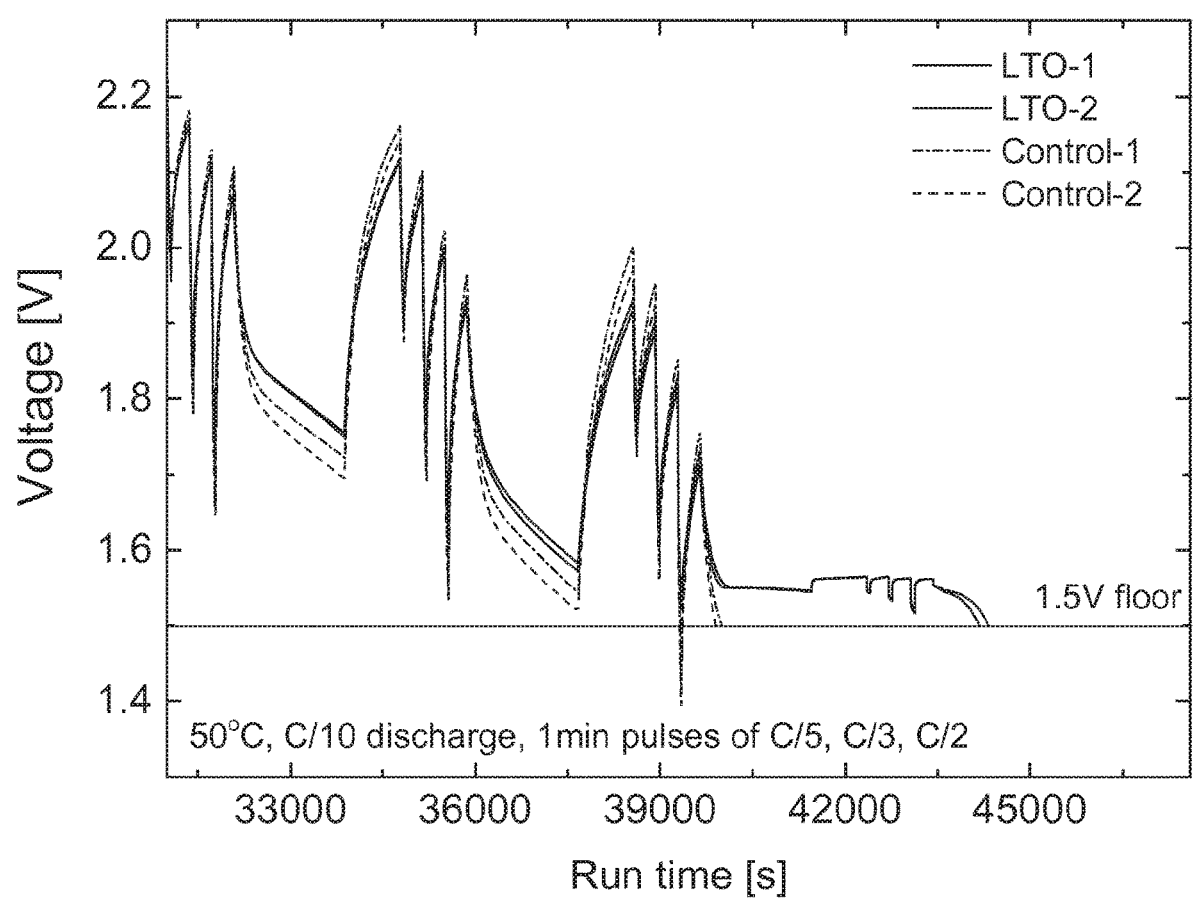
FIG. 13 shows an overlaid plot of Voltage v. Run Time for electrochemical cells having either $FeF_3$ positive electrode active materials, only, or a 80:20 combination of iron trifluoride ($FeF_3$) (labeled as control-1 and control-2) and lithium titanate (LTO, i.e., $Li_{4-7}Ti_{5.5}O_{12}$) positive electrode active materials (labeled as LTO-1 and LTO-2).
Figure 14:
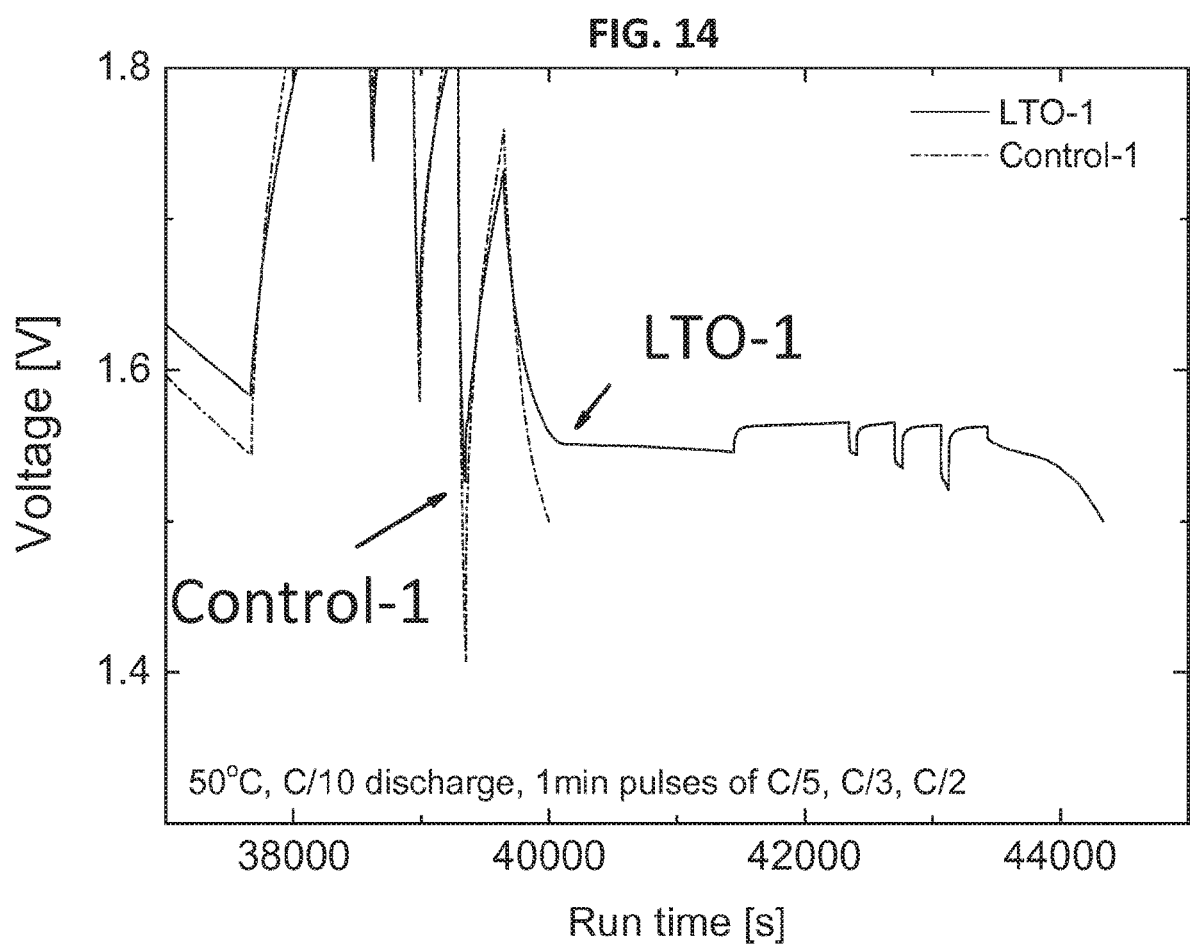
FIG. 14 shows a magnified perspective of FIG. 13 and compares to LTO-1 and control-1.

FIG. 13 shows the discharge voltage versus time near the end of a discharge for two representative control cells with 100% conversion chemistry, $FeF_3$, cathodes compared to two representative cells with a hybrid cathode: 80 wt % conversion chemistry, $FeF_3$, and 20 weight % intercalation chemistry, LTO. The intercalation material has a discharge voltage between 1.55-1.64V. FIGS. 13 and 14 show that the hybrid cathode has shallower voltage spikes during the current pulses and therefore hits the voltage floor later than the cathode having only conversion chemistry active materials. FIGS. 13 and 13 show that the hybrid cathode was observed to have nearly 10% more capacity and less degradation of the electrolyte, and thus a longer battery cycle life.

FIG. 14 shows the electrochemical test using the same conditions above but magnified (i.e., zoomed in) to show the last discharge and only showing one representative cell from each batch for clarity. Of particular note is the relative voltage spike near 39500 seconds indicated by the left arrow, and the shallow voltage of discharge indicated by the second arrow, and the following discharge. This example demonstrates that LTO, with a discharge voltage above the lowest conversion voltage for $FeF_3$ "railed," or prevented, the electrochemical cell from dropping to the lower voltage than the cathode having only $FeF_3$ achieved.

Figure 15:
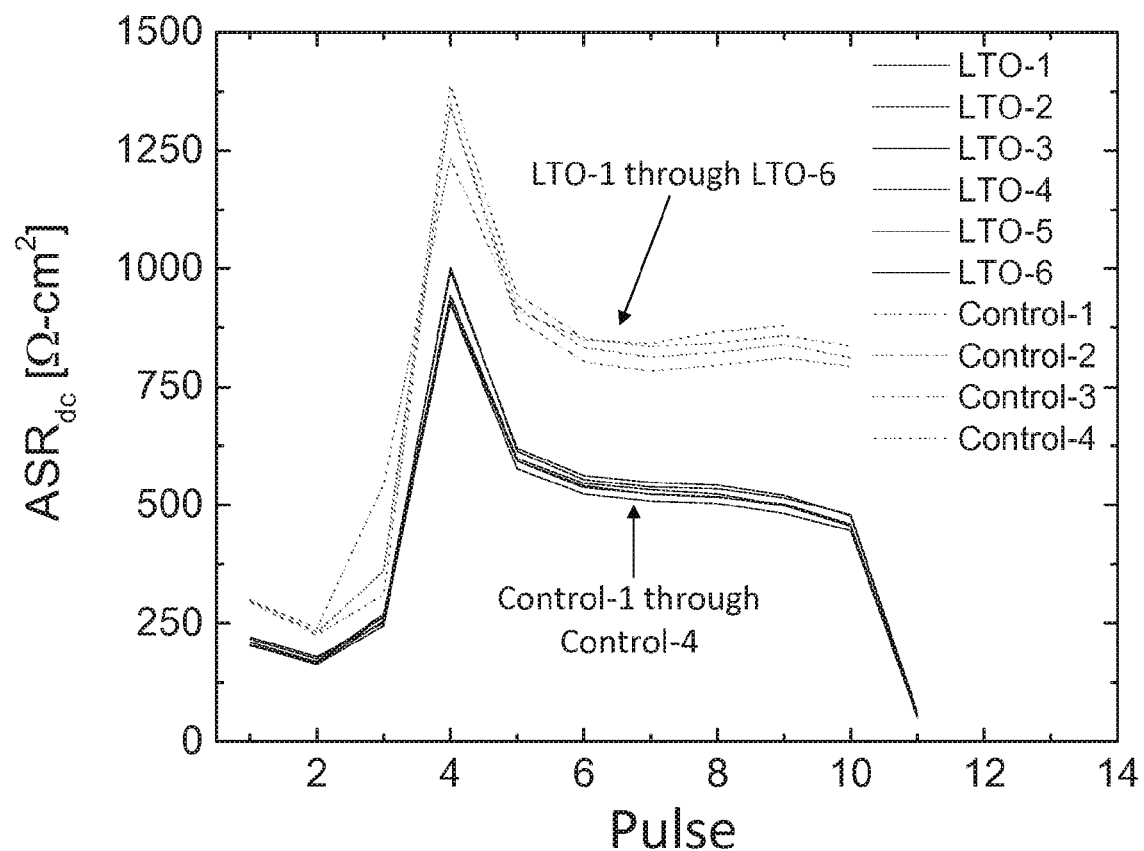
FIG. 15 shows an overlaid plot of Area Specific Resistance (ASR) v. charge-discharge Pulses for ten (10) for electrochemical cells having either $FeF_3$ positive electrode active materials or a 80:20 combination of iron trifluoride ($FeF_3$) (labeled as control-1 through control-4) and lithium titanate (LTO, i.e., $Li_{4-7}Ti_{5.5}O_{12}$) positive electrode active materials (labeled as LTO-1 through LTO-6).

Example 4—Electrochemical Testing of Hybrid Positive Electrodes with Comparison to Positive Electrodes Having Conversion Chemistry Active Materials FIG. 15 shows the electrochemical test using the same conditions above. In this example, the data is analyzed to extract the area-specific resistance ($ASR_{dc}$) versus pulse cycle throughout the discharge. As shown in FIG. 15, the cathode including LTO and $FeF_3$ was observed to have a lower ASR throughout the discharge, particularly at the last pulse.

Figure 16:
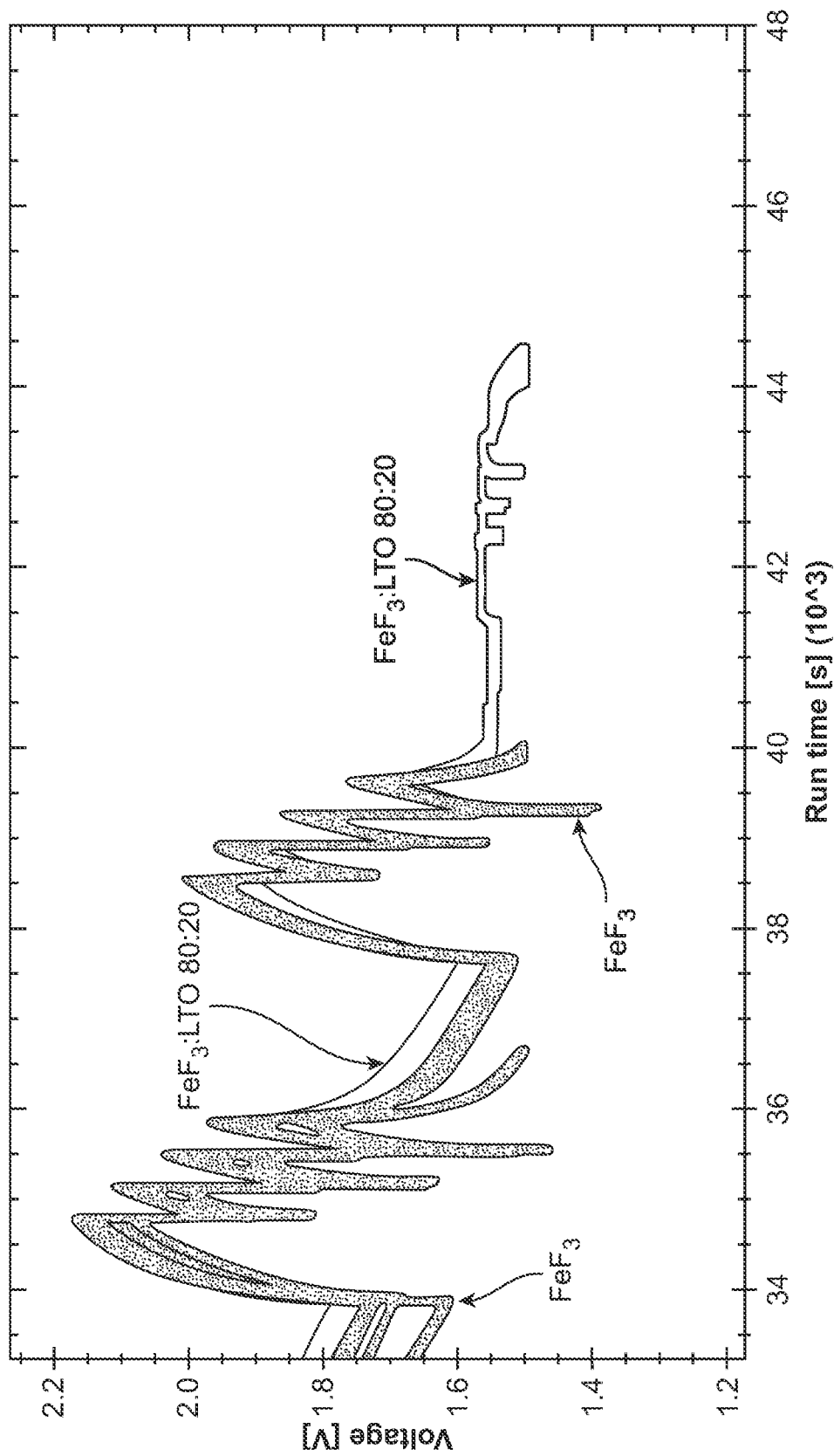
FIG. 16 shows a plot of Voltage (v. Li) as a function of Run time ($10^3$ seconds) for electrochemical cells having either $FeF_3$ positive electrode active materials, only, or a 80:20 combination of iron trifluoride ($FeF_3$) and lithium titanate (LTO, i.e., $Li_{4-7}Ti_{5.5}O_{12}$) positive electrode active materials.
Figure 17:
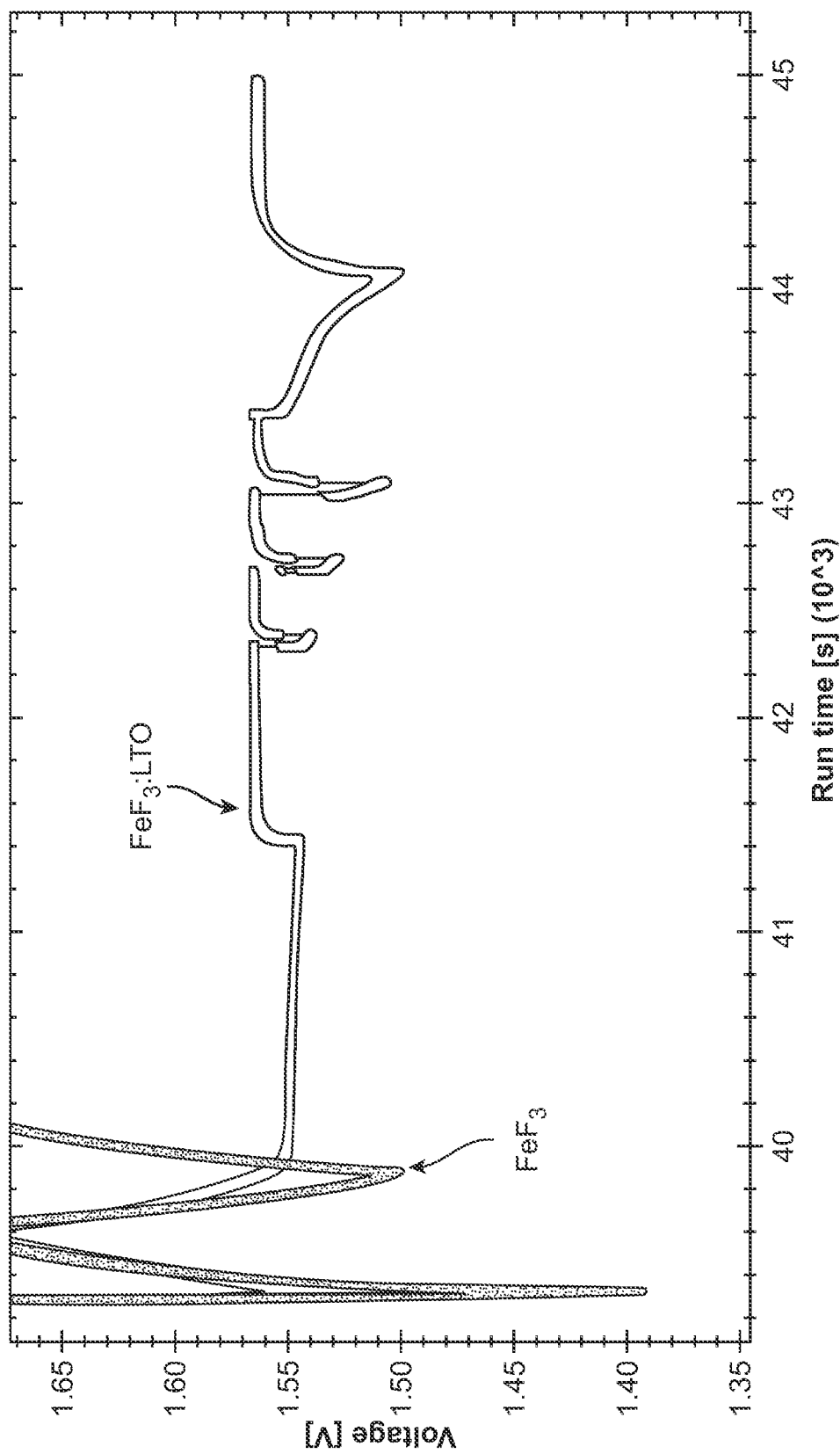
FIG. 17 shows a magnified perspective of FIG. 16.
Figure 18:
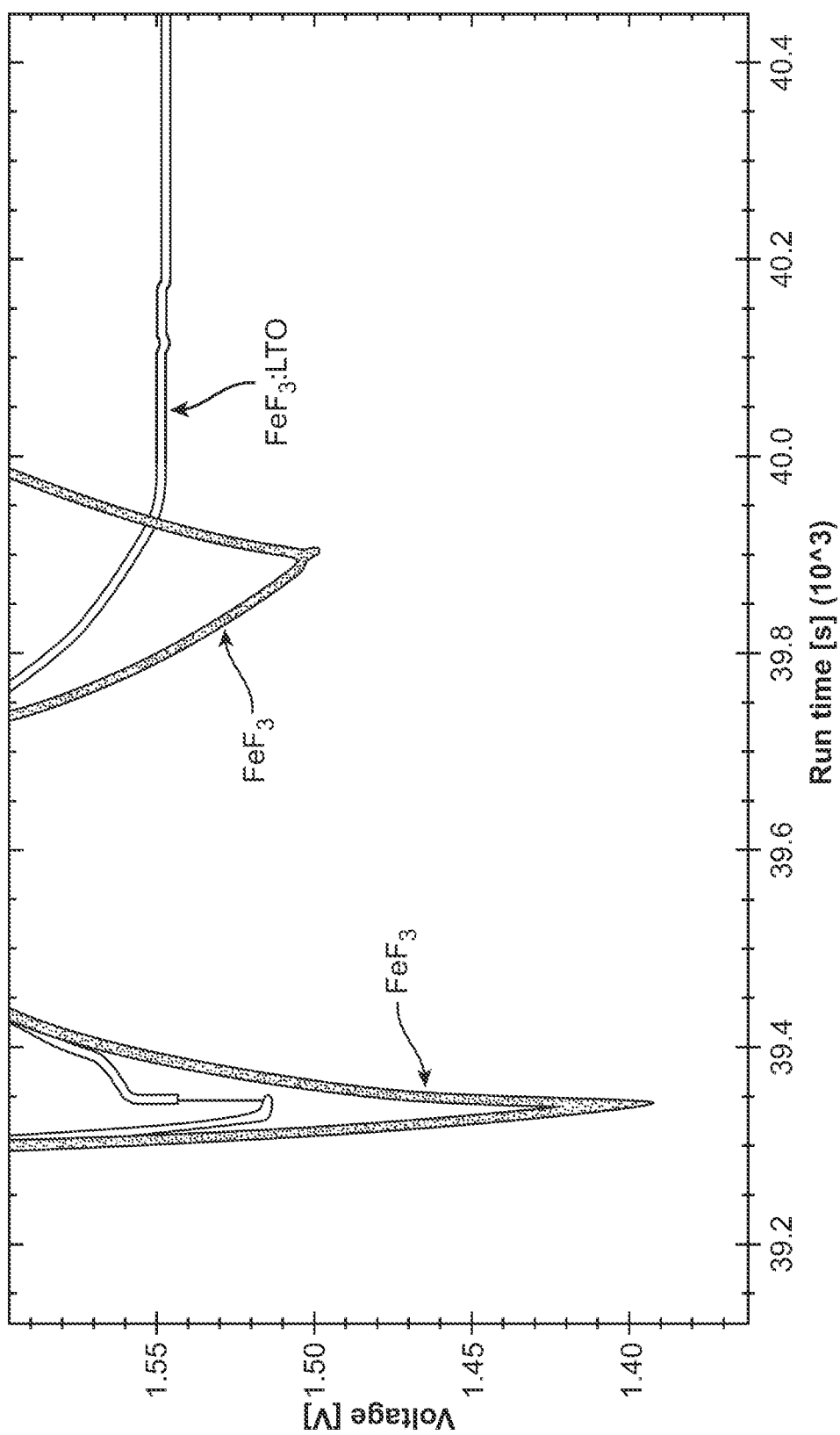
FIG. 18 shows a magnified perspective of FIG. 16.

FIGS. 16-18 show additional electrochemical results using the same conditions above but magnified (i.e., zoomed in) to show the last discharge and only showing one representative cell from each batch for clarity. This example demonstrates that LTO, with a discharge voltage above the lowest conversion voltage for $FeF_3$ "railed," or prevented, the electrochemical cell from dropping to the lower voltage than the cathode having only FeF; achieved.

Example 5—Hybrid Electrode Calculations for Hybrid Positive Electrodes with Comparison to Positive Electrodes Having Either Only Conversion Chemistry Active Materials or Only Intercalation Chemistry Active Materials To simulate how mixing cathode materials affects the voltage response, an equivalent circuit model of the system was constructed. There model included linear equations useful for calculating a positive electrode voltage and three types of components including: 1) Resistive elements which were used to model ohmic resistance to either ionic or electronic transport; Capacity elements which represented materials which store charge electrochemically and have both an open circuit voltage and a capacity, and Resistor/capacitor pairs which model charge-transfer effects where exchange current is limited by reaction kinetics. The components which comprised the conversion and intercalation materials were arranged in discrete layers to represent the hybrid chemistry electrodes. The characteristics of these components may vary with temperature, state of charge, direction of load current, magnitude of load current, and various other factors. The characteristics of these components may be set to simulate any of the conversion or intercalation chemistries mentioned in this document. To simulate the voltage response of the battery, a controlled current load is attached to the terminals of the model. Using the known load current, the cell voltage may be determined using circuit analysis techniques.

MATERIALS—In this example, a total of the three cathode layers were used. There are two layers of conversion material (FeF$_3$) and one layer of intercalation material (LTO or LCO). The layer of intercalation material was placed closest to the anode of the battery. It is to be appreciated that the number and type of materials selected and their respective capacity may be adjusted as needed to simulate the desired combination.

Figure 19:
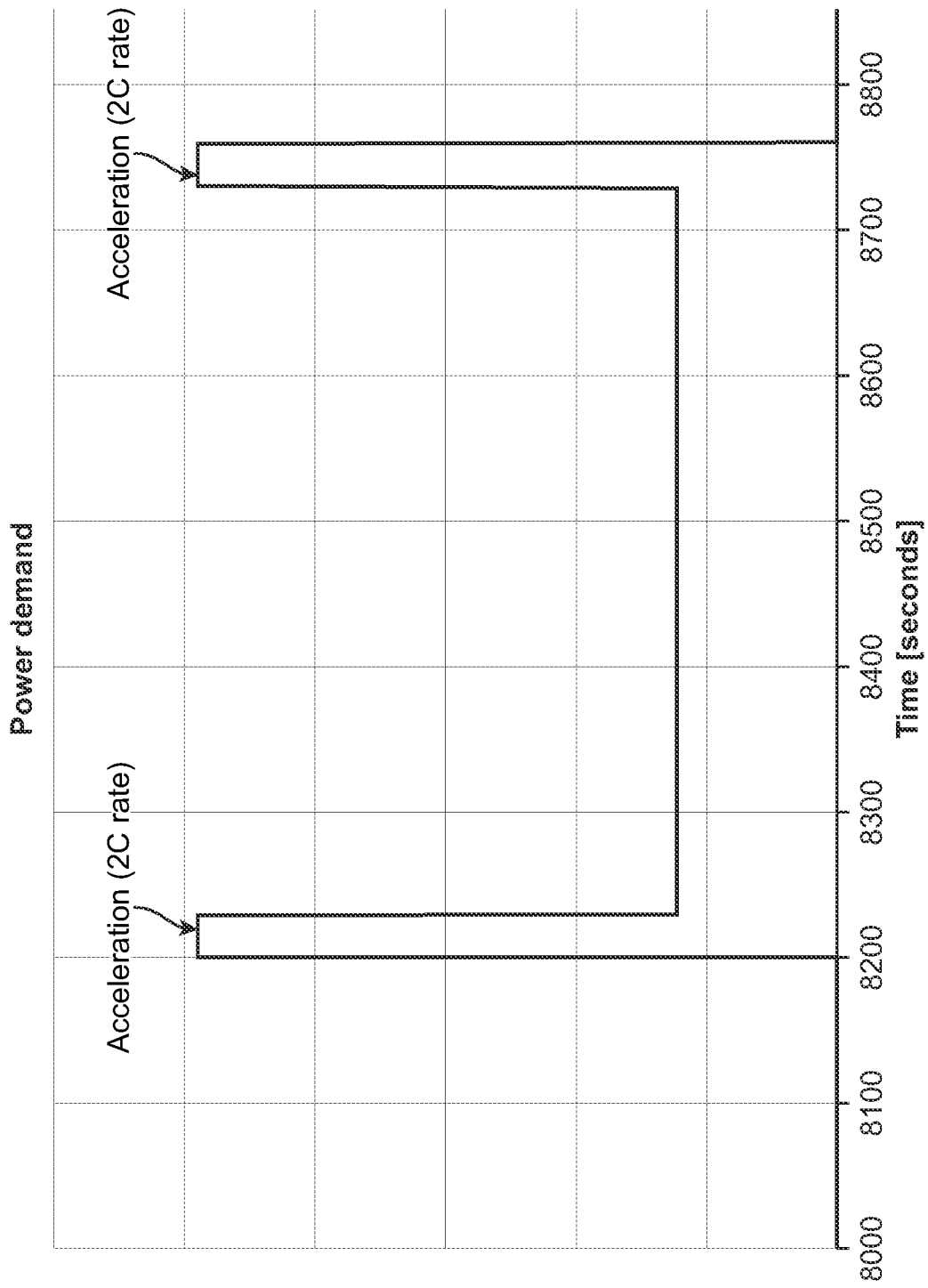
FIG. 19 illustrates a battery power demand scenario as a function of time for an accelerating electric vehicle.
Figure 20:
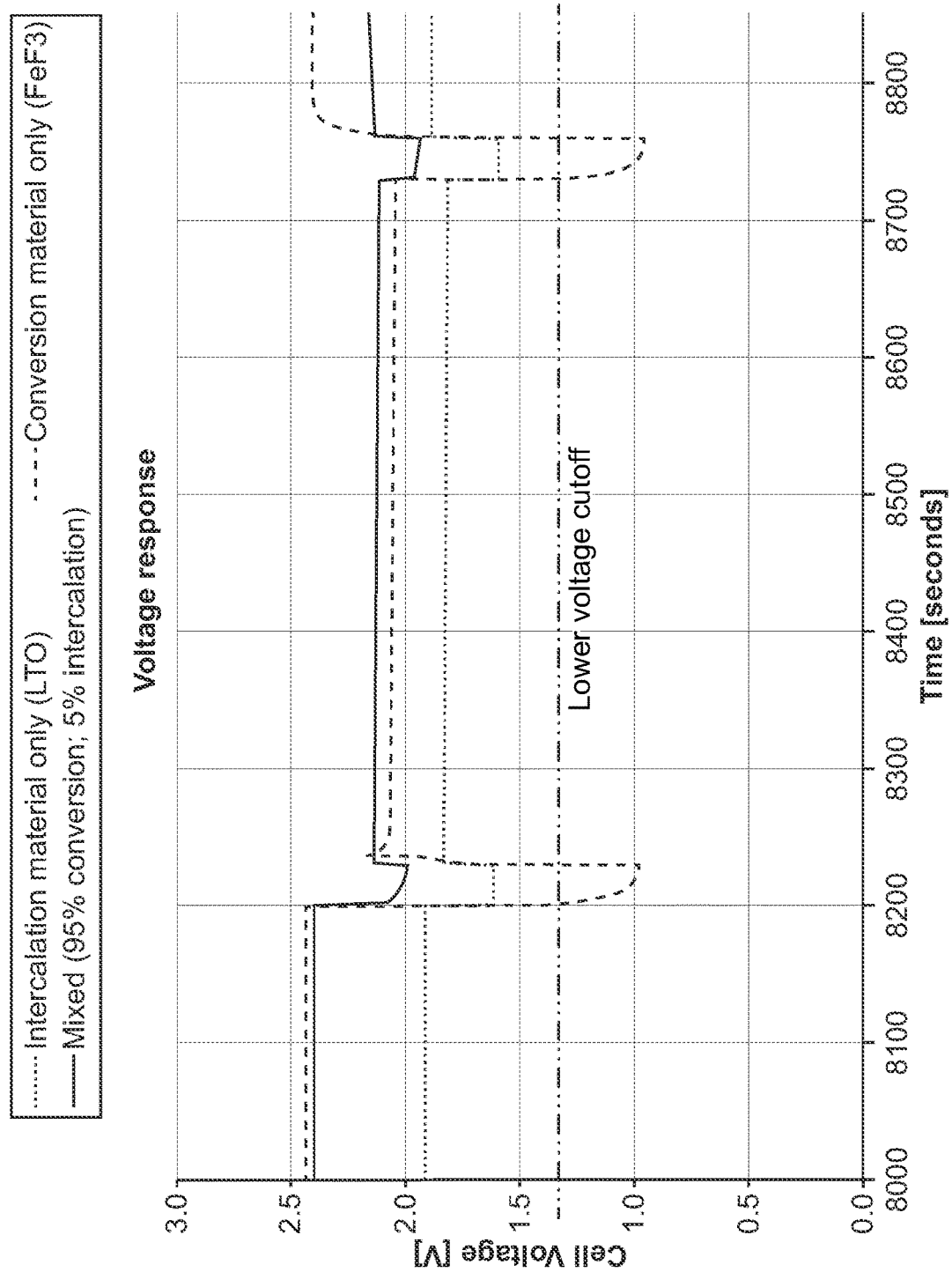
FIG. 20 shows a simulated voltage response plot of electrochemical cell Voltage (V v. Li) as a function of time for electrochemical cells having LTO positive electrode active materials, $FeF_3$ positive electrode active materials, or a 95:5 w/w mixture of $FeF_3$ and LTO positive electrode active materials based on the power demand scenario in FIG. 19.

RESULTS—The power demand profile shown in FIG. 19 shows the controlled load stimulus which generates the voltage response in FIG. 20. FIG. 20 shows three sets of simulation results. The first shows the voltage response to the power demand from a battery with only conversion chemistry active materials in the positive electrode. The second shows the voltage response to the power demand from a battery with both intercalation chemistry active materials mixed with conversion chemistry active materials, in a 95:5 w/w ratio, in the positive electrode. The third shows the voltage response to the power demand from a battery with only intercalation material in the positive electrode.

This Example shows, in FIG. 20, that the voltage of the mixed chemistry battery does not fall below the lower voltage threshold during a high power demand event at low state of charge.

Figure 21:
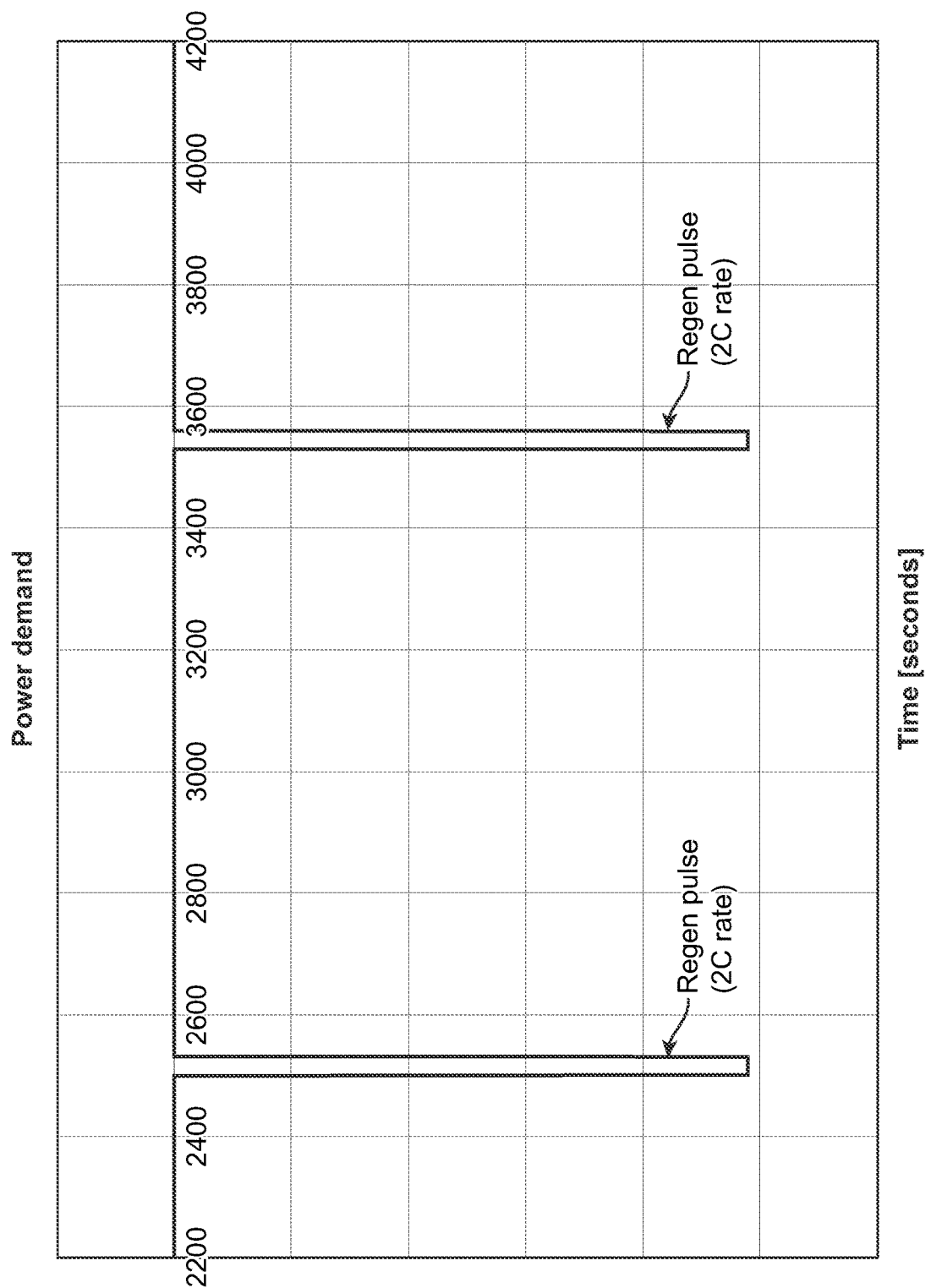
FIG. 21 shows a battery power demand scenario as a function of time for a regeneratively braking electric vehicle.
Figure 22:
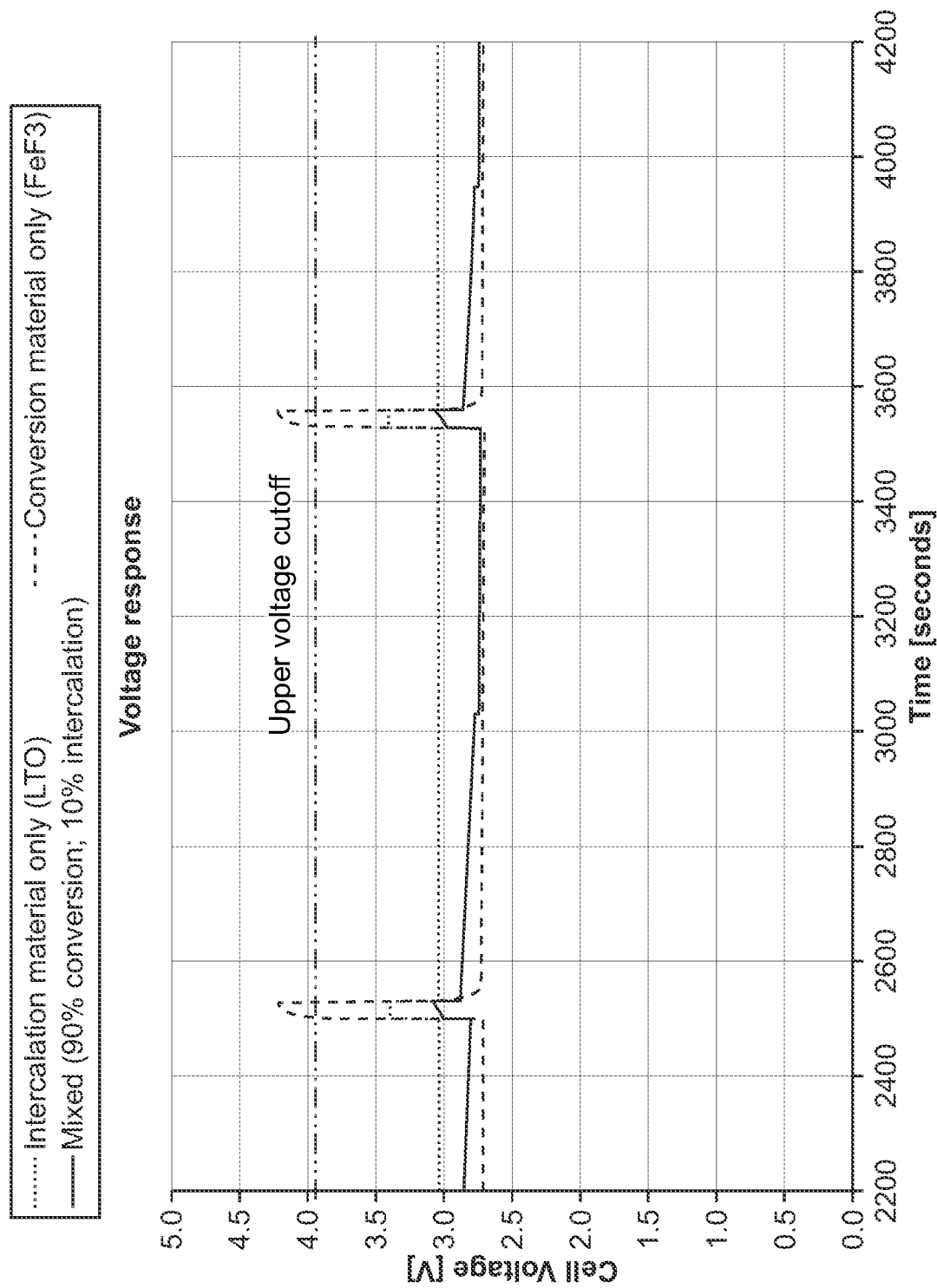
FIG. 22 shows a simulated voltage response plot of electrochemical cell Voltage (V v. Li) as a function of time for electrochemical cells having LTO positive electrode active materials, $FeF_3$ positive electrode active materials, or a 95:5 w/w mixture of $FeF_3$ and LTO positive electrode active materials based on the power demand scenario in FIG. 21.

The power demand profile shown in FIG. 21 shows the controlled load stimulus which generates the voltage response in FIG. 22. FIG. 22 shows three sets of simulation results. The first shows the voltage response to the power demand from a battery with only conversion chemistry active materials in the positive electrode. The second shows the voltage response to the power demand from a battery with both intercalation chemistry active materials mixed with conversion chemistry active materials, in a 90:10 w/w ratio, in the positive electrode. The third shows the voltage response to the power demand from a battery with only intercalation material in the positive electrode.

This Example shows, in FIG. 222, that the voltage of the mixed chemistry battery does not exceed the upper voltage cutoff during a high power regenerative brake event at high state of charge.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An electrochemical device comprising:
an anode region;
an electrolyte region; and
a cathode region comprising intercalation chemistry active material particles selected from Li$_x$Ti$_y$O$_z$, wherein x is from 0 to 8, y is from 1 to 12, z is from 1 to 24, wherein the intercalation chemistry active material particles have a discharge voltage between 1.3V and 2.5V; and conversion chemistry active material particles,
wherein the electrolyte region is positioned between the anode region and the cathode region,
wherein the conversion chemistry active material particles are present in the cathode region at a weight fraction greater than about 70 w/w % of the active material in the cathode region;
wherein the intercalation chemistry active material particles are present in the cathode region at a weight fraction less than about 30 w/w % of the active material in the cathode active region;
wherein the conversion chemistry active material particles when charged comprise FeF$_3$; and wherein the conversion chemistry active material particles when discharged comprise LiF and nanodimensioned Fe, and
wherein the intercalation chemistry active material particles and the conversion chemistry active material particles are substantially segregated into two layers.

2. The device of claim 1, wherein the intercalation chemistry active material particle layer is positioned between the conversion chemistry active material particle layer and the electrolyte region.

3. The device of claim 1, wherein the electrolyte region comprises a lithium-stuffed garnet electrolyte or a sulfide electrolyte.

4. The device of claim 1, wherein the conversion chemistry active material particles are characterized by a first upper voltage plateau and the intercalation chemistry active material particles are characterized by a second upper voltage plateau, the first upper voltage plateau being lower than the second upper voltage plateau.

5. The device of claim 1, wherein the conversion chemistry active material particles are characterized by a conversion voltage which is higher than the intercalation voltage of the intercalation chemistry active material particles.

6. The device of claim 1, wherein the cathode region comprises a conversion chemistry active material particles and at least two different types of intercalation chemistry active material particles.

7. The device of claim 1, wherein the cathode region is capable of being charged at a voltage of greater than 3.0V.

8. The device of claim 1, wherein the intercalation chemistry active material particles have a discharge voltage between 1.8V and 2.1V.

9. The device of claim 1, wherein the intercalation chemistry active material particles include a member selected from the group consisting of LiTiO$_2$, Li$_{4.7}$Ti$_5$O$_{12}$, Li$_4$Ti$_5$O$_{12}$, and combinations thereof.

10. The device of claim 1, wherein the intercalation chemistry active material particles include a member selected from the group consisting of Li$_{3-4}$TiFe$_3$O$_8$, Li$_{2-4}$TiV$_3$O$_5$, Li$_{3-5}$TiMn$_3$O$_6$, Li$_{1-3}$Ti$_2$V$_5$O$_{12}$, Li$_{0-1}$La$_4$Ti$_3$O$_{12}$, Li$_{1-5}$Ti$_2$V$_3$O$_{15}$, Li$_{0.67-2}$TiV$_4$, Li$_{1-2}$TiVO$_5$, Li$_{7-9}$Ti$_{1.2}$NbO$_{30}$, Li$_{0-1}$TiP$_2$O$_7$, Li$_{4-5}$Ti$_3$O$_5$, L$_{1-2}$TiVO$_4$, Li$_{0-1}$Ti$_2$, Li$_{4-7}$Ti$_{11}$O$_{24}$, Li$_{1-4}$Ti$_3$VO$_3$, Li$_{0-1}$TiO$_2$, Li$_{0.75-1}$TiO$_2$, Li$_{1-2}$Ti$_2$VO$_4$, Li$_{7-9}$Ti$_7$Nb$_5$O$_{30}$, Li$_{2-3}$TiV$_2$O$_6$, Li$_{0-5}$Ti$_4$VO$_8$, L$_{0-1}$TiO$_2$, Li$_{0-1}$TiP$_2$O$_7$, and combinations thereof.

11. A battery system comprising:
a battery management system (BMS);
a battery pack comprising a plurality of battery cells, wherein each of the battery cells comprises:
an anode region;
an electrolyte region; and
a cathode region comprising intercalation chemistry active material particles selected from $Li_xTi_yO_z$, wherein x is from 0 to 8, y is from 1 to 12, z is from 1 to 24, wherein the intercalation chemistry active material particles have a discharge voltage between 1.3V and 2.5V, and
conversion chemistry active material particles,
the electrolyte region being positioned between the anode region and the cathode region, the cathode region being characterized by a first weight, the intercalation chemistry active material particles being characterized by a second weight, the second weight being less than 20% of the first weight;
wherein the conversion chemistry active material particles when charged comprise $FeF_3$; and wherein the conversion chemistry active material particles when discharged comprise LiF and a nanodimensioned Fe.

12. The battery system of claim 11, wherein the BMS is configured to charge the battery pack by pulse charges.

13. The system of claim 11, wherein the intercalation chemistry active material particles have a discharge voltage between 1.8V and 2.1V.

14. The system of claim 11, wherein the intercalation chemistry active material particles include a member selected from the group consisting of $LiTiO_2$, $Li_{4.7}Ti_5O_{12}$, $Li_4Ti_5O_{12}$, and combinations thereof.

15. An electrochemical device comprising:
an anode region;
an electrolyte region; and
a cathode region comprising intercalation chemistry active material particles selected from $Li_xTi_yO_z$, wherein x is from 0 to 8, y is from 1 to 12, z is from 1 to 24, wherein the intercalation chemistry active material particles have a discharge voltage between 1.3V and 2.5V, and conversion chemistry active material particles;
wherein the weight ratio of the conversion chemistry active material particles to the one or more intercalation chemistry active material particles is between 70:30 and 99:1;
wherein the conversion material particles when charged comprise $FeF_3$, and wherein the conversion chemistry active material particles when discharged comprise LiF and a nanodimensioned Fe.

16. The electrochemical device of claim 15, wherein the intercalation voltage plateau for the one or more intercalation material particles is below the conversion voltage plateau for the conversion chemistry active material particles.

17. The device of claim 15, wherein the intercalation chemistry active material particles have a discharge voltage between 1.8V and 2.1V.

18. The device of claim 15, wherein the intercalation chemistry active material particles include a member selected from the group consisting of $LiTiO_2$, $Li_{4.7}Ti_5O_{12}$, $Li_4Ti_5O_{12}$, and combinations thereof.

* * * * *